US010723975B2

(12) United States Patent
Dykstra et al.

(10) Patent No.: US 10,723,975 B2
(45) Date of Patent: *Jul. 28, 2020

(54) TREATMENT COMPOSITIONS

(71) Applicant: The Procter & Gamble Company, Cincinnati, OH (US)

(72) Inventors: Robert Richard Dykstra, West Chester, OH (US); Mark Robert Sivik, Mason, OH (US); Travis Kyle Hodgdon, Cincinnati, OH (US); Stephanie Ann Urbin, Liberty Township, OH (US); Alessandro Corona, III, Mason, OH (US); Jocelyn Michelle McCullough, Loveland, OH (US); Denise Malcuit Belanger, West Chester, OH (US); Kristi Lynn Fliter, Harrison, OH (US); Richard Timothy Hartshorn, Lawrenceburg, IN (US); Nicholas David Vetter, Cleves, OH (US); Tessa Xuan, Cincinnati, OH (US); Reinhold Joseph Leyrer, Dannstadt (DE); Gledison Fonseca, Mannheim (DE); Volodymyr Boyko, Mannheim (DE); Aaron Flores-Figueroa, Mannheim (DE)

(73) Assignee: The Procter & Gamble Company, Cincinnati, OH (US)

( * ) Notice: Subject to any disclaimer, the term of this patent is extended or adjusted under 35 U.S.C. 154(b) by 3 days.

This patent is subject to a terminal disclaimer.

(21) Appl. No.: 15/587,462

(22) Filed: May 5, 2017

(65) Prior Publication Data

US 2017/0247637 A1    Aug. 31, 2017

Related U.S. Application Data

(63) Continuation of application No. 14/806,684, filed on Jul. 23, 2015, now abandoned.

(60) Provisional application No. 62/083,926, filed on Nov. 25, 2014, provisional application No. 62/027,812, filed on Jul. 23, 2014.

(51) Int. Cl.
| | | |
|---|---|---|
| *C11D 3/37* | (2006.01) | |
| *C11D 3/00* | (2006.01) | |
| *C11D 1/62* | (2006.01) | |
| *C11D 3/50* | (2006.01) | |
| *C08F 220/56* | (2006.01) | |
| *C11D 3/08* | (2006.01) | |
| *C11D 3/20* | (2006.01) | |
| *C11D 3/22* | (2006.01) | |
| *C11D 3/30* | (2006.01) | |

(52) U.S. Cl.
CPC ............ *C11D 3/001* (2013.01); *C08F 220/56* (2013.01); *C11D 1/62* (2013.01); *C11D 3/08* (2013.01); *C11D 3/2093* (2013.01); *C11D 3/222* (2013.01); *C11D 3/30* (2013.01); *C11D 3/373* (2013.01); *C11D 3/3749* (2013.01); *C11D 3/3769* (2013.01); *C11D 3/3776* (2013.01); *C11D 3/505* (2013.01)

(58) Field of Classification Search
CPC ....... C11D 3/3769; C11D 3/3773; C11D 1/62; C11D 3/0015; C11D 3/001
See application file for complete search history.

(56) References Cited

U.S. PATENT DOCUMENTS

| | | | |
|---|---|---|---|
| 4,137,180 A | 1/1979 | Naik et al. | |
| 4,199,464 A | 4/1980 | Cambre | |
| 4,528,321 A | 7/1985 | Allen et al. | |
| 5,296,622 A | 3/1994 | Uphues et al. | |
| 5,759,990 A | 6/1998 | Wahl et al. | |
| 6,271,192 B1 | 8/2001 | Verstrat et al. | |
| 6,326,430 B1 | 12/2001 | Berte | |
| 6,348,541 B1 | 2/2002 | Kanda et al. | |
| 6,361,781 B2 | 3/2002 | Lorant | |
| 6,376,456 B1 | 4/2002 | Murphy et al. | |
| 6,413,920 B1 | 7/2002 | Bettiol et al. | |
| 6,494,920 B1 | 12/2002 | Weuthen et al. | |
| 6,620,777 B2 | 9/2003 | Heibel et al. | |
| 6,924,261 B2 | 8/2005 | Grandmaire et al. | |
| 6,992,058 B2 | 1/2006 | Grandmaire et al. | |
| 7,063,895 B2 | 6/2006 | Rodrigues et al. | |
| 7,378,033 B2 | 5/2008 | Harrison et al. | |
| 7,381,417 B2 | 6/2008 | Gamez-Garcia | |
| 7,981,850 B2 | 7/2011 | Doi et al. | |
| 8,188,022 B2 | 5/2012 | Sengupta et al. | |

(Continued)

FOREIGN PATENT DOCUMENTS

| | | |
|---|---|---|
| CA | 2482306 C | 10/2011 |
| CN | 101724132 B | 11/2011 |

(Continued)

OTHER PUBLICATIONS

Invitation to pay additional fees; International Application No. PCT/US2015/041654; dated Nov. 2, 2015; 6 pages.
International Search Report; International Application No. PCT/US2015/041656; dated Oct. 9, 2015; 10 pages.
International Search Report; International Application No. PCT/US2015/041657; dated Oct. 8, 2015; 11 pages.
International Search Report; International Application No. PCT/US2015/041658; dated Oct. 8, 2015; 11 pages.

(Continued)

*Primary Examiner* — John R Hardee
(74) *Attorney, Agent, or Firm* — Gregory S. Darley-Emerson

(57) ABSTRACT

The present invention relates to treatment compositions containing polymer systems that provide stability and benefit agent deposition as well as methods of making and using same. Such treatment compositions may be used for example as through the wash and/or through the rinse fabric enhancers as well as unit dose treatment compositions.

14 Claims, No Drawings

(56) References Cited

U.S. PATENT DOCUMENTS

| | | | |
|---|---|---|---|
| 8,211,414 | B2 | 7/2012 | Chen et al. |
| 8,524,649 | B2 | 9/2013 | Leyrer et al. |
| 8,563,498 | B2 | 10/2013 | Gizaw et al. |
| 8,741,831 | B2 | 6/2014 | Jaynes et al. |
| 8,835,373 | B2 | 9/2014 | Miravet Celades et al. |
| 9,018,154 | B2 | 4/2015 | Blondel |
| 9,441,188 | B2 | 9/2016 | Schramm, Jr. et al. |
| 10,266,792 | B2 * | 4/2019 | Sivik .................... C11D 3/001 |
| 2002/0132749 | A1 | 9/2002 | Smith et al. |
| 2004/0038851 | A1 | 2/2004 | Aubay et al. |
| 2004/0065208 | A1 | 4/2004 | Hart et al. |
| 2004/0071716 | A1 | 4/2004 | Jansen et al. |
| 2004/0116321 | A1 | 6/2004 | Salesses et al. |
| 2004/0116322 | A1 | 6/2004 | Yianakopoulos et al. |
| 2004/0204337 | A1 | 10/2004 | Corona, III et al. |
| 2004/0229769 | A1 | 11/2004 | Smith et al. |
| 2005/0003980 | A1 | 1/2005 | Baker et al. |
| 2005/0043208 | A1 | 2/2005 | Bettiol |
| 2005/0245668 | A1 | 11/2005 | Green et al. |
| 2005/0256027 | A1 | 11/2005 | Heibel et al. |
| 2006/0094639 | A1 | 5/2006 | Martin et al. |
| 2006/0252669 | A1 | 11/2006 | Heibel et al. |
| 2007/0099817 | A1 | 5/2007 | Smith et al. |
| 2007/0275866 | A1 | 11/2007 | Dykstra |
| 2007/0293413 | A1 | 12/2007 | McFarland et al. |
| 2008/0076692 | A1 | 3/2008 | Carvell et al. |
| 2008/0167453 | A1 | 7/2008 | Goettel et al. |
| 2008/0295256 | A1 | 12/2008 | Broze et al. |
| 2008/0312343 | A1 | 12/2008 | Braun et al. |
| 2009/0062174 | A1 | 3/2009 | Green et al. |
| 2010/0035791 | A1 | 2/2010 | Igarashi et al. |
| 2010/0078959 | A1 | 4/2010 | Goodson |
| 2010/0190679 | A1 | 7/2010 | Vanpachtenbeke et al. |
| 2011/0245141 | A1 | 10/2011 | Gizaw et al. |
| 2011/0245142 | A1 | 10/2011 | Gizaw et al. |
| 2011/0269663 | A1 | 11/2011 | Clowes et al. |
| 2011/0301312 | A1 | 12/2011 | Blondel |
| 2012/0142578 | A1 | 6/2012 | Panandiker et al. |
| 2013/0109612 | A1 | 5/2013 | Corona, III et al. |
| 2013/0121944 | A1 | 5/2013 | Leyrer et al. |
| 2013/0121945 | A1 | 5/2013 | Leyrer et al. |
| 2013/0129657 | A1 | 5/2013 | Streuli |
| 2013/0197101 | A1 | 8/2013 | Braun et al. |
| 2013/0310300 | A1 | 11/2013 | Leyrer et al. |
| 2013/0310301 | A1 | 11/2013 | Sivik et al. |
| 2014/0047649 | A1 | 2/2014 | Blondel |
| 2014/0315779 | A1 | 10/2014 | Zander |
| 2014/0378639 | A1 | 12/2014 | Blondel et al. |
| 2015/0191677 | A1 | 7/2015 | Blondel |
| 2015/0197708 | A1 | 7/2015 | Jin |
| 2015/0329799 | A1 | 11/2015 | Schramm, Jr. et al. |
| 2015/0337239 | A1 | 11/2015 | Gonzalez de Cossio et al. |
| 2016/0024426 | A1 | 1/2016 | Sivik et al. |
| 2016/0024427 | A1 | 1/2016 | Sivik et al. |
| 2016/0024428 | A1 | 1/2016 | Dykstra et al. |
| 2016/0024429 | A1 | 1/2016 | Dykstra et al. |
| 2016/0024430 | A1 | 1/2016 | Dykstra et al. |
| 2016/0024431 | A1 | 1/2016 | Dykstra et al. |
| 2016/0024432 | A1 | 1/2016 | Sivik et al. |
| 2016/0024433 | A1 | 1/2016 | Sivik et al. |
| 2016/0024434 | A1 | 1/2016 | Sivik et al. |
| 2016/0032220 | A1 | 2/2016 | Sivik et al. |
| 2017/0191002 | A1 | 7/2017 | Dykstra et al. |
| 2017/0247637 | A1 | 8/2017 | Dykstra et al. |
| 2017/0298295 | A1 | 10/2017 | Dykstra et al. |
| 2017/0342345 | A1 | 11/2017 | Sivik et al. |

FOREIGN PATENT DOCUMENTS

| | | |
|---|---|---|
| EP | 0 172 025 A2 | 2/1986 |
| EP | 0 172 723 A2 | 2/1986 |
| EP | 0 172 724 A2 | 2/1986 |
| EP | 0 343 840 A2 | 11/1989 |
| EP | 1 352 948 A1 | 10/2003 |
| EP | 1 625 195 B1 | 5/2007 |
| EP | 1 740 682 B1 | 6/2009 |
| EP | 1 756 168 B1 | 7/2009 |
| EP | 2 284 250 A1 | 2/2011 |
| EP | 1 781 717 B1 | 11/2012 |
| FR | 2862975 B1 | 2/2006 |
| GB | 2 002 400 A | 2/1979 |
| JP | 2005082924 A | 3/2005 |
| JP | 2012154010 A | 8/2012 |
| JP | 2012158547 A | 8/2012 |
| JP | 5034078 B2 | 9/2012 |
| JP | 5528660 B2 | 6/2014 |
| KR | 20150100549 A | 9/2015 |
| WO | WO 96/07689 A1 | 3/1996 |
| WO | WO 99/20725 A1 | 4/1999 |
| WO | WO 02/057400 A2 | 7/2002 |
| WO | WO 03/002699 A1 | 1/2003 |
| WO | WO 03/102043 A1 | 12/2003 |
| WO | WO 2004/050812 A1 | 6/2004 |
| WO | WO 2004/061065 A1 | 7/2004 |
| WO | WO 2005/087907 A1 | 9/2005 |
| WO | WO 2005/097834 A2 | 10/2005 |
| WO | WO 2005/103215 A1 | 11/2005 |
| WO | WO 2008/005693 A2 | 1/2008 |
| WO | WO 2010/078959 A1 | 7/2010 |
| WO | WO 2010/079100 A1 | 7/2010 |
| WO | WO 2012/076432 A1 | 6/2012 |
| WO | WO 2013/068388 A1 | 5/2013 |
| WO | WO 2013/068394 A1 | 5/2013 |
| WO | WO 2013/142486 A1 | 9/2013 |
| WO | WO 2013/189010 A1 | 12/2013 |
| WO | WO 2015/130088 A1 | 9/2015 |

OTHER PUBLICATIONS

International Search Report; International Application No. PCT/US2015/041659; dated Nov. 2, 2015; 15 pages.
International Search Report; International Application No. PCT/US2015/041737; dated Oct. 23, 2015; 10 pages.
International Search Report; International Application No. PCT/US2015/041741; dated Oct. 8, 2015; 11 pages.
International Search Report; International Application No. PCT/US2015/041640; dated Oct. 8, 2015; 11 pages.
International Search Report; International Application No. PCT/US2015/041641; dated Oct. 13, 2015; 10 pages.
International Search Report; International Application No. PCT/US2015/041642; dated Oct. 8, 2015; 11 pages.
Schuck, Peter, Size-Distribution Analysis of Macromolecules by Sedimentation Velocity Ultracentrifugation and Lamm Equation Modeling, Biophysical Journal, Mar. 2000, pp. 1606-1619, vol. 78, No. 3.
ASTM D3954-94 (Reapproved 2010), Standard Test Method for Dropping Point of Waxes.
International Preliminary Report on Patentability; International Application No. PCT/US2015/041654; dated Nov. 3, 2016; 12 pages.

* cited by examiner

TREATMENT COMPOSITIONS

This is a continuation of U.S. patent application Ser. No. 14/806,684, filed Jul. 23, 2015, now abandoned, which claims the priority dates of U.S. Provisional Applications 62/027,812, filed Jul. 23, 2014 and 62/083,926, filed Nov. 25, 2014.

FIELD OF THE INVENTION

The present invention relates to treatment compositions and processes of making and using same.

BACKGROUND OF THE INVENTION

Treatment compositions, such as fabric treatments, typically comprise benefit agents such as silicones, fabric softeners, perfumes and perfume microcapsules. Generally there are tradeoffs associated with using multiple benefit agents in one treatment composition. Such tradeoffs include instability, as well as the loss or reduction of one or more of the benefit agents' benefits. A reduction in one of the benefit agent's levels can improve the performance of another benefit agent, yet the performance of the benefit agent that is being reduced suffers. In an effort to solve this dilemma, industry has turned to polymers. Current polymers systems can improve a treatment composition's stability but such improvement in stability comes with a decrease in freshness.

Applicants recognized that the traditional polymer system architecture was the source of the stability and freshness problems. In particular, Applicants recognized that traditional polymer systems did not contribute the overall feel benefit that was desired. Applicants discovered that, for fabric enhancers, in particular low pH fabric enhancers, when coupled with the judicious selection of two polymers, one with high cross-linking and one with low cross-linking polymer, the softener active level could be reduced to improve the composition's perfume effectiveness, yet the perceived performance of softener active was surprisingly maintained. While not being bound by theory, Applicants believe that the proper selection of such polymers provides a reduction in friction which is interpreted by consumers as a softer and more preferred feel.

SUMMARY OF THE INVENTION

The present invention relates to treatment compositions containing polymer systems that provide stability and benefit agent deposition as well as methods of making and using same. Such treatment compositions may be used for example as through the wash and/or through the rinse fabric enhancers as well as unit dose treatment compositions.

DETAILED DESCRIPTION OF THE INVENTION

Definitions

As used herein, the term "fabric and home care product" is a subset of cleaning and treatment compositions that includes, unless otherwise indicated, granular or powder-form all-purpose or "heavy-duty" washing agents, especially cleaning detergents; liquid, gel or paste-form all-purpose washing agents, especially the so-called heavy-duty liquid types; liquid fine-fabric detergents; hand dishwashing agents or light duty dishwashing agents, especially those of the high-foaming type; machine dishwashing agents, including the various tablet, granular, liquid and rinse-aid types for household and institutional use; liquid cleaning and disinfecting agents, including antibacterial hand-wash types, cleaning bars, car or carpet shampoos, bathroom cleaners including toilet bowl cleaners; and metal cleaners, fabric conditioning products including softening and/or freshening that may be in liquid, solid and/or dryer sheet form; as well as cleaning auxiliaries such as bleach additives and "stain-stick" or pre-treat types, substrate-laden products such as dryer added sheets, dry and wetted wipes and pads, nonwoven substrates, and sponges; as well as sprays and mists. All of such products which are applicable may be in standard, concentrated or even highly concentrated form even to the extent that such products may in certain aspect be non-aqueous.

As used herein "Polymer 1" is synonymous with "first polymer" and "Polymer 2" is synonymous with "second polymer".

As used herein, the term "situs" includes paper products, fabrics, garments and hard surfaces.

As used herein, articles such as "a", "an", and "the" when used in a claim, are understood to mean one or more of what is claimed or described.

Unless otherwise noted, all component or composition levels are in reference to the active level of that component or composition, and are exclusive of impurities, for example, residual solvents or by-products, which may be present in commercially available sources.

All percentages and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Fabric Treatment Compositions

In one aspect, a composition comprising, based upon total composition weight:
  a) from about 0.01% to about 1%, preferably from about 0.05% to about 0.75%, more preferably from about 0.075% to about 0.5%, even more preferably from about 0.06% to about 0.3% of a polymeric material comprising:
    (i) a polymer derived from the polymerization of from about 5 to 98.5 mole percent of a cationic vinyl addition monomer, from about 1.5 to 95 mole percent of a non-ionic vinyl addition monomer, from about 50 ppm to 475 ppm of the composition of a cross-linking agent comprising three or more ethylenic functions and a chain transfer agent from about 0 to 10,000 ppm said polymer having a viscosity slope of from about 3.5 to about 12;
    (ii) a first polymer and a second polymer, preferably said first polymer and said second polymer being present in a ratio of about 1:5 to about 10:1, preferably, about 1:2 to about 5:1, more preferably about 1:1 to about 3:1; most preferably from about 3:2 to 5:1; said first polymer is derived from the polymerization of from about 5 to 100 mole percent of a cationic vinyl addition monomer, from about 0 to 95 mole percent of a non-ionic vinyl addition monomer, from about 50 ppm to 2,000 ppm, preferably from about 50 ppm to about 475 ppm, of a cross-linking agent comprising three or more ethylenic functions, 0 ppm to about 10,000 ppm chain transfer agent, preferably said first polymer has a viscosity slope >3.7 said second polymer being derived from the polymerization of from about 5 to 100 mole percent of a cationic vinyl addition monomer, from about 0 to 95 mole percent of a non-ionic vinyl addition monomer, from about 0 ppm to 45 ppm of a cross-linking agent comprising two or more ethylenic functions, 0 ppm to about 10,000 ppm chain transfer agent, preferably said second polymer has a viscosity slope <3.7; in one aspect said second polymer is a linear or branched, uncross-linked polyethyleneimine, preferably said polyethyleneimine is branched and uncross-linked;

(iii) a first polymer and a second polymer, preferably said first polymer and said second polymer being present in a ratio of about 1:5 to about 10:1, preferably, about 1:2 to about 5:1, more preferably about 1:1 to about 3:1, most preferably from about 3:2 to 5:1; said first polymer is derived from the polymerization of from about 5 to 100 mole percent of a cationic vinyl addition monomer, from about 0 to 95 mole percent of a non-ionic vinyl addition monomer, from about 310 ppm to 1,950 ppm of a cross-linking agent comprising two or more ethylenic functions, 0 ppm to about 10,000 ppm chain transfer agent, preferably said first polymer has a viscosity slope >3.7;

said second polymer being derived from the polymerization of from about 5 to 100 mole percent of a cationic vinyl addition monomer, from about 0 to 95 mole percent of a non-ionic vinyl addition monomer, from about 0 ppm to 45 ppm of a cross-linking agent comprising two or more ethylenic functions, 0 ppm to about 10,000 ppm chain transfer agent, preferably said second polymer has a viscosity slope <3.7; in one aspect said second polymer is a linear or branched, uncross-linked polyethyleneimine, preferably said polyethyleneimine is branched and uncross-linked;

(iv) a first polymer and a second polymer, preferably said first polymer and said second polymer being present in a ratio of about 1:5 to about 10:1, preferably, about 1:2 to about 5:1, more preferably about 1:1 to about 3:1, most preferably from about 3:2 to 5:1; said first polymer is derived from the polymerization of from about 5 to 100 mole percent of a cationic vinyl addition monomer, from about 0 to 95 mole percent of a non-ionic vinyl addition monomer, from about 50 ppm to 1,950 ppm of a cross-linking agent comprising two or more ethylenic functions, 0 ppm to about 10,000 ppm chain transfer agent, preferably said first polymer has a viscosity slope >3.7, with the proviso that said first polymer does not comprise an acrylamide unit and/or a methacrylamide unit;

said second polymer being derived from the polymerization of from about 5 to 100 mole percent of a cationic vinyl addition monomer, from about 0 to 95 mole percent of a non-ionic vinyl addition monomer, from about 0 ppm to 45 ppm of a cross-linking agent comprising two or more ethylenic functions, 0 ppm to about 10,000 ppm chain transfer agent, preferably said second polymer has a viscosity slope <3.7; in one aspect said second polymer is a linear or branched, uncross-linked polyethyleneimine, preferably said polyethyleneimine is branched and uncross-linked;

(v) a first polymer and a second polymer, preferably said first polymer and said second polymer being present in a ratio of about 1:5 to about 10:1, preferably, about 1:2 to about 5:1, more preferably about 1:1 to about 3:1, most preferably from about 3:2 to 5:1; said first polymer is derived from the polymerization of from about 5 to 100 mole percent of a cationic vinyl addition monomer, from about 0 to 95 mole percent of a non-ionic vinyl addition monomer, from about 50 ppm to 1,950 ppm of a cross-linking agent comprising two or more ethylenic functions, 0 ppm to about 10,000 ppm chain transfer agent, preferably said first polymer has a viscosity slope >3.7;

said second polymer being derived from the polymerization of from about 5 to 100 mole percent of a cationic vinyl addition monomer, from about 0 to 95 mole percent of a non-ionic vinyl addition monomer, from about 1 ppm to 45 ppm of a cross-linking agent comprising two or more ethylenic functions, 0 ppm to about 10,000 ppm chain transfer agent, preferably said second polymer has a viscosity slope <3.7;

(vi) a first polymer and a second polymer, preferably said first polymer and said second polymer being present in a ratio of about 1:5 to about 10:1, preferably, about 1:2 to about 5:1, more preferably about 1:1 to about 3:1, most preferably from about 3:2 to 5:1; said first polymer is derived from the polymerization of from about 5 to 100 mole percent of a cationic vinyl addition monomer, from about 0 to 95 mole percent of a non-ionic vinyl addition monomer, from about 50 ppm to 1,950 ppm of a cross-linking agent comprising three or more ethylenic functions, 0 ppm to about 10,000 ppm chain transfer agent, preferably said first polymer has a viscosity slope >3.7 said second polymer being derived from the polymerization of from about 5 to 99 mole percent of a cationic vinyl addition monomer, from about 0 to 95 mole percent of a non-ionic vinyl addition monomer, from about 1 to 49 percent of an anionic vinyl addition monomer, with the proviso that the sum of the cationic vinyl addition monomer, non-ionic vinyl addition monomer, and anionic vinyl addition monomer will not exceed 100 mole percent; from about 0 ppm to 45 ppm of a cross-linking agent comprising two or more ethylenic functions, 0 ppm to about 10,000 ppm chain transfer agent, preferably said second polymer has a viscosity slope <3.7;

(vii) a polymer being derived from the polymerization of from about 5 to 99 mole percent of a cationic vinyl addition monomer, from about 0 to 95 mole percent of a non-ionic vinyl addition monomer, from about 1 to 49 percent of an anionic vinyl addition monomer, with the proviso that the sum of the cationic vinyl addition monomer, non-ionic vinyl addition monomer, and anionic vinyl addition monomer will not exceed 100 mole percent; from about 50 ppm to 2,000 ppm of a cross-linking agent comprising two or more ethylenic functions, 0 ppm to about 10,000 ppm chain transfer agent, preferably said first polymer has a viscosity slope >3.7;

(viii) a polymer derived from the polymerization of from about 5 to 100 mole percent of a cationic vinyl addition monomer, from about 0 to 95 mole percent of a non-ionic vinyl addition monomer, from about 515 ppm to 4,975 ppm of a cross-linking agent comprising two or more ethylenic functions, a weight percent water soluble fraction greater than or equal to 25 weight percent and 0 ppm to about 10,000 ppm of a chain transfer agent, and (v) mixtures thereof;

b.) from about 0% to about 35%, preferably from about 1% to about 35%, more preferably from about 2% to about 25%, more preferably from about 3% to about 20%, more preferably from about 5% to about 15%, most preferably from about 8% to about 12% of a fabric softener active;

said composition being a fabric and home care product, is disclosed.

In one aspect of said composition, said polymeric material comprises:

a.) a polymer derived from the polymerization of from about 10 to 95 mole percent, preferably 20 to 90 mole percent, more preferably 30 to 75 mole percent, most preferably 45 to 65 mole percent of a cationic vinyl addition monomer; from about 5 to 90 mole percent of a non-ionic vinyl addition monomer; preferably 10 to 80 mole percent from about 60 ppm to 450 ppm of the composition of a cross-linking agent comprising three or more ethylenic functions; 0 to 10,000 ppm, preferably 75 ppm to 400 ppm, of a chain transfer agent; said polymer having a viscosity slope of from about 3.5 to about 12;

b.) a first polymer and a second polymer, said first polymer being derived from the polymerization of from about 10 to 95 mole percent, preferably 20 to 90 mole percent more preferably 30 to 75 mole percent, most preferably 45 to 65 mole percent of a cationic vinyl addition monomer; from about 5 to 90 mole percent, preferably 10 to 80 mole percent, of a non-ionic vinyl addition monomer; from about 60 ppm to 1,900 ppm of a cross-linking agent comprising three or more ethylenic functions; 0 ppm to about 10,000 ppm, preferably 75 ppm to 1,800 ppm, of a chain transfer agent; preferably said first polymer has a viscosity slope >3.7 said second polymer being derived from the polymerization of from about 10 to 95 mole percent, preferably 20 to 90 mole percent more preferably 30 to 75 mole percent, most preferably 45 to 65 mole percent of a cationic vinyl addition monomer; preferably 20 to 90 mole percent from about 5 to 90 mole percent, preferably 10 ppm to 80 mole percent, of a non-ionic vinyl addition monomer; from about 0 ppm to 40 ppm, preferably 0 ppm to 20 ppm, of a cross-linking agent comprising two or more ethylenic functions; 0 ppm to about 10,000 ppm chain transfer agent; preferably said second polymer has a viscosity slope <3.7;

c.) a first polymer and a second polymer, said first polymer being derived from the polymerization of from about 10 to 95 mole percent, preferably 20 to 90 mole percent more preferably 30 to 75 mole percent, most preferably 45 to 65 mole percent of a cationic vinyl addition monomer; from about 5 to 90 mole percent, preferably 10 mole percent to 80 mole percent, of a non-ionic vinyl addition monomer; from about 325 ppm to 1,900 ppm, preferably 350 ppm to 1,800 ppm, of a cross-linking agent comprising two or more ethylenic functions; 0 ppm to about 10,000 ppm chain transfer agent; preferably said first polymer has a viscosity slope >3.7;

said second polymer being derived from the polymerization of from about 10 to 95 mole percent, preferably 20 to 90 mole percent more preferably 30 to 75 mole percent, most preferably 45 to 65 mole percent of a cationic vinyl addition monomer; from about 5 to 90 mole percent, preferably 10 mole to 80 mole percent, of a non-ionic vinyl addition monomer; 0 ppm to 40 ppm, preferably 0 ppm to 20 ppm, of a cross-linking agent comprising two or more ethylenic functions; 0 ppm to about 10,000 ppm chain transfer agent; preferably said second polymer has a viscosity slope <3.7;

d.) a first polymer and a second polymer, said first polymer being derived from the polymerization of from about 10 to 95 mole, preferably 20 to 90 mole percent more preferably 30 to 75 mole percent, most preferably 45 to 65 mole percent of a cationic vinyl addition monomer; from about 5 to 90 mole percent, preferably 10 mole percent to 80 mole percent, of a non-ionic vinyl addition monomer; from about 60 ppm to 1,900 ppm, preferably 75 to 1,800 ppm, of a cross-linking agent comprising two or more ethylenic functions; 0 ppm to about 10,000 ppm chain transfer agent; preferably said first polymer has a viscosity slope >3.7, with the proviso that said first polymer does not comprise an acrylamide unit;

said second polymer being derived from the polymerization of from about 10 to 95 mole percent, preferably 20 to 90 mole percent more preferably 30 to 75 mole percent, most preferably 45 to 65 mole percent of a cationic vinyl addition monomer; from about 5 to 90 mole percent, preferably 10 to 80 mole percent, of a non-ionic vinyl addition monomer; 0 ppm to 40 ppm, preferably 0 ppm to 20 ppm, of a cross-linking agent comprising two or more ethylenic functions; 0 ppm to about 10,000 ppm chain transfer agent; preferably said second polymer has a viscosity slope <3.7;

e.) a first polymer and a second polymer, said first polymer being derived from the polymerization of from about 10 to 95 mole, preferably 20 to 90 mole percent more preferably 30 to 75 mole percent, most preferably 45 to 65 mole percent of a cationic vinyl addition monomer; from about 5 to 90 mole percent, preferably 10 mole percent to 80 mole percent, of a non-ionic vinyl addition monomer; from about 55 ppm to 1,900 ppm, preferably 60 ppm to 1,800 ppm, of a cross-linking agent comprising two or more ethylenic functions; 0 ppm to about 10,000 ppm chain transfer agent; preferably said first polymer has a viscosity slope >3.7;

said second polymer being derived from the polymerization of from about 10 to 95 mole percent, preferably 20 to 90 mole percent more preferably 30 to 75 mole percent, most preferably 45 to 65 mole percent of a cationic vinyl addition monomer; from about 5 to 90 mole percent, preferably 10 mole percent to 80 mole percent, of a non-ionic vinyl addition monomer; from about 1 ppm to 40 ppm, preferably 1 ppm to 20 ppm, of a cross-linking agent comprising two or more ethylenic functions; 0 ppm to about 10,000 ppm chain transfer agent; preferably said second polymer has a viscosity slope <3.7;

f.) a first polymer and a second polymer, said first polymer being derived from the polymerization of from about 10 to 95 mole percent, preferably 20 to 90 mole percent more preferably 30 to 75 mole percent, most preferably 45 to 65 mole percent of a cationic vinyl addition monomer; from about 10 to 90 mole percent, preferably 20 to 80 mole percent, of a non-ionic vinyl addition monomer; from about 55 ppm to 1,900 ppm, preferably 60 ppm to 1,800 ppm, of a cross-linking agent comprising three or more ethylenic functions; 0 ppm to about 10,000 ppm chain transfer agent; preferably said first polymer has a viscosity slope >3.7 said second polymer being derived from the polymerization of from about 10 to 95 mole percent, preferably 20 to 90 mole percent more preferably 30 to 75 mole percent, most preferably 45 to 65 mole percent of a cationic vinyl addition monomer; from about 5 to 90 mole percent, preferably 10 to 80 mole percent, of a non-ionic vinyl addition monomer; from about 1 to 45 mole percent, preferably 1 to 40 mole percent, of an anionic vinyl addition monomer; with the proviso that the sum of the cationic vinyl addition monomer, non-ionic vinyl addition monomer, and anionic vinyl addition monomer will not exceed 100 mole percent; 0 ppm to 40 ppm, preferably 0 ppm to 20 ppm, of a cross-linking agent comprising two or more ethylenic functions; 0 ppm to about 10,000 ppm chain transfer agent; preferably said second polymer has a viscosity slope <3.7;

g.) a polymer being derived from the polymerization of from about 5 to 95 mole percent, preferably 20 to 90 mole percent more preferably 30 to 75 mole percent, most preferably 45 to 65 mole percent of a cationic vinyl addition monomer; from about 5 to 90 mole percent, preferably 10 to 80 mole percent, of a non-ionic vinyl addition monomer; from about 1 to 45 mole percent, preferably 1 to 40 mole percent, of an anionic vinyl addition monomer; with the proviso that the sum of the cationic vinyl addition monomer, non-ionic vinyl addition monomer, and anionic vinyl addition monomer will not exceed 100 mole percent; from about 55 ppm to 1,900 ppm, preferably 60 ppm to 1,800 ppm, of a cross-linking agent comprising two or more ethylenic functions; 0 ppm to about 10,000 ppm chain transfer agent; preferably said first polymer has a viscosity slope >3.7;

h.) a polymer derived from the polymerization of from about 10 to 95 mole percent, preferably 20 to 90 mole percent more preferably 30 to 75 mole percent, most preferably 45 to 65 mole percent of a cationic vinyl addition monomer; from about 5 to 90 mole percent, preferably 10 to 80 mole percent, of a non-ionic vinyl addition monomer; from about 525 ppm to 4,900 ppm, preferably 550 ppm to 4,800 ppm, of a cross-linking agent comprising two or more ethylenic functions; a weight percent water soluble fraction greater than or equal to 28 weight percent, and 0 ppm to about 10,000 ppm of a chain transfer agent.

In one aspect of said composition, said fabric softener active is selected from the group consisting of a quaternary ammonium compound, a silicone polymer, a polysaccharide, a clay, an amine, a fatty ester, a dispersible polyolefin, a polymer latex and mixtures thereof.

In one aspect of said composition:
a.) said quaternary ammonium compound comprises an alkyl quaternary ammonium compound, preferably said alkyl quaternary ammonium compound is selected from the group consisting of a monoalkyl quaternary ammonium compound, a dialkyl quaternary ammonium compound, a trialkyl quaternary ammonium compound and mixtures thereof;
b.) said silicone polymer is selected from the group consisting of cyclic silicones, polydimethylsiloxanes, aminosilicones, cationic silicones, silicone polyethers, silicone resins, silicone urethanes, and mixtures thereof;
c.) said polysaccharide comprises a cationic starch;
d.) said clay comprises a smectite clay;
e.) said dispersible polyolefin is selected from the group consisting of polyethylene, polypropylene and mixtures thereof; and
f.) said fatty ester is selected from the group consisting of a polyglycerol ester, a sucrose ester, a glycerol ester and mixtures thereof.

In one aspect of said composition, said fabric softener active comprises a material selected from the group consisting of monoesterquats, diesterquats, triesterquats, and mixtures thereof. Preferably, said monoesterquats and diesterquats are selected from the group consisting of bis-(2-hydroxypropyl)-dimethylammonium methylsulfate fatty acid ester and isomers of bis-(2-hydroxypropyl)-dimethylammonium methylsulfate fatty acid ester and/or mixtures thereof, 1,2-di(acyloxy)-3-trimethylammoniopropane chloride, N,N-bis(stearoyl-oxy-ethyl)-N,N-dimethyl ammonium chloride, N,N-bis(tallowoyl-oxy-ethyl) N,N-dimethyl ammonium chloride, N,N-bis(stearoyl-oxy-ethyl) N-(2-hydroxyethyl)-N-methyl ammonium methylsulfate, N,N-bis-(stearoyl-2-hydroxypropyl)-N,N-dimethylammonium methylsulfate, N,N-bis-(tallowoyl-2-hydroxypropyl)-N,N-dimethylammonium methylsulfate, N,N-bis-(palmitoyl-2-hydroxypropyl)-N,N-dimethylammonium methylsulfate, N,N-bis-(stearoyl-2-hydroxypropyl)-N,N-dimethylammonium chloride, 1,2-di-(stearoyl-oxy)-3-trimethyl ammoniumpropane chloride, dicanoladimethylammonium chloride, di(hard)tallowdimethylammonium chloride, dicanoladimethylammonium methylsulfate, 1-methyl-1-stearoylamidoethyl-2-stearoylimidazolinium methylsulfate, 1-tallowylamidoethyl-2-tallowylimidazoline, dipalmylmethyl hydroxyethylammoinum methylsulfate and mixtures thereof.

In one aspect of said composition, said fabric softening active has an Iodine Value of between 0-140, preferably 5-100, more preferably 10-80, even more preferably 15-70, even more preferably 18-60, most preferably 18-25. When partially hydrogenated fatty acid quaternary ammonium compound softener is used, most preferably range is 25-60.

In one aspect of said composition, said composition comprising a quaternary ammonium compound and a silicone polymer, preferably from about 0.001% to about 10%, from about 0.1% to about 8%, more preferably from about 0.5% to about 5%, of said silicone polymer.

In one aspect of said composition, said composition comprises, in addition to said fabric softener active, from about 0.001% to about 5%, preferably from about 0.1% to about 3%, more preferably from about 0.2% to about 2% of a stabilizer that comprises a alkyl quaternary ammonium compound, preferably said alkyl quaternary ammonium compound comprises a material selected from the group consisting of a monoalkyl quaternary ammonium compound, a dialkyl quaternary ammonium compound, a trialkyl quaternary ammonium compound and mixtures thereof, more preferably said alkyl quaternary ammonium compound comprises a monoalkyl quaternary ammonium compound and/or di-alkyl quaternary ammonium compound.

In one aspect of said composition, said polymer is derived from
a.) a monomer selected from the group consisting of
(i) a cationic monomer according to formula (I):

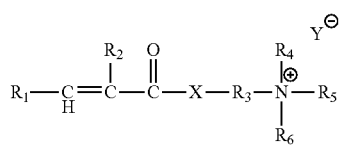

(I)

wherein:
$R_1$ is chosen from hydrogen, or $C_1$-$C_4$ alkyl;
$R_2$ is chosen from hydrogen or methyl;
$R_3$ is chosen from $C_1$-$C_4$ alkylene;
$R_4$, $R_5$, and $R_6$ are each independently chosen from hydrogen, $C_1$-$C_4$ alkyl, $C_1$-$C_4$ alkyl alcohol or $C_1$-$C_4$ alkoxy;
X is chosen from —O—, or —NH—; and
Y is chosen from Cl, Br, I, hydrogensulfate or methylsulfate,
(ii) a non-ionic monomer having formula (II)

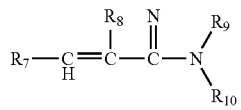

(II)

wherein:
$R_7$ is chosen from hydrogen or $C_1$-$C_4$ alkyl;
$R_8$ is chosen from hydrogen or methyl;
$R_9$ and $R_{10}$ are each independently chosen from hydrogen, $C_1$-$C_{30}$ alkyl, $C_1$-$C_4$ alkyl alcohol or $C_1$-$C_4$ alkoxy,
(iii) an anionic monomer selected from the group consisting of acrylic acid, methacrylic acid, itaconic acid, crotonic acid, maleic acid, fumaric acid, as well as monomers performing a sulfonic acid or phosphonic acid functions, such as 2-acrylamido-2-methyl propane sulfonic acid, and their salts.
b.) wherein said cross-linking agent selected from the group consisting of methylene bisacrylamide, ethylene glycol diacrylate, polyethylene glycol dimethacrylate, diacryamide, triallylamine, cyanomethylacrylate, vinyl oxyethylacrylate or methacrylate and formaldehyde, glyoxal, divinylbenzene, tetraallylammonium chloride, allyl acrylates, allyl methacrylates, diacrylates and dimethacrylates of glycols or polyglycols, butadiene, 1,7-octadiene, allylacrylamides or allylmethacrylamides, bisacrylamidoacetic acid, N,N'-methylenebisacrylamide or polyol polyallyl ethers, pentaerythrityl triacrylate, pentaerythrityl tetraacrylate, 1,1,1-trimethylolpropane tri(meth)acrylate; and tri- and tetramethacrylates of polyglycols; or polyol polyallyl ethers such as polyallyl sucrose or pentaerythritol triallyl ether, ditrimethylolpropane tetraacrylate, pentaerythrityl tetraacrylate ethoxylate, pentaerythrityl tetramethacrylate, pentaerythrityl triacrylate ethoxylate, triethanolamine trimethacrylate, 1,1,1-trimethylolpropane triacrylate, 1,1,1-trimethylolpropane triacrylate ethoxylate, trimethylolpropane tris(polyethylene glycol ether) triacrylate, 1,1,1-trimethylolpropane trimethacrylate, tris-(2-hydroxyethyl)-1,3,5-triazine-2,4,6-trione triacrylate, tris-(2-hydroxyethyl)-1,3,5-triazine-2,4,6-trione trimethacrylate, dipentaerythrityl pentaacrylate, 3-(3-{[dimethyl-(vinyl)-silyl]-oxy}-1,1,5,5-tetramethyl-1,5-divinyl-3-trisiloxanyl)-propyl methacrylate, dipentaerythritol hexaacrylate, 1-(2-propenyloxy)-2,2-bis[(2-propenyloxy)-methyl]-butane, trimethacrylic acid-1,3,5-triazin-2,4,6-triyltri-2,1-ethandiyl ester, glycerine triacrylate, propoxylated, 1,3,5-triacryloylhexahydro-1,3,5-triazine, 1,3-dimethyl-1,1,3,3-tetravinyldisiloxane, pentaerythrityl tetravinyl ether, 1,3-dimethyl-1,1,3,3-tetravinyldisiloxane, (Ethoxy)-trivinylsilane, (Methyl)-trivinylsilane, 1,1,3,5,5-pentamethyl-1,3,5-trivinyltrisiloxane, 1,3,5-trimethyl-1,3,5-trivinylcyclotrisilazane, 2,4,6-trimethyl-2,4,6-trivinylcyclotrisiloxane, 1,3,5-trimethyl-1,3,5-trivinyltrisilazane, tris-(2-butanone oxime)-vinylsilane, 1,2,4-trivinylcyclohexane, trivinylphosphine, trivinylsilane, methyltriallylsilane, pentaerythrityl triallyl ether, phenyltriallylsilane, triallylamine, triallyl citrate, triallyl phosphate, triallylphosphine, triallyl phosphite, triallylsilane, 1,3,5-triallyl-1,3,5-triazine-2,4,6(1H,3H,5H)-trione, trimellitic acid triallyl ester, trimethallyl isocyanurate, 2,4,6-tris-(allyloxy)-1,3,5-triazine, 1,2-Bis-(diallylamino)-ethane, pentaerythrityl tetratallate, 1,3,5,7-tetravinyl-1,3,5,7-tetramethylcyclotetrasiloxane, 1,3,5,7-tetravinyl-1,3,5,7-tetramethylcyclotetrasiloxane, tris-[2-acryloyloxy)-ethyl]-phosphate, vinylboronic anhydride pyridine, 2,4,6-trivinylcyclotriboroxanepyridine, tetraallylsilane, tetraallyloxysilane, 1,3,5,7-tetramethyl-1,3,5,7-tetravinylcyclotetrasilazane the ethoxylated compounds thereof and mixtures there of
c.) wherein said chain transfer agent is selected from the group consisting of mercaptanes, malic acid, lactic acid, formic acid, isopropanol and hypophosphites, and mixtures thereof.

In one aspect of said composition, said the cationic monomers are selected from the group consisting of methyl chloride quaternized dimethyl aminoethylammonium acrylate, methyl chloride quaternized dimethyl aminoethylammonium methacrylate and mixtures thereof, and the non-ionic monomers are selected from the group consisting of acrylamide, dimethyl acrylamide and mixtures thereof.

In one aspect of said composition, said composition has a Brookfield viscosity of from about 20 cps to about 1000 cps, preferably from 30 cps to about 500 cps, and most preferably 40 cps to about 300 cps.

In one aspect of said composition, said composition comprises an adjunct material selected from the group consisting of surfactants, builders, chelating agents, dye transfer inhibiting agents, dispersants, enzymes, and enzyme stabilizers, catalytic materials, bleach activators, hydrogen peroxide, sources of hydrogen peroxide, preformed peracids, polymeric dispersing agents, clay soil removal/anti-redeposition agents, brighteners, suds suppressors, dyes, hueing dyes, perfumes, perfume delivery systems, structure elasticizing agents, carriers, structurants, hydrotropes, processing aids, solvents and/or pigments and mixtures thereof.

In one aspect of said composition, said composition comprises perfume and/or a perfume delivery system, preferably said perfume delivery system comprises perfume microcapsules, preferably said perfume microcapsules comprises a cationic coating.

In one aspect of said composition, said composition comprises one or more types of perfume microcapsules.

In one aspect of said composition, said composition has a pH from about 2 to about 4, preferably from about 2.4 to about 3.6.

In one aspect the viscosity slope of any of the embodiments of Applicants' compositions that are claimed and/or disclosed is determined using Viscosity Slope Method 1, preferably viscosity slope of any of the embodiments of Applicants' compositions that are claimed and/or disclosed is determined using Viscosity Slope Method 2.

The First and Second Polymer

Applicants recognized that traditional polymer architecture can be a source of finished product stability and dosage problems. While not being bound by theory, Applicants believe the proper selection of one or more polymers yields a stable colloidal glass comprised of linear polymers capable of entangling and crosslinked polymers that generally cannot entangle. The aforementioned polymers enable the colloidal glass formation, as the crosslinked polymers' interactions provide stability while the linear polymers interaction with the crosslinked polymers allows for the desired benefit agent deposition. Thus, fabric treatment compositions comprising such particles have a surprising combination of stability and active deposition efficiency. Such treatment compositions provide benefits such as fabric feel, antistatic, and freshness.

Here, Applicants recognized that further benefit improvements were needed, such as fabric feel (e.g., softness) and freshness; however, one approach of formulating higher and higher levels of Polymer 1 could lead to unwanted changes to full product (FP) rheology, such as viscosity growth which could lead to increased product residue or modified aesthetics. Applicants also recognized that increasing levels of Polymer 1 tended to decrease freshness. While not being bound by theory, Applicants believe the higher level of Polymer 1 can suppress the release of perfume from the situs (e.g., cotton terry), especially when higher level of Polymer 1 is combined with relatively high levels of softening actives. The Applicants recognized that the judicious selection of Polymer 2 will achieve the desired benefits. The proper selection of Polymer 2 includes the selection of polymer architectural parameters, such as monomers, charge density, lack of cross-linking and molecular weight. The Applicants recognized that obtaining the desired increase in benefits (e.g., freshness) requires the selection of individual and combined polymer levels, the ratio of Polymer 1 to Polymer 2, and level of softening actives when the other selections are taken into account. While not being bound by theory, Applicants believe that the mass of material that will be delivered to a fabric by a fabric softener along with residual detergent materials on the fabric should be taken into account when designing a fabric softener.

Applicants found that selection of Polymer 2 to maximize benefits, such as freshness, could result in a return of stability problems addressed by the selection criteria for Polymer 1. The Applicants discovered a solution to this problem by also selecting Polymer 1 with a preferred viscosity slope (VS) value.

Polymer 1 Level

The level of Polymer 1 in finished product (FP) is selected to achieve the desired properties of the FP, which include but are not limited to FP with preferred a) phase stability, b) rheology, c) freshness benefit and d) softness benefit. Without wishing to be bound by theory, the preferred level of Polymer 1 is necessary to provide structure to the finished product. Such structure enables for example particle-based benefit actives (e.g., perfume microcapsules (PMC)) to be suspended in the FP. In addition, a preferred level of Polymer 1 minimizes the risk of product instability, which can be manifested in phase splitting, which can lead to poor product aesthetics and uneven distribution of benefit actives. In addition, Polymer 1 can improve the deposition of benefit actives, leading to improved freshness and softness. Such deposition improvement can involve carry-over anionic surfactant from the wash to form flocculates that lead to improved fabric deposition of benefit actives. The selection of Polymer 1 as described in the present inventions provides for a preferred FP viscosity slope (VS). It has surprisingly been found that preferred VS values enable improved FP phase stability, including when Polymer 1 is combined with Polymer 2.

A preferred level of Polymer 1 is from about 0.01% to about 1%, preferably from about 0.02% to about 0.5%, more preferably from about 0.03% to about 0.2%, even more preferably from about 0.06% to about 0.1%. However, in one aspect when the softener active level is less than 5% by weight of FP, a preferred level of Polymer 1 is from about 0.01% to about 1%, preferably from about 0.02% to about 0.5%.

Polymer 2 Level

The level of Polymer 2 in finished product (FP) is selected to achieve the desired properties of the FP, which include but are not limited to FP with preferred a) phase stability, b) rheology, c) freshness benefit and d) softness benefit. Without wishing to be bound by theory, the preferred level of Polymer 2 minimizes the risk of high levels of Polymer 1 causing unwanted FP viscosity growth, which can lead to changes in product aesthetics and/or difficulty in FP pouring, dispensing and/or dispersion. Without wishing to be bound by theory, Polymer 2 can improve perfume system efficiency by enhancing perfume release to the headspace above the fabric, resulting in greater scent intensity and noticeability. The lower molecular weight and lower degree of cross-linking of Polymer 2 in comparison to Polymer 1 is necessary to enabling the improved release of perfume from the situs and/or from the perfume delivery technology (e.g., PMC). In addition, the preferred amount of Polymer 2 alone in the compositions of the present invention enables improved freshness. Selecting too low a concentration of polymer can yield minimal benefits, whereas too high a concentration of polymer can also reduce benefits. Without being bound by theory, it is believed that too much polymer leads to suppression of perfume release, in which perfume is not released in a timely manner, leading to lower intensity and inefficient and cost ineffective perfume formulations.

A preferred level of Polymer 2 is from about 0.01% to about 1%, preferably from about 0.02% to about 0.5%, more preferably from about 0.04% to about 0.3%, even more preferably from about 0.06% to about 0.2%.

Total Level of Polymer 1 and Polymer 2

The total level of Polymer 1 and Polymer 2 in finished product (FP) is selected to achieve the desired properties of the FP, which include those described for Polymer 1 and Polymer 2 above. Selecting too low a concentration of polymer can yield minimal benefits, whereas too high a concentration of polymer can also reduce benefits. Without being bound by theory, it is believed that too much polymer leads to suppression of perfume release, in which perfume is not released in a timely manner, leading to lower intensity and inefficient and cost ineffective perfume formulations.

A preferred total level of Polymer 1 and Polymer 2 is from about 0.01% to about 1%, preferably from about 0.05% to about 0.75%, more preferably from about 0.075% to about 0.5%, more preferably from about 0.075% to about 0.4%, even more preferably from about 0.06% to about 0.3%.

Ratio of Polymer 1 to Polymer 2

The ratio of Polymer 1 to Polymer 2 in finished product (FP) is selected to achieve the desired properties of the FP, which include those described for Polymer 1 and Polymer 2 above. It was surprisingly found that selecting too high a ratio of Polymer 1 to Polymer 2 reduces the freshness benefit, whereas selecting too low a ratio of Polymer 1 to Polymer 2 results in poor FP stability. For example, in one embodiment the ratio of Polymer 1 to Polymer 2 is from about 1:5 to about 10:1, preferably, about 1:2 to about 5:1, even more preferably about 1:1 to about 3:1, most preferably from about 3:2 to 5:1.

In some embodiments of the present invention, the freshness benefit is reduced when the ratio of Polymer 1 to Polymer 2 is 100:1 or less (i.e., nil Polymer 2), and is also reduced when the ratio of Polymer 1 to Polymer 2 is 1:1. One such embodiment is when the total level of Polymer 1 and Polymer 2 in the composition of the present invention is from about 0.06% to about 0.3%.

Polymer 2 Molecular Weight

In another aspect, the polymer comprises a Weight Average Molecular Weight (Mw) from about 5,000 Daltons to about 1,000,000 Daltons, preferably from about 10,000 Daltons to about 1,000,000 Daltons, more preferably from about 25,000 Daltons to about 600,000 Daltons, more preferably from about 50,000 Daltons to about 450,000 Daltons, more preferably from about 100,000 Daltons to about 350,000 Daltons, most preferably from about 150,000 Daltons to about 350,000 Daltons; in other aspect from about 25,000 Daltons to about 150,000 Daltons.

The molecular weight can also be correlated to the k value of the polymer. In one aspect the k value is from about 10 to 100, preferably from about 15 to 60, preferably from about 20 to 60, more preferably from about 20 to 55, more preferably from about 25 to 55, more preferably from about 25 to 45, most preferably from 30 to 45; in other aspect the k value is from about 15 to 30.

Polymer 1 Molecular Weight

In another aspect, Polymer 1 comprises a Weight Average Molecular Weight (Mw) from about 500,000 Daltons to about 15,000,000 Daltons, preferably from about 1,000,000 Daltons to about 6,0000,000 Daltons, more preferably from about 2,000,000 to 4,000,000.

In another embodiment, when Polymer 1 is cross-linked with one or more cross-linking agents, Polymer 1 may consist of a mixture of polymers with different degrees of cross-linking, including polymers that are highly cross-linked and polymer that are essentially non-cross-linked. Without being bound by theory, cross-linked polymers are more water insoluble, whereas non-cross-linked polymers are more water soluble. In one embodiment, Polymer 1 consists of a fraction of water soluble (non-cross-linked) and a fraction of water insoluble (cross-linked) polymers. In one embodiment, Polymer 1 has a weight percent water soluble fraction of from about 0.1% to 80%, preferably from about 1% to 60%, more preferably from 10% to 40%, most preferably from 25% to 35%. In another embodiment, Polymer 1 has a weight percent water soluble fraction of from 5% to 25%. Without being bound by theory, the Weight Average Molecular Weights (Mw) of the soluble and insoluble fractions of Polymer 1 are similar (i.e., both are within the Mw range for Polymer 1).

In still another embodiment, Polymer 1 comprises a Weight Average Molecular Weight (Mw) from about 5 times to about 100 times the Weight Average Molecular Weight (Mw) of Polymer 2, preferably from about 10 times to about 50 times, more preferably from about 20 times to about 40 times, wherein Polymer 2 comprises a Weight Average Molecular Weight (Mw) from about 50,000 Daltons to about 150,000 Daltons.

In one aspect, Applicants disclose a composition comprising, based upon total composition weight:
a. Polymer 1 with a Weight Average Molecular Weight (Mw) from about 500,000 Daltons to about 15,0000,000 Daltons, preferably from about 1,000,000 to about 6,000,000 Daltons.
b. Optionally, Polymer 1 has a weight percent water soluble fraction of from about 1% to about 60%.
c. Polymer 1 is present in the composition from about 0.01% to about 0.5%, preferably from about 0.03% to about 0.2%.
d. Polymer 2 has a Weight Average Molecular Weight (Mw) from about 5,000 Daltons to about 500,000 Daltons, preferably from about 10,000 Daltons to about 500,000 Daltons, preferably from about 25,000 to 350,000, most preferably from about 50,000 to about 250,000 Daltons. Alternatively, Polymer 2 may have a K value of from about 15 to 100, preferably from about 20 to 60, more preferably from about 30 to 45.
e. Polymer 2 is present in the composition from about 0.01 to about 0.5%, preferably from about 0.03% to about 0.3%.
f. Optionally, the weight ratio of Polymer 1 to Polymer 2 is from about 1:5 to about 5:1, preferably from about 1:3 to about 3:1.
g. Optionally, a weight ratio of fabric softener active from about 3 percent to about 13 weight percent, more preferably from about 5 to about 10 weight percent, most preferably from about 7 to about 9 weight percent.

Preferably said composition has a Brookfield viscosity of from about 20 cps to about 1000 cps, preferably from about 30 cps to about 500 cps, more preferably from about 40 cps to about 300 cps, most preferably from about 50 cps to about 150 cps.

Polymer 1 and Polymer 2 Viscosity Slope

Preferably said first polymer and said second polymer when combined have a viscosity slope of greater than or equal to 3, preferably greater than or equal to 3.8, more preferably from about 4.0 to about 12, even more preferably from about 4.0 to about 6.0 or from about 4.0 to about 5.0.

Suitable Fabric Softening Actives

The fluid fabric enhancer compositions disclosed herein comprise a fabric softening active ("FSA"). Suitable fabric softening actives, include, but are not limited to, materials selected from the group consisting of quaternary ammonium compounds, amines, fatty esters, sucrose esters, silicones, dispersible polyolefins, clays, polysaccharides, fatty acids, softening oils, polymer latexes and mixtures thereof.

Non-limiting examples of water insoluble fabric care benefit agents include dispersible polyethylene and polymer latexes. These agents can be in the form of emulsions, latexes, dispersions, suspensions, and the like. In one aspect, they are in the form of an emulsion or a latex. Dispersible polyethylenes and polymer latexes can have a wide range of particle size diameters ($\chi_{50}$) including but not limited to from about 1 nm to about 100 µm; alternatively from about 10 nm to about 10 µm. As such, the particle sizes of dispersible polyethylenes and polymer latexes are generally, but without limitation, smaller than silicones or other fatty oils.

Generally, any surfactant suitable for making polymer emulsions or emulsion polymerizations of polymer latexes can be used to make the water insoluble fabric care benefit agents of the present invention. Suitable surfactants consist of emulsifiers for polymer emulsions and latexes, dispersing agents for polymer dispersions and suspension agents for polymer suspensions. Suitable surfactants include anionic, cationic, and nonionic surfactants, or combinations thereof. In one aspect, such surfactants are nonionic and/or anionic surfactants. In one aspect, the ratio of surfactant to polymer in the water insoluble fabric care benefit agent is about 1:100 to about 1:2; alternatively from about 1:50 to about 1:5, respectively. Suitable water insoluble fabric care benefit agents include but are not limited to the examples described below.

Quats—Suitable quats include but are not limited to, materials selected from the group consisting of ester quats, amide quats, imidazoline quats, alkyl quats, amidoester quats and mixtures thereof. Suitable ester quats include but are not limited to, materials selected from the group consisting of monoester quats, diester quats, triester quats and mixtures thereof. In one aspect, a suitable ester quat is bis-(2-hydroxypropyl)-dimethylammonium methylsulfate fatty acid ester having a molar ratio of fatty acid moieties to amine moieties of from 1.85 to 1.99, an average chain length of the fatty acid moieties of from 16 to 18 carbon atoms and an iodine value of the fatty acid moieties, calculated for the free fatty acid, which has an Iodine Value of between 0-140, preferably 5-100, more preferably 10-80, even more preferably 15-70, even more preferably 18-55, most preferably 18-25. When a soft tallow quaternary ammonium compound softener is used, most preferably range is 25-60. In one aspect, the cis-trans-ratio of double bonds of unsaturated fatty acid moieties of the bis (2 hydroxypropyl)-dimethyl-ammonium methylsulfate fatty acid ester is from 55:45 to 75:25, respectively. Suitable amide quats include but are not limited to, materials selected from the group consisting of monoamide quats, diamide quats and mixtures thereof. Suitable alkyl quats include but are not limited to, materials selected from the group consisting of mono alkyl quats, dialkyl quats quats, trialkyl quats, tetraalkyl quats and mixtures thereof.

Amines—Suitable amines include but are not limited to, materials selected from the group consisting of ami-doesteramines, amidoamines, imidazoline amines, alkyl amines, amidoester amines and mixtures thereof. Suitable ester amines include but are not limited to, materials selected from the group consisting of monoester amines, diester amines, triester amines and mixtures thereof. Suitable amido quats include but are not limited to, materials selected from the group consisting of monoamido amines, diamido amines and mixtures thereof. Suitable alkyl amines include but are not limited to, materials selected from the group consisting of mono alkylamines, dialkyl amines quats, trialkyl amines, and mixtures thereof.

In one embodiment, the fabric softening active is a quaternary ammonium compound suitable for softening fabric in a rinse step. In one embodiment, the fabric softening active is formed from a reaction product of a fatty acid and an aminoalcohol obtaining mixtures of mono-, di-, and in one embodiment, tri-ester compounds. In another embodiment, the fabric softening active comprises one or more softener quaternary ammonium compounds such, but not limited to, as a monoalkyquaternary ammonium compound, dialkylquaternary ammonium compound, a diamido quaternary compound, a diester quaternary ammonium compound, or a combination thereof.

In one aspect, the fabric softening active comprises a diester quaternary ammonium or protonated diester ammo-nium (hereinafter "DQA") compound composition. In certain embodiments of the present invention, the DQA compound compositions also encompass diamido fabric softening actives and fabric softening actives with mixed amido and ester linkages as well as the aforementioned diester linkages, all herein referred to as DQA.

In one aspect, said fabric softening active may comprise, as the principal active, compounds of the following formula:

$$\{R_{4-m}-N^+-[X-Y-R^1]_m\}X^- \qquad (1)$$

wherein each R comprises either hydrogen, a short chain $C_1$-$C_6$, in one aspect a $C_1$-$C_3$ alkyl or hydroxyalkyl group, for example methyl, ethyl, propyl, hydroxyethyl, and the like, poly($C_{2-3}$ alkoxy), polyethoxy, benzyl, or mixtures thereof; each X is independently $(CH_2)n$, $CH_2$—CH($CH_3$)— or CH—($CH_3$)—$CH_2$—; each Y may comprise —O—(O)C—, —C(O)—O—, —NR—C(O)—, or —C(O)—NR—; each m is 2 or 3; each n is from 1 to about 4, in one aspect 2; the sum of carbons in each $R^1$, plus one when Y is —O—(O)C— or —NR—C(O)—, may be $C_{12}$-$C_{22}$, or $C_{14}$-$C_{20}$, with each $R^1$ being a hydrocarbyl, or substituted hydrocarbyl group; and $X^-$ may comprise any softener-compatible anion. In one aspect, the softener-compatible anion may comprise chloride, bromide, methylsulfate, ethylsulfate, sulfate, and nitrate. In another aspect, the softener-compatible anion may comprise chloride or methyl sulfate.

In another aspect, the fabric softening active may comprise the general formula:

$$[R_3N^+CH_2CH(YR^1)(CH_2YR^1)]X^-$$

wherein each Y, R, $R^1$, and $X^-$ have the same meanings as before. Such compounds include those having the formula:

$$[CH_3]_3N^{(+)}[CH_2CH(CH_2O(O)CR^1)O(O)CR^1]Cl^{(-)} \qquad (2)$$

wherein each R may comprise a methyl or ethyl group. In one aspect, each $R^1$ may comprise a $C_{15}$ to $C_{19}$ group. As used herein, when the diester is specified, it can include the monoester that is present.

These types of agents and general methods of making them are disclosed in U.S. Pat. No. 4,137,180. An example of a suitable DEQA (2) is the "propyl" ester quaternary ammonium fabric softener active comprising the formula 1,2-di(acyloxy)-3-trimethylammoniopropane chloride.

A third type of useful fabric softening active has the formula:

$$[R_{4-m}-N^+-R^1_m]X^- \qquad (3)$$

wherein each R, $R^1$, m and $X^-$ have the same meanings as before.

In a further aspect, the fabric softening active may comprise the formula:

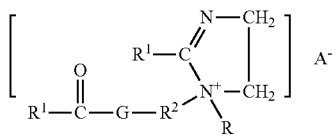
(4)

wherein each R, $R^1$, and $A^-$ have the definitions given above; $R^2$ may comprise a $C_{1-6}$ alkylene group, in one aspect an ethylene group; and G may comprise an oxygen atom or an —NR— group;

In a yet further aspect, the fabric softening active may comprise the formula:

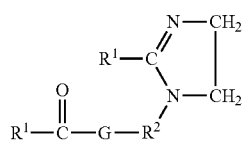
(5)

wherein $R^1$, $R^2$ and G are defined as above.

In a further aspect, the fabric softening active may comprise condensation reaction products of fatty acids with dialkylenetriamines in, e.g., a molecular ratio of about 2:1, said reaction products containing compounds of the formula:

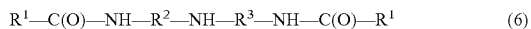
(6)

wherein $R^1$, $R^2$ are defined as above, and $R^3$ may comprise a $C_{1-6}$ alkylene group, in one aspect, an ethylene group and wherein the reaction products may optionally be quaternized by the additional of an alkylating agent such as dimethyl sulfate. Such quaternized reaction products are described in additional detail in U.S. Pat. No. 5,296,622.

In a yet further aspect, the fabric softening active may comprise the formula:

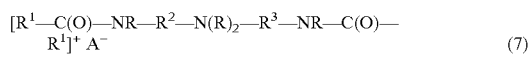
(7)

wherein R, $R^1$, $R^2$, $R^3$ and $A^-$ are defined as above;

In a yet further aspect, the fabric softening active may comprise reaction products of fatty acid with hydroxyalkylalkylenediamines in a molecular ratio of about 2:1, said reaction products containing compounds of the formula:

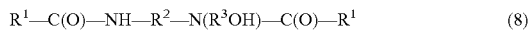
(8)

wherein $R^1$, $R^2$ and $R^3$ are defined as above;

In a yet further aspect, the fabric softening active may comprise the formula:

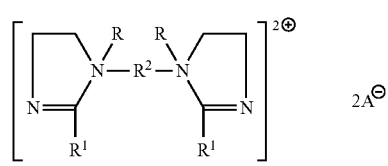
(9)

wherein R, $R^1$, $R^2$, and $A^-$ are defined as above.

In yet a further aspect, the fabric softening active may comprise the formula:

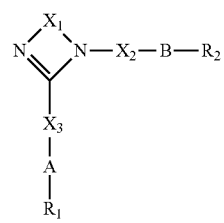
(10)

wherein;
$X_1$ is a $C_{2-3}$ alkyl group, in one aspect, an ethyl group;
$X_2$ and $X_3$ are independently $C_{1-6}$ linear or branched alkyl or alkenyl groups, in one aspect, methyl, ethyl or isopropyl groups;
$R_1$ and $R_2$ are independently $C_{8-22}$ linear or branched alkyl or alkenyl groups; characterized in that;
A and B are independently selected from the group comprising —O—(C=O)—, —(C=O)—O—, or mixtures thereof, in one aspect, —O—(C=O)—

Non-limiting examples of fabric softening actives comprising formula (1) are N,N-bis(stearoyl-oxy-ethyl)-N,N-dimethylammonium chloride, N,N-bis(tallowoyl-oxy-ethyl)-N,N-dimethylammonium chloride, N,N-bis(stearoyl-oxy-ethyl)-N-(2 hydroxyethyl)-N-methylammonium methylsulfate.

Non-limiting examples of fabric softening actives comprising formula (2) is 1,2-di-(stearoyl-oxy)-3-trimethyl ammoniumpropane chloride.

Non-limiting examples of fabric softening actives comprising formula (3) include dialkylenedimethylammonium salts such as dicanoladimethylammonium chloride, di(hard) tallowdimethylammonium chloride, dicanoladimethylammonium methylsulfate, and mixtures thereof. An example of commercially available dialkylenedimethylammonium salts usable in the present invention is dioleyldimethylammonium chloride available from Witco Corporation under the trade name Adogen® 472 and dihardtallow dimethylammonium chloride available from Akzo Nobel Arquad 2HT75.

A non-limiting example of fabric softening actives comprising formula (4) is 1-methyl-1-stearoylamidoethyl-2-stearoylimidazolinium methylsulfate wherein $R^1$ is an acyclic aliphatic $C_{15}$-$C_{17}$ hydrocarbon group, $R^2$ is an ethylene group, G is a NH group, $R^5$ is a methyl group and $A^-$ is a methyl sulfate anion, available commercially from the Witco Corporation under the trade name Varisoft®.

A non-limiting example of fabric softening actives comprising formula (5) is 1-tallowylamidoethyl-2-tallowylimidazoline wherein $R^1$ is an acyclic aliphatic $C_{15}$-$C_{17}$ hydrocarbon group, $R^2$ is an ethylene group, and G is a NH group.

A non-limiting example of a fabric softening active comprising formula (6) is the reaction products of fatty acids with diethylenetriamine in a molecular ratio of about 2:1, said reaction product mixture containing N,N"-dialkyldiethylenetriamine with the formula:

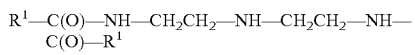

wherein $R^1$ is an alkyl group of a commercially available fatty acid derived from a vegetable or animal source, such as Emersol® 223LL or Emersol® 7021, available from Henkel Corporation, and $R^2$ and $R^3$ are divalent ethylene groups.

In one aspect, said fatty acid may be obtained, in whole or in part, from a renewable source, via extraction from plant material, fermentation from plant material, and/or obtained via genetically modified organisms such as algae or yeast.

A non-limiting example of Compound (7) is a di-fatty amidoamine based softener having the formula:

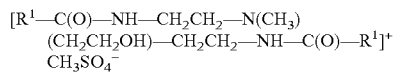

wherein $R^1$ is an alkyl group. An example of such compound is that commercially available from the Witco Corporation e.g. under the trade name Varisoft® 222LT.

An example of a fabric softening active comprising formula (8) is the reaction products of fatty acids with N-2-hydroxyethylethylenediamine in a molecular ratio of about 2:1, said reaction product mixture containing a compound of the formula:

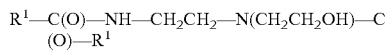

wherein $R^1$—C(O) is an alkyl group of a commercially available fatty acid derived from a vegetable or animal source, such as Emersol® 223LL or Emersol® 7021, available from Henkel Corporation.

An example of a fabric softening active comprising formula (9) is the diquaternary compound having the formula:

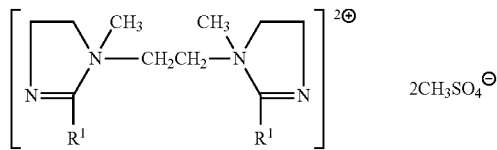

wherein $R^1$ is derived from fatty acid. Such compound is available from Witco Company.

A non-limiting example of a fabric softening active comprising formula (10) is a dialkyl imidazoline diester compound, where the compound is the reaction product of N-(2-hydroxyethyl)-1,2-ethylenediamine or N-(2-hydroxyisopropyl)-1,2-ethylenediamine with glycolic acid, esterified with fatty acid, where the fatty acid is (hydrogenated) tallow fatty acid, palm fatty acid, hydrogenated palm fatty acid, oleic acid, rapeseed fatty acid, hydrogenated rapeseed fatty acid or a mixture of the above.

It will be understood that combinations of softener actives disclosed above are suitable for use in this invention.

Anion A

In the cationic nitrogenous salts herein, the anion $A^-$, which comprises any softener compatible anion, provides electrical neutrality. Most often, the anion used to provide electrical neutrality in these salts is from a strong acid, especially a halide, such as chloride, bromide, or iodide. However, other anions can be used, such as methylsulfate, ethylsulfate, acetate, formate, sulfate, carbonate, fatty acid anions and the like. In one aspect, the anion A may comprise chloride or methylsulfate. The anion, in some aspects, may carry a double charge. In this aspect, $A^-$ represents half a group.

In one embodiment, the fabric softening agent is chosen from at least one of the following: ditallowoyloxyethyl dimethyl ammonium chloride, dihydrogenated-tallowoyloxyethyl dimethyl ammonium chloride, ditallow dimethyl ammonium chloride, dihydrogenatedtallow dimethyl ammonium chloride, ditallowoyloxyethyl methylhydroxyethylammonium methyl sulfate, dihydrogenated-tallowoyloxyethyl methyl hydroxyethylammonium chloride, or combinations thereof.

Polyssacharides

One aspect of the invention provides a fabric enhancer composition comprising a cationic starch as a fabric softening active. In one embodiment, the fabric care compositions of the present invention generally comprise cationic starch at a level of from about 0.1% to about 7%, alternatively from about 0.1% to about 5%, alternatively from about 0.3% to about 3%, and alternatively from about 0.5% to about 2.0%, by weight of the composition. Suitable cationic starches for use in the present compositions are commercially-available from Cerestar under the trade name C*BOND® and from National Starch and Chemical Company under the trade name CATO® 2A.

Sucrose Esters

Nonionic fabric care benefit agents can comprise sucrose esters, and are typically derived from sucrose and fatty acids. Sucrose ester is composed of a sucrose moiety having one or more of its hydroxyl groups esterified.

Sucrose is a disaccharide having the following formula:

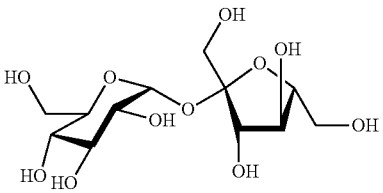

Alternatively, the sucrose molecule can be represented by the formula: $M(OH)_8$, wherein M is the disaccharide backbone and there are total of 8 hydroxyl groups in the molecule.

Thus, sucrose esters can be represented by the following formula:

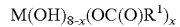

wherein x is the number of hydroxyl groups that are esterified, whereas (8-x) is the hydroxyl groups that remain unchanged; x is an integer selected from 1 to 8, alternatively from 2 to 8, alternatively from 3 to 8, or from 4 to 8; and $R^1$ moieties are independently selected from $C_1$-$C_{22}$ alkyl or $C_1$-$C_{30}$ alkoxy, linear or branched, cyclic or acyclic, saturated or unsaturated, substituted or unsubstituted.

In one embodiment, the $R^1$ moieties comprise linear alkyl or alkoxy moieties having independently selected and varying chain length. For example, $R^1$ may comprise a mixture of linear alkyl or alkoxy moieties wherein greater than about 20% of the linear chains are $C_{18}$, alternatively greater than about 50% of the linear chains are $C_{18}$, alternatively greater than about 80% of the linear chains are $C_{18}$.

In another embodiment, the $R^1$ moieties comprise a mixture of saturate and unsaturated alkyl or alkoxy moieties; the degree of unsaturation can be measured by "Iodine Value" (hereinafter referred as "IV", as measured by the standard AOCS method). The IV of the sucrose esters suitable for use herein ranges from about 1 to about 150, or from about 2 to about 100, or from about 5 to about 85. The $R^1$ moieties may be hydrogenated to reduce the degree of unsaturation. In the case where a higher IV is preferred, such as from about 40 to about 95, then oleic acid and fatty acids derived from soybean oil and canola oil are the starting materials.

In a further embodiment, the unsaturated $R^1$ moieties may comprise a mixture of "cis" and "trans" forms about the unsaturated sites. The "cis"/"trans" ratios may range from about 1:1 to about 50:1, or from about 2:1 to about 40:1, or from about 3:1 to about 30:1, or from about 4:1 to about 20:1.

Dispersible Polyolefins

Generally, all dispersible polyolefins that provide fabric care benefits can be used as water insoluble fabric care benefit agents in the present invention. The polyolefins can be in the format of waxes, emulsions, dispersions or suspensions. Non-limiting examples are discussed below.

In one embodiment, the polyolefin is chosen from a polyethylene, polypropylene, or a combination thereof. The polyolefin may be at least partially modified to contain various functional groups, such as carboxyl, alkylamide, sulfonic acid or amide groups. In another embodiment, the polyolefin is at least partially carboxyl modified or, in other words, oxidized.

For ease of formulation, the dispersible polyolefin may be introduced as a suspension or an emulsion of polyolefin dispersed by use of an emulsifying agent. The polyolefin suspension or emulsion may comprise from about 1% to about 60%, alternatively from about 10% to about 55%, alternatively from about 20% to about 50% by weight of polyolefin. The polyolefin may have a wax dropping point (see ASTM D3954-94, volume 15.04—"Standard Test Method for Dropping Point of Waxes") from about 20° to about 170° C., alternatively from about 50° to about 140° C. Suitable polyethylene waxes are available commercially from suppliers including but not limited to Honeywell (A-C polyethylene), Clariant (Velustrol® emulsion), and BASF (LUWAX®).

When an emulsion is employed with the dispersible polyolefin, the emulsifier may be any suitable emulsification agent. Non-limiting examples include an anionic, cationic, nonionic surfactant, or a combination thereof. However, almost any suitable surfactant or suspending agent may be employed as the emulsification agent. The dispersible polyolefin is dispersed by use of an emulsification agent in a ratio to polyolefin wax of about 1:100 to about 1:2, alternatively from about 1:50 to about 1:5, respectively.

Polymer Latexes

Polymer latex is made by an emulsion polymerization which includes one or more monomers, one or more emulsifiers, an initiator, and other components familiar to those of ordinary skill in the art. Generally, all polymer latexes that provide fabric care benefits can be used as water insoluble fabric care benefit agents of the present invention. Additional non-limiting examples include the monomers used in producing polymer latexes such as: (1) 100% or pure butylacrylate; (2) butylacrylate and butadiene mixtures with at least 20% (weight monomer ratio) of butylacrylate; (3) butylacrylate and less than 20% (weight monomer ratio) of other monomers excluding butadiene; (4) alkylacrylate with an alkyl carbon chain at or greater than $C_6$; (5) alkylacrylate with an alkyl carbon chain at or greater than $C_6$ and less than 50% (weight monomer ratio) of other monomers; (6) a third monomer (less than 20% weight monomer ratio) added into an aforementioned monomer systems; and (7) combinations thereof.

Polymer latexes that are suitable fabric care benefit agents in the present invention may include those having a glass transition temperature of from about −120° C. to about 120° C., alternatively from about −80° C. to about 60° C. Suitable emulsifiers include anionic, cationic, nonionic and amphoteric surfactants. Suitable initiators include initiators that are suitable for emulsion polymerization of polymer latexes. The particle size diameter ($\chi_{50}$) of the polymer latexes can be from about 1 nm to about 10 μm, alternatively from about 10 nm to about 1 μm, or even from about 10 nm to about 20 nm.

Fatty Acid

One aspect of the invention provides a fabric softening composition comprising a fatty acid, such as a free fatty acid. The term "fatty acid" is used herein in the broadest sense to include unprotonated or protonated forms of a fatty acid; and includes fatty acid that is bound or unbound to another chemical moiety as well as the various combinations of these species of fatty acid. One skilled in the art will readily appreciate that the pH of an aqueous composition will dictate, in part, whether a fatty acid is protonated or unprotonated. In another embodiment, the fatty acid is in its unprotonated, or salt form, together with a counter ion, such as, but not limited to, calcium, magnesium, sodium, potassium and the like. The term "free fatty acid" means a fatty acid that is not bound to another chemical moiety (covalently or otherwise) to another chemical moiety.

In one embodiment, the fatty acid may include those containing from about 12 to about 25, from about 13 to about 22, or even from about 16 to about 20, total carbon atoms, with the fatty moiety containing from about 10 to about 22, from about 12 to about 18, or even from about 14 (mid-cut) to about 18 carbon atoms.

The fatty acids of the present invention may be derived from (1) an animal fat, and/or a partially hydrogenated animal fat, such as beef tallow, lard, etc.; (2) a vegetable oil, and/or a partially hydrogenated vegetable oil such as canola oil, safflower oil, peanut oil, sunflower oil, sesame seed oil, rapeseed oil, cottonseed oil, corn oil, soybean oil, tall oil, rice bran oil, palm oil, palm kernel oil, coconut oil, other tropical palm oils, linseed oil, tung oil, etc.; (3) processed and/or bodied oils, such as linseed oil or tung oil via thermal, pressure, alkali-isomerization and catalytic treatments; (4) a mixture thereof, to yield saturated (e.g. stearic acid), unsaturated (e.g. oleic acid), polyunsaturated (linoleic acid), branched (e.g. isostearic acid) or cyclic (e.g. saturated or unsaturated α-disubstituted cyclopentyl or cyclohexyl derivatives of polyunsaturated acids) fatty acids.

Mixtures of fatty acids from different fat sources can be used.

In one aspect, at least a majority of the fatty acid that is present in the fabric softening composition of the present invention is unsaturated, e.g., from about 40% to 100%, from about 55% to about 99%, or even from about 60% to about 98%, by weight of the total weight of the fatty acid present in the composition, although fully saturated and partially saturated fatty acids can be used. As such, the total level of polyunsaturated fatty acids (TPU) of the total fatty acid of the inventive composition may be from about 0% to about 75% by weight of the total weight of the fatty acid present in the composition.

The cis/trans ratio for the unsaturated fatty acids may be important, with the cis/trans ratio (of the C18:1 material) being from at least about 1:1, at least about 3:1, from about 4:1 or even from about 9:1 or higher.

Branched fatty acids such as isostearic acid are also suitable since they may be more stable with respect to oxidation and the resulting degradation of color and odor quality.

The Iodine Value or "IV" measures the degree of unsaturation in the fatty acid. In one embodiment of the invention, the fatty acid has an IV from about 10 to about 140, from about 15 to about 100 or even from about 15 to about 60.

Another class of fatty ester fabric care actives is softening oils, which include but are not limited to, vegetable oils (such as soybean, sunflower, and canola), hydrocarbon based oils (natural and synthetic petroleum lubricants, in one aspect polyolefins, isoparaffins, and cyclic paraffins), triolein, fatty esters, fatty alcohols, fatty amines, fatty amides, and fatty ester amines. Oils can be combined with fatty acid softening agents, clays, and silicones.

Clays

In one embodiment of the invention, the fabric care composition may comprise a clay as a fabric care active. In one embodiment clay can be a softener or co-softeners with another softening active, for example, silicone. Suitable clays include those materials classified geologically smectites.

Silicone

In one embodiment, the fabric softening composition comprises a silicone. Suitable levels of silicone may comprise from about 0.1% to about 70%, alternatively from about 0.3% to about 40%, alternatively from about 0.5% to about 30%, alternatively from about 1% to about 20% by weight of the composition. Useful silicones can be any silicone comprising compound. In one embodiment, the silicone polymer is selected from the group consisting of cyclic silicones, polydimethylsiloxanes, aminosilicones, cationic silicones, silicone polyethers, silicone resins, silicone urethanes, and mixtures thereof. In one embodiment, the silicone is a polydialkylsilicone, alternatively a polydimethyl silicone (polydimethyl siloxane or "PDMS"), or a derivative thereof. In another embodiment, the silicone is chosen from an aminofunctional silicone, amino-polyether silicone, alkyloxylated silicone, cationic silicone, ethoxylated silicone, propoxylated silicone, ethoxylated/propoxylated silicone, quaternary silicone, or combinations thereof.

In another embodiment, the silicone may be chosen from a random or blocky organosilicone polymer having the following formula:

$$[R_1R_2R_3SiO_{1/2}]_{(j+2)}[R_4Si(X-Z)O_{2/2}]_k[R_4R_4SiO_{2/2}]_m[R_4SiO_{3/2}]_j$$

wherein:
- j is an integer from 0 to about 98; in one aspect j is an integer from 0 to about 48; in one aspect, j is 0;
- k is an integer from 0 to about 200, in one aspect k is an integer from 0 to about 50; when k=0, at least one of $R_1$, $R_2$ or $R_3$ is —X—Z;
- m is an integer from 4 to about 5,000; in one aspect m is an integer from about 10 to about 4,000; in another aspect m is an integer from about 50 to about 2,000;
- $R_1$, $R_2$ and $R_3$ are each independently selected from the group consisting of H, OH, $C_1$-$C_{32}$ alkyl, $C_1$-$C_{32}$ substituted alkyl, $C_5$-$C_{32}$ or $C_6$-$C_{32}$ aryl, $C_5$-$C_{32}$ or $C_6$-$C_{32}$ substituted aryl, $C_6$-$C_{32}$ alkylaryl, $C_6$-$C_{32}$ substituted alkylaryl, $C_1$-$C_{32}$ alkoxy, $C_1$-$C_{32}$ substituted alkoxy and X—Z;

- each $R_4$ is independently selected from the group consisting of H, OH, $C_1$-$C_{32}$ alkyl, $C_1$-$C_{32}$ substituted alkyl, $C_5$-$C_{32}$ or $C_6$-$C_{32}$ aryl, $C_5$-$C_{32}$ or $C_6$-$C_{32}$ substituted aryl, $C_6$-$C_{32}$ alkylaryl, $C_6$-$C_{32}$ substituted alkylaryl, $C_1$-$C_{32}$ alkoxy and $C_1$-$C_{32}$ substituted alkoxy;

- each X in said alkyl siloxane polymer comprises a substituted or unsubstituted divalent alkylene radical comprising 2-12 carbon atoms, in one aspect each divalent alkylene radical is independently selected from the group consisting of —$(CH_2)_s$— wherein s is an integer from about 2 to about 8, from about 2 to about 4; in one aspect, each X in said alkyl siloxane polymer comprises a substituted divalent alkylene radical selected from the group consisting of: —$CH_2CH(OH)$—$CH_2$—; —$CH_2$—$CH_2$—$CH(OH)$—; and

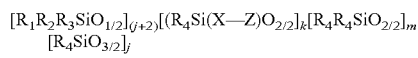

each Z is selected independently from the group consisting of

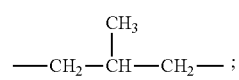

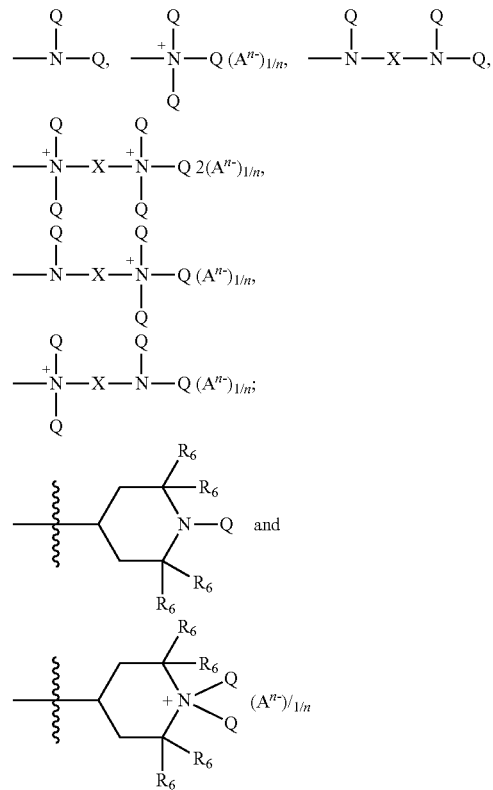

with the proviso that when Z is a quat, Q cannot be an amide, imine, or urea moiety and if Q is an amide, imine, or urea moiety, then any additional Q bonded to the same nitrogen as said amide, imine, or urea moiety must be H or a $C_1$-$C_6$ alkyl, in one aspect, said additional Q is H; for Z $A^{n-}$ is a suitable charge balancing anion. In one aspect $A^{n-}$ is selected from the group consisting of Cl⁻, Br⁻, I⁻, methylsulfate, toluene sulfonate, carboxylate and phosphate; and at least one Q in said organosilicone is independently selected from —$CH_2$—CH(OH)—$CH_2$—$R_5$;

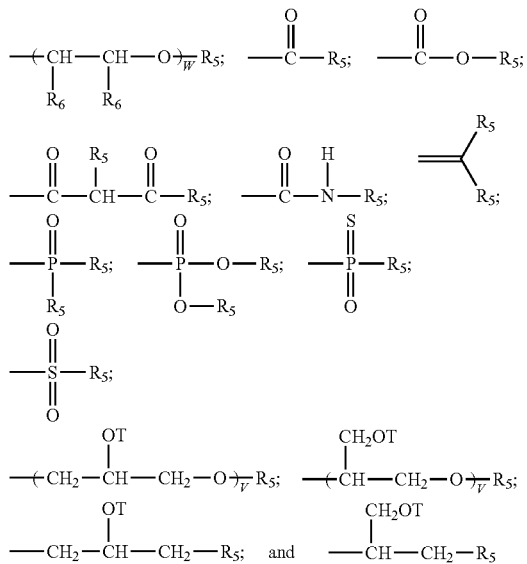

each additional Q in said organosilicone is independently selected from the group comprising of H, $C_1$-$C_{32}$ alkyl, $C_1$-$C_{32}$ substituted alkyl, $C_5$-$C_{32}$ or $C_6$-$C_{32}$ aryl, $C_5$-$C_{32}$ or $C_6$-$C_{32}$ substituted aryl, $C_6$-$C_{32}$ alkylaryl, $C_6$-$C_{32}$ substituted alkylaryl, —$CH_2$—CH(OH)—$CH_2$—$R_5$;

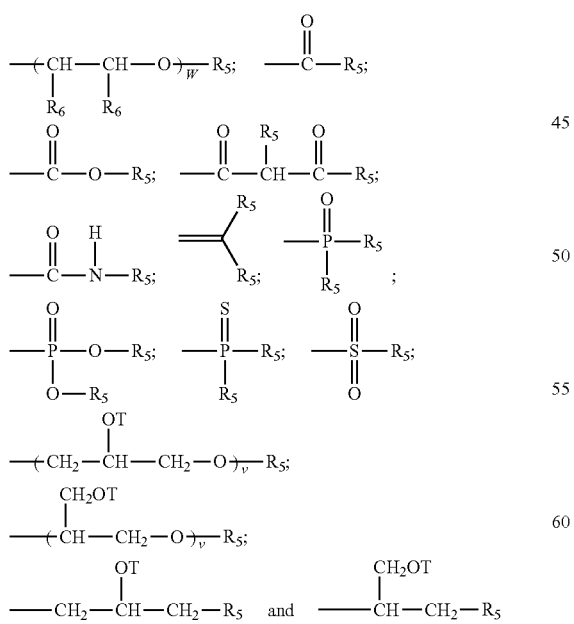

wherein each $R_5$ is independently selected from the group consisting of H, $C_1$-$C_{32}$ alkyl, $C_1$-$C_{32}$ substituted alkyl, $C_5$-$C_{32}$ or $C_6$-$C_{32}$ aryl, $C_5$-$C_{32}$ or $C_6$-$C_{32}$ substituted aryl, $C_6$-$C_{32}$ alkylaryl, $C_6$-$C_{32}$ substituted alkylaryl, —(CHR₆—CHR₆—O—)$_w$-L and a siloxyl residue;

each $R_6$ is independently selected from H, $C_1$-$C_{18}$ alkyl each L is independently selected from —C(O)—$R_7$ or $R_7$;

w is an integer from 0 to about 500, in one aspect w is an integer from about 1 to about 200; in one aspect w is an integer from about 1 to about 50;

each $R_7$ is selected independently from the group consisting of H; $C_1$-$C_{32}$ alkyl; $C_1$-$C_{32}$ substituted alkyl, $C_5$-$C_{32}$ or $C_6$-$C_{32}$ aryl, $C_5$-$C_{32}$ or $C_6$-$C_{32}$ substituted aryl, $C_6$-$C_{32}$ alkylaryl; $C_6$-$C_{32}$ substituted alkylaryl and a siloxyl residue;

each T is independently selected from H, and

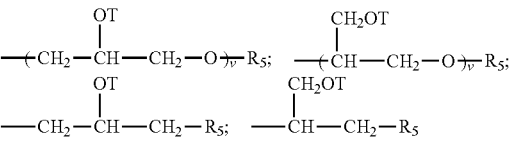

and wherein each v in said organosilicone is an integer from 1 to about 10, in one aspect, v is an integer from 1 to about 5 and the sum of all v indices in each Q in the said organosilicone is an integer from 1 to about 30 or from 1 to about 20 or even from 1 to about 10.

In another embodiment, the silicone may be chosen from a random or blocky organosilicone polymer having the following formula:

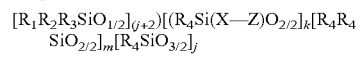

wherein j is an integer from 0 to about 98; in one aspect j is an integer from 0 to about 48; in one aspect, j is 0;

k is an integer from 0 to about 200; when k=0, at least one of $R_1$, $R_2$ or $R_3$═—X—Z, in one aspect, k is an integer from 0 to about 50 m is an integer from 4 to about 5,000; in one aspect m is an integer from about 10 to about 4,000; in another aspect m is an integer from about 50 to about 2,000;

$R_1$, $R_2$ and $R_3$ are each independently selected from the group consisting of H, OH, $C_1$-$C_{32}$ alkyl, $C_1$-$C_{32}$ substituted alkyl, $C_5$-$C_{32}$ or $C_6$-$C_{32}$ aryl, $C_5$-$C_{32}$ or $C_6$-$C_{32}$ substituted aryl, $C_6$-$C_{32}$ alkylaryl, $C_6$-$C_{32}$ substituted alkylaryl, $C_1$-$C_{32}$ alkoxy, $C_1$-$C_{32}$ substituted alkoxy and X—Z;

each $R_4$ is independently selected from the group consisting of H, OH, $C_1$-$C_{32}$ alkyl, $C_1$-$C_{32}$ substituted alkyl, $C_5$-$C_{32}$ or $C_6$-$C_{32}$ aryl, $C_5$-$C_{32}$ or $C_6$-$C_{32}$ substituted aryl, $C_6$-$C_{32}$ alkylaryl, $C_6$-$C_{32}$ substituted alkylaryl, $C_1$-$C_{32}$ alkoxy and $C_1$-$C_{32}$ substituted alkoxy;

each X comprises of a substituted or unsubstituted divalent alkylene radical comprising 2-12 carbon atoms; in one aspect each X is independently selected from the group consisting of —$(CH_2)_s$—O—; —$CH_2$—CH(OH)—$CH_2$—O—;

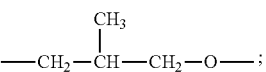

-continued

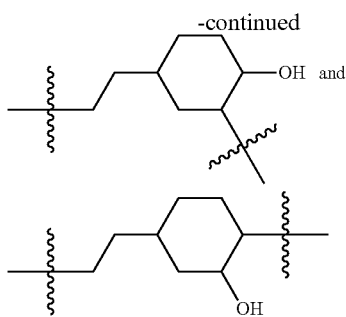

wherein each s independently is an integer from about 2 to about 8, in one aspect s is an integer from about 2 to about 4;

At least one Z in the said organosiloxane is selected from the group consisting of $R_5$;

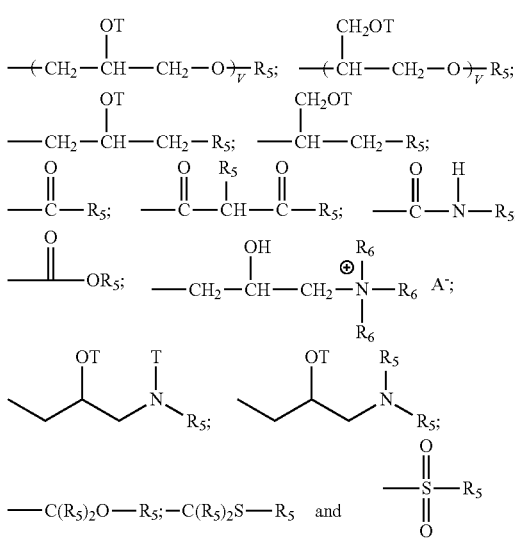

provided that when X is

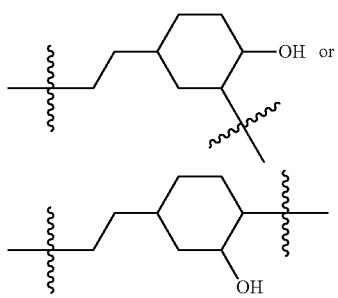

then Z=—$OR_5$ or

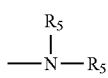

wherein $A^-$ is a suitable charge balancing anion. In one aspect $A^-$ is selected from the group consisting of $Cl^-$, $Br^-$, $I^-$, methylsulfate, toluene sulfonate, carboxylate and phosphate and each additional Z in said organosilicone is independently selected from the group comprising of H, $C_1$-$C_{32}$ alkyl, $C_1$-$C_{32}$ substituted alkyl, $C_5$-$C_{32}$ or $C_6$-$C_{32}$ aryl, $C_5$-$C_{32}$ or $C_6$-$C_{32}$ substituted aryl, $C_6$-$C_{32}$ alkylaryl, $C_6$-$C_{32}$ substituted alkylaryl, $R_5$,

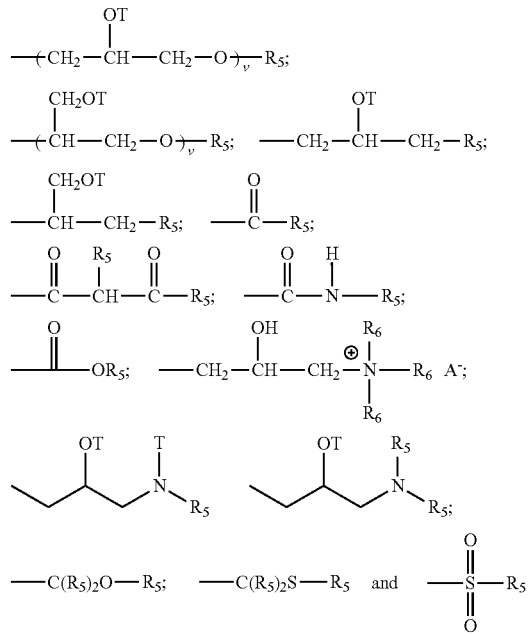

provided that when X is

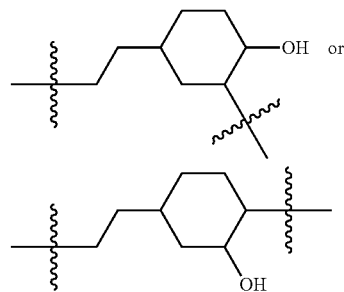

then Z=—$OR_5$ or

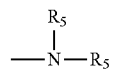

each $R_5$ is independently selected from the group consisting of H; $C_1$-$C_{32}$ alkyl; $C_1$-$C_{32}$ substituted alkyl, $C_5$-$C_{32}$ or $C_6$-$C_{32}$ aryl, $C_5$-$C_{32}$ or $C_6$-$C_{32}$ substituted aryl or $C_6$-$C_{32}$ alkylaryl, or $C_6$-$C_{32}$ substituted alkylaryl, —($CHR_6$—$CHR_6$—O—)$_w$—$CHR_6$—$CHR_6$-L and siloxyl residue wherein each L is independently selected from —O—C(O)—$R_7$ or —O—$R_7$;

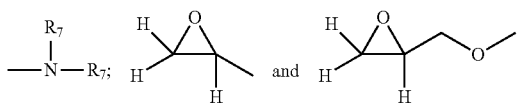

w is an integer from 0 to about 500, in one aspect w is an integer from 0 to about 200, one aspect w is an integer from 0 to about 50;

each $R_6$ is independently selected from H or $C_1$-$C_{18}$ alkyl;

each $R_7$ is independently selected from the group consisting of H; $C_1$-$C_{32}$ alkyl; $C_1$-$C_{32}$ substituted alkyl, $C_5$-$C_{32}$ or $C_6$-$C_{32}$ aryl, $C_5$-$C_{32}$ or $C_6$-$C_{32}$ substituted aryl, $C_6$-$C_{32}$ alkylaryl, and $C_6$-$C_{32}$ substituted aryl, and a siloxyl residue;

each T is independently selected from H;

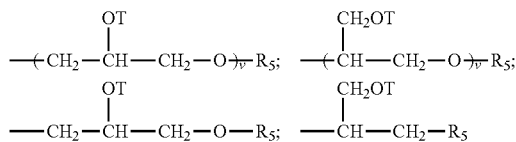

wherein each v in said organosilicone is an integer from 1 to about 10, in one aspect, v is an integer from 1 to about 5 and the sum of all v indices in each Z in the said organosilicone is an integer from 1 to about 30 or from 1 to about 20 or even from 1 to about 10.

In one embodiment, the silicone is one comprising a relatively high molecular weight. A suitable way to describe the molecular weight of a silicone includes describing its viscosity. A high molecular weight silicone is one having a viscosity of from about 10 cSt to about 3,000,000 cSt, or from about 100 cSt to about 1,000,000 cSt, or from about 1,000 cSt to about 600,000 cSt, or even from about 6,000 cSt to about 300,000 cSt.

In one embodiment, the silicone comprises a blocky cationic organopolysiloxane having the formula:

$M_w D_x T_y Q_z$ wherein:
M=[SiR$_1$R$_2$R$_3$O$_{1/2}$], [SiR$_1$R$_2$G$_1$O$_{1/2}$], [SiR$_1$G$_1$G$_2$O$_{1/2}$], [SiG$_1$G$_2$G$_3$O$_{1/2}$], or combinations thereof;
D=[SiR$_1$R$_2$O$_{2/2}$]; [SiR$_1$G$_1$O$_{2/2}$]; [SiG$_1$G$_2$O$_{2/2}$] or combinations thereof;
T=[SiR$_1$O$_{3/2}$], [SiG$_1$O$_{3/2}$] or combinations thereof;
Q=[SiO$_{4/2}$];
w=is an integer from 1 to (2+y+2z);
x=is an integer from 5 to 15,000;
y=is an integer from 0 to 98;
z=is an integer from 0 to 98;
$R_1$, $R_2$ and $R_3$ are each independently selected from the group consisting of H, OH, $C_1$-$C_{32}$ alkyl, $C_1$-$C_{32}$ substituted alkyl, $C_5$-$C_{32}$ or $C_6$-$C_{32}$ aryl, $C_5$-$C_{32}$ or $C_6$-$C_{32}$ substituted aryl, $C_6$-$C_{32}$ alkylaryl, $C_6$-$C_{32}$ substituted alkylaryl, $C_1$-$C_{32}$ alkoxy, $C_1$-$C_{32}$ substituted alkoxy, $C_1$-$C_{32}$ alkylamino, and $C_1$-$C_{32}$ substituted alkylamino;

at least one of M, D, or T incorporates at least one moiety $G_1$, $G_2$ or $G_3$, and $G_1$, $G_2$, and $G_3$ are each independently selected from the formula:

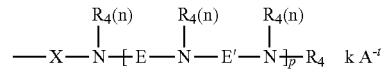

wherein:
X comprises a divalent radical selected from the group consisting of $C_1$-$C_{32}$ alkylene, $C_1$-$C_{32}$ substituted alkylene, $C_5$-$C_{32}$ or $C_6$-$C_{32}$ arylene, $C_5$-$C_{32}$ or $C_6$-$C_{32}$ substituted arylene, $C_6$-$C_{32}$ arylalkylene, $C_6$-$C_{32}$ substituted arylalkylene, $C_1$-$C_{32}$ alkoxy, $C_1$-$C_{32}$ substituted alkoxy, $C_1$-$C_{32}$ alkyleneamino, $C_1$-$C_{32}$ substituted alkyleneamino, ring-opened epoxide, and ring-opened glycidyl, with the proviso that if X does not comprise a repeating alkylene oxide moiety then X can further comprise a heteroatom selected from the group consisting of P, N and O;

each $R_4$ comprises identical or different monovalent radicals selected from the group consisting of H, $C_1$-$C_{32}$ alkyl, $C_1$-$C_{32}$ substituted alkyl, $C_5$-$C_{32}$ or $C_6$-$C_{32}$ aryl, $C_5$-$C_{32}$ or $C_6$-$C_{32}$ substituted aryl, $C_6$-$C_{32}$ alkylaryl, and $C_6$-$C_{32}$ substituted alkylaryl;

E comprises a divalent radical selected from the group consisting of $C_1$-$C_{32}$ alkylene, $C_1$-$C_{32}$ substituted alkylene, $C_5$-$C_{32}$ or $C_6$-$C_{32}$ arylene, $C_5$-$C_{32}$ or $C_6$-$C_{32}$ substituted arylene, $C_6$-$C_{32}$ arylalkylene, $C_6$-$C_{32}$ substituted arylalkylene, $C_1$-$C_{32}$ alkoxy, $C_1$-$C_{32}$ substituted alkoxy, $C_1$-$C_{32}$ alkyleneamino, $C_1$-$C_{32}$ substituted alkyleneamino, ring-opened epoxide and ring-opened glycidyl, with the proviso that if E does not comprise a repeating alkylene oxide moiety then E can further comprise a heteroatom selected from the group consisting of P, N, and O;

E' comprises a divalent radical selected from the group consisting of $C_1$-$C_{32}$ alkylene, $C_1$-$C_{32}$ substituted alkylene, $C_5$-$C_{32}$ or $C_6$-$C_{32}$ arylene, $C_5$-$C_{32}$ or $C_6$-$C_{32}$ substituted arylene, $C_6$-$C_{32}$ arylalkylene, $C_6$-$C_{32}$ substituted arylalkylene, $C_1$-$C_{32}$ alkoxy, $C_1$-$C_{32}$ substituted alkoxy, $C_1$-$C_{32}$ alkyleneamino, $C_1$-$C_{32}$ substituted alkyleneamino, ring-opened epoxide and ring-opened glycidyl, with the proviso that if E' does not comprise a repeating alkylene oxide moiety then E' can further comprise a heteroatom selected from the group consisting of P, N, and O;

p is an integer independently selected from 1 to 50;
n is an integer independently selected from 1 or 2;
when at least one of $G_1$, $G_2$, or $G_3$ is positively charged, $A^{-t}$ is a suitable charge balancing anion or anions such that the total charge, k, of the charge-balancing anion or anions is equal to and opposite from the net charge on the moiety $G_1$, $G_2$ or $G_3$, wherein t is an integer independently selected from 1, 2, or 3; and k≤(p*2/t)+1; such that the total number of cationic charges balances the total number of anionic charges in the organopolysiloxane molecule;
and wherein at least one E does not comprise an ethylene moiety.

Process of Making Polymers

Polymers useful in the present invention can be made by one skilled in the art. Examples of processes for making polymers include, but are not limited, solution polymerization, emulsion polymerization, inverse emulsion polymerization, inverse dispersion polymerization, and liquid dispersion polymer technology. In one aspect, a method of making a polymer having a chain transfer agent (CTA) value in a range greater than 10,000 ppm by weight of the polymer is disclosed. Another aspect of the invention is directed to providing a polymer having a cross linker level greater than 5 ppm, alternatively greater than 45 ppm, by weight of the polymer.

In one aspect of making a polymer, the CTA is present in a range greater than about 100 ppm based on the weight of the polymer. In one aspect, the CTA is from about 100 ppm to about 10,000 ppm, alternatively from about 500 ppm to about 4,000 ppm, alternatively from about 1,000 ppm to about 3,500 ppm, alternatively from about 1,500 ppm to about 3,000 ppm, alternatively from about 1,500 ppm to about 2,500 ppm, alternatively combinations thereof based on the weight of the polymer. In yet another aspect, the CTA is greater than about 1,000 based on the weight of the polymer. It is also suitable to use mixtures of chain transfer agents.

In one aspect of the invention, the polymer comprises 5-100% by weight (wt-%) of at least one cationic monomer and 5-95 wt-% of at least one non-ionic monomer. The weight percentages relate to the total weight of the copolymer. In another aspect of the invention, the polymer comprises 0-50% by weight (wt-%) of an anionic monomer.

Cationic Monomers for Polymers

Suitable cationic monomers include dialkyl ammonium halides or compounds according to formula (I):

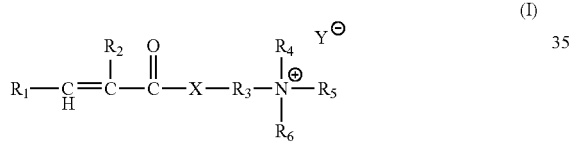

wherein:
$R_1$ is chosen from hydrogen, or $C_1$-$C_4$ alkyl, in one aspect, $R_1$ is hydrogen or methyl;
$R_2$ is chosen from hydrogen or methyl, in one aspect, $R_1$ is hydrogen
$R_3$ is chosen from $C_1$-$C_4$ alkylene, in one aspect, $R_3$ is ethylene;
$R_4$, $R_5$, and $R_6$ are each independently chosen from hydrogen, $C_1$-$C_4$ alkyl, $C_1$-$C_4$ alkyl alcohol, or $C_1$-$C_4$ alkoxy, in one aspect, $R_4$, $R_5$, and $R_6$ are methyl;
X is chosen from —O—, or —NH—, in one aspect, X is —O—; and
Y is chosen from Cl, Br, I, hydrogensulfate or methylsulfate, in one aspect, Y is Cl.

The alkyl and alkoxy groups may be linear or branched. The alkyl groups are methyl, ethyl, propyl, butyl, and isopropyl.

In one aspect, the cationic monomer of formula (I) is dimethyl aminoethyl acrylate methyl chloride. In another aspect, the cationic monomer of formula (I) is dimethyl aminoethyl methacrylate methyl chloride.

In another aspect, the cationic monomer is dialkyldimethyl ammonium chloride.

Non-Ionic Monomers for Polymers

Suitable non-ionic monomers include compounds of formula (II) wherein

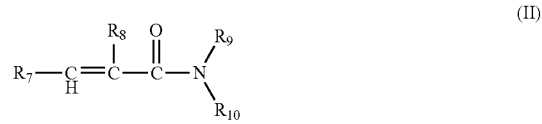

wherein:
$R_7$ is chosen from hydrogen or $C_1$-$C_4$ alkyl; in one aspect $R_7$ is hydrogen;
$R_8$ is chosen from hydrogen or methyl; in one aspect, $R_8$ is hydrogen; and
$R_9$ and $R_{10}$ are each independently chosen from hydrogen or $C_1$-$C_4$ alkyl, $C_1$-$C_4$ alkyl alcohol or $C_1$-$C_4$ alkoxy; in one aspect, $R_9$ and $R_{10}$ are each independently chosen from hydrogen or methyl.

In one aspect, the non-ionic monomer is acrylamide.
In another aspect, the non-ionic monomer is hydroxyethyl acrylate.

Anionic Monomers for Polymers

Suitable anionic monomer may include the group consisting of acrylic acid, methacrylic acid, itaconic acid, crotonic acid, maleic acid, fumaric acid, as well as monomers performing a sulfonic acid or phosphonic acid functions, such as 2-acrylamido-2-methyl propane sulfonic acid (ATBS), and their salts.

Cross-Linking Agent for Polymers

The cross-linking agent contains at least two ethylenically unsaturated moieties. In one aspect, the cross-linking agent contains at least two or more ethylenically unsaturated moieties; in one aspect, the cross-linking agent contains at least three or more ethylenically unsaturated moieties.

Suitable cross-linking agents include divinyl benzene, tetraallylammonium chloride; allyl acrylates; allyl acrylates and methacrylates, diacrylates and dimethacrylates of glycols and polyglycols, allyl methacrylates; and tri- and tetramethacrylates of polyglycols; or polyol polyallyl ethers such as polyallyl sucrose or pentaerythritol triallyl ether, butadiene, 1,7-octadiene, allyl-acrylamides and allyl-methacrylamides, bisacrylamidoacetic acid, N,N'-methylene-bisacrylamide and polyol polyallylethers, such as polyallylsaccharose and pentaerythrol triallylether, ditrimethylolpropane tetraacrylate, pentaerythrityl tetraacrylate, pentaerythrityl tetraacrylate ethoxylate, pentaerythrityl tetramethacrylate, pentaerythrityl triacrylate, pentaerythrityl triacrylate ethoxylate, triethanolamine trimethacrylate, 1,1,1-trimethylolpropane triacrylate, 1,1,1-trimethylolpropane triacrylate ethoxylate, trimethylolpropane tris(polyethylene glycol ether) triacrylate, 1,1,1-trimethylolpropane trimethacrylate, tris-(2-hydroxyethyl)-1,3,5-triazine-2,4,6-trione triacrylate, tris-(2-hydroxyethyl)-1,3,5-triazine-2,4,6-trione trimethacrylate, dipentaerythrityl pentaacrylate, 3-(3-{[dimethyl-(vinyl)-silyl]-oxy}-1,1,5,5-tetramethyl-1,5-divinyl-3-trisiloxanyl)-propyl methacrylate, dipentaerythritol hexaacrylate, 1-(2-propenyloxy)-2,2-bis[(2-propenyloxy)-methyl]-butane, trimethacrylic acid-1,3,5-triazin-2,4,6-triyl-tri-2,1-ethandiyl ester, glycerine triacrylate propoxylate, 1,3,5-triacryloylhexahydro-1,3,5-triazine, 1,3-dimethyl-1,1,3,3- tetravinyldisiloxane, pentaerythrityl tetravinyl ether, 1,3-dimethyl-1,1,3,3-tetravinyldisiloxane, (Ethoxy)-trivinylsilane, (Methyl)-trivinylsilane, 1,1,3,5,5-pentamethyl-1,3,5-trivinyltrisiloxane, 1,3,5-trimethyl-1,3,5-trivinylcyclotrisilazane, 2,4,6-trimethyl-2,4,6-trivinylcyclotrisiloxane, 1,3,5-trimethyl-1,3,5-trivinyltrisilazane, tris-(2-butanone oxime)-vinylsilane, 1,2,4-trivinylcyclohexane, trivinylphosphine, trivinylsilane, methyltriallylsilane, pentaerythrityl triallyl ether, phenyltriallylsilane, triallylamine, triallyl citrate, triallyl phosphate, triallylphosphine, triallyl phosphite, triallylsilane, 1,3,5-triallyl-1,3,5-triazine-2,4,6(1H,3H,5H)-trione, trimellitic acid triallyl ester, trimethallyl isocyanurate, 2,4,6-tris-(allyloxy)-1,3,5-triazine, 1,2-Bis-(diallylamino)-ethane, pentaerythrityl tetratallate, 1,3,5,7-tetravinyl-1,3,5,7-tetramethylcyclotetrasiloxane, 1,3,5,7-tetravinyl-1,3,5,7-tetramethylcyclotetrasiloxane, tris-[(2-acryloyloxy)-ethyl]-phosphate, vinylboronic anhydride pyridine, 2,4,6-trivinylcyclotriboroxanepyridine, tetraallylsilane, tetraallyloxysilane, 1,3,5,7-tetramethyl-1,3,5,7-tetravinylcyclotetrasilazane. Preferred compounds include alkyltrimethylammonium chloride, pentaerythrityl triacrylate, pentaerythrityl tetraacrylate, tetrallylammonium chloride, 1,1,1-trimethylolpropane tri(meth)acrylate, or a mixture thereof. These preferred compounds can also be ethoxylated and mixtures thereof. In one aspect, the cross-linking agents are chosen from tetraallyl ammonium chloride, allyl-acrylamides and allyl-methacrylamides, bisacrylamidoacetic acid, and N,N'-methylene-bisacrylamide, and mixtures thereof. In one aspect, the cross-linking agent is tetraallyl ammonium chloride. In another aspect, the cross-linking agent is a mixture of pentaerythrityl triacrylate and pentaerythrityl tetraacrylate.

For Polymer 1, the crosslinker(s) is (are) included in the range of from about 45 ppm to about 5,000 ppm, alternatively from about 50 ppm to about 500 ppm; alternatively from about 100 ppm to about 400 ppm, alternatively from about 500 ppm to about 4,500 ppm, alternatively from about 550 ppm to about 4,000 ppm based on the weight of the polymer.

For Polymer 2, the crosslinker(s) is (are) included in the range from 0 ppm to about 40 ppm, alternatively from about 0 ppm to about 20 ppm; alternatively from about 0 ppm to about 10 ppm based on the weight of the polymer.

Chain Transfer Agent (CTA) for Polymers

The chain transfer agent includes mercaptans, malic acid, lactic acid, formic acid, isopropanol and hypophosphites, and mixtures thereof. In one aspect, the CTA is formic acid.

The CTA is present in a range greater than about 100 ppm based on the weight of the polymer. In one aspect, the CTA is present from about 100 ppm to about 10,000 ppm, alternatively from about 500 ppm to about 4,000 ppm, alternatively from about 1,000 ppm to about 3,500 ppm, alternatively from about 1,500 ppm to about 3,000 ppm, alternatively from about 1,500 ppm to about 2,500 ppm, alternatively combinations thereof based on the weight of the polymer. In yet another aspect, the CTA level is greater than about 1,000 based on the weight of the polymer. It is also suitable to use mixtures of chain transfer agents.

Molecular Weight Range for Polymers

In one aspect, the polymer comprises a Number Average Molecular Weight (Mn) from about 10,000 Daltons to about 15,000,000 Daltons, alternatively from about 1,500,000 Daltons to about 2,500,000 Daltons.

In another aspect, the polymer comprises a Weight Average Molecular Weight (Mw) from about 4,000,000 Daltons to about 11,000,000 Daltons, alternatively from about 4,000,000 Daltons to about 6,000,000 Daltons.

Stabilizing Agents for Polymer Synthesis and Examples

Stabilizing agent A (nonionic block copolymer): Polyglyceryl-dipolyhydroxystearate with CAS-No. 144470-58-6

Stabilizing agent B is a nonionic ABA-block copolymer with molecular weight of about 5000 g/mol, and a hydrophobic lipophilic balance value (HLB) of 5 to 6, wherein the A block is based on polyhydroxystearic acid and the B block on polyalkylene oxide, having the formula below:

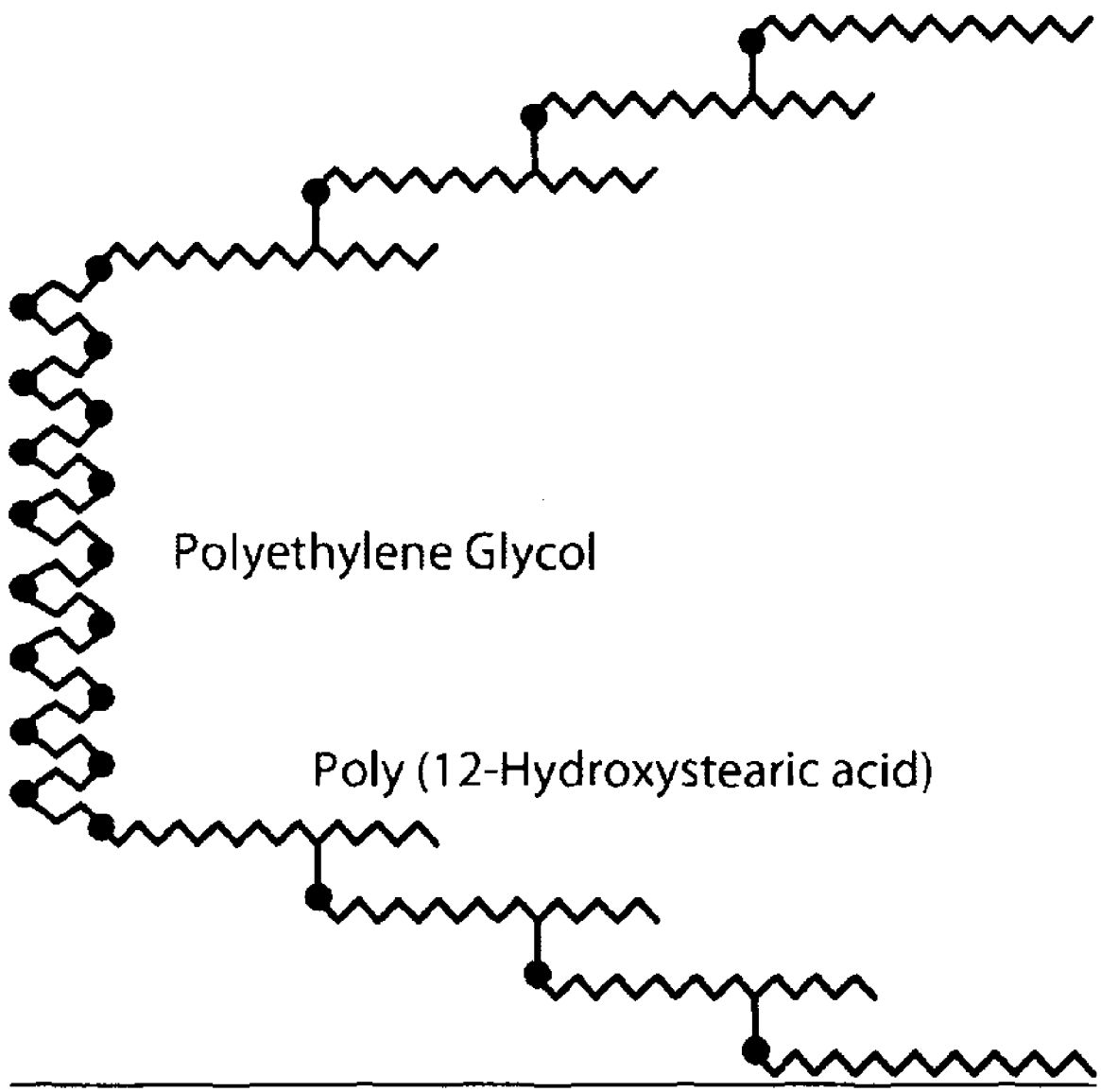

Stabilizing agent C (nonionic block copolymer): PEG-30 Dipolyhydroxystearate, with CAS-Nr. 70142-34-6.

Stabilizing agent D (nonionic block copolymer): Alcyd Polyethylenglycol Poly-isobutene stabilizing surfactant with HLB 5-7.

Adjunct Materials

While not essential for the purposes of the present invention, the non-limiting list of adjuncts illustrated hereinafter are suitable for use in the instant compositions and may be desirably incorporated in certain aspects of the invention, for example to assist or enhance cleaning performance, for treatment of the substrate to be cleaned, or to modify the aesthetics of the composition as is the case with perfumes, colorants, dyes or the like. The precise nature of these additional components, and levels of incorporation thereof, will depend on the physical form of the composition and the nature of the fabric treatment operation for which it is to be used. Suitable adjunct materials include, but are not limited to, surfactants, builders, chelating agents, dye transfer inhibiting agents, dispersants, enzymes, and enzyme stabilizers, catalytic materials, bleach activators, hydrogen peroxide, sources of hydrogen peroxide, preformed peracids, polymeric dispersing agents, clay soil removal/anti-redeposition agents, brighteners, suds suppressors, dyes, hueing dyes, perfumes, perfume delivery systems, structure elasticizing agents, carriers, structurants, hydrotropes, processing aids, solvents and/or pigments.

As stated, the adjunct ingredients are not essential to Applicants' compositions. Thus, certain aspects of Applicants' compositions do not contain one or more of the following adjuncts materials: surfactants, builders, chelating agents, dye transfer inhibiting agents, dispersants, enzymes, and enzyme stabilizers, catalytic materials, bleach activators, hydrogen peroxide, sources of hydrogen peroxide, preformed peracids, polymeric dispersing agents, clay soil removal/anti-redeposition agents, brighteners, suds suppressors, dyes, hueing dyes, perfumes, perfume delivery systems structure elasticizing agents, carriers, hydrotropes, processing aids, solvents and/or pigments. However, when one or more adjuncts are present, such one or more adjuncts may be present as detailed below.

Hueing Dye

The liquid laundry detergent composition may comprise a hueing dye. The hueing dyes employed in the present laundry care compositions may comprise polymeric or non-polymeric dyes, organic or inorganic pigments, or mixtures thereof. Preferably the hueing dye comprises a polymeric dye, comprising a chromophore constituent and a polymeric constituent. The chromophore constituent is characterized in that it absorbs light in the wavelength range of blue, red, violet, purple, or combinations thereof upon exposure to light. In one aspect, the chromophore constituent exhibits an absorbance spectrum maximum from about 520 nanometers to about 640 nanometers in water and/or methanol, and in another aspect, from about 560 nanometers to about 610 nanometers in water and/or methanol.

Although any suitable chromophore may be used, the dye chromophore is preferably selected from benzodifuranes, methine, triphenylmethanes, napthalimides, pyrazole, napthoquinone, anthraquinone, azo, oxazine, azine, xanthene, triphenodioxazine and phthalocyanine dye chromophores. Mono and di-azo dye chromophores are may be preferred.

The hueing dye may comprise a dye polymer comprising a chromophore covalently bound to one or more of at least three consecutive repeat units. It should be understood that the repeat units themselves do not need to comprise a chromophore. The dye polymer may comprise at least 5, or at least 10, or even at least 20 consecutive repeat units.

The repeat unit can be derived from an organic ester such as phenyl dicarboxylate in combination with an oxyalkyleneoxy and a polyoxyalkyleneoxy. Repeat units can be derived from alkenes, epoxides, aziridine, carbohydrate including the units that comprise modified celluloses such as hydroxyalkylcellulose; hydroxypropyl cellulose; hydroxypropyl methylcellulose; hydroxybutyl cellulose; and, hydroxybutyl methylcellulose or mixtures thereof. The repeat units may be derived from alkenes, or epoxides or mixtures thereof. The repeat units may be $C_2$-$C_4$ alkyleneoxy groups, sometimes called alkoxy groups, preferably derived from $C_2$-$C_4$ alkylene oxide. The repeat units may be $C_2$-$C_4$ alkoxy groups, preferably ethoxy groups.

For the purposes of the present invention, the at least three consecutive repeat units form a polymeric constituent. The polymeric constituent may be covalently bound to the chromophore group, directly or indirectly via a linking group. Examples of suitable polymeric constituents include polyoxyalkylene chains having multiple repeating units. In one aspect, the polymeric constituents include polyoxyalkylene chains having from 2 to about 30 repeating units, from 2 to about 20 repeating units, from 2 to about 10 repeating units or even from about 3 or 4 to about 6 repeating units. Non-limiting examples of polyoxyalkylene chains include ethylene oxide, propylene oxide, glycidol oxide, butylene oxide and mixtures thereof.

Surfactants

The compositions according to the present invention may comprise a surfactant or surfactant system wherein the surfactant can be selected from nonionic surfactants, anionic surfactants, cationic surfactants, ampholytic surfactants, zwitterionic surfactants, semi-polar nonionic surfactants and mixtures thereof.

The surfactant is typically present at a level of from about from about 0.01% to about 60%, 0.1% to about 60%, from about 1% to about 50% or even from about 5% to about 40% by weight of the subject composition. Alternatively, the surfactant may be present at a level of from about 0.01% to about 60%, from about 0.01% to about 50%, from 0.01% to about 40%, from about 0.1% to about 25%, from about 1% to about 10%, by weight of the subject composition.

Chelating Agents

The compositions herein may contain a chelating agent. Suitable chelating agents include copper, iron and/or manganese chelating agents and mixtures thereof. When a chelating agent is used, the composition may comprise from about 0.1% to about 15% or even from about 3.0% to about 10% chelating agent by weight of the subject composition.

Dye Transfer Inhibiting Agents

The compositions of the present invention may also include one or more dye transfer inhibiting agents. Suitable polymeric dye transfer inhibiting agents include, but are not limited to, polyvinylpyrrolidone polymers, polyamine N-oxide polymers, copolymers of N-vinylpyrrolidone and N-vinylimidazole, polyvinyloxazolidones and polyvinylimidazoles or mixtures thereof.

When present in a subject composition, the dye transfer inhibiting agents may be present at levels from about 0.0001% to about 10%, from about 0.01% to about 5% or even from about 0.1% to about 3% by weight of the composition.

Dispersants

The compositions of the present invention can also contain dispersants. Suitable water-soluble organic materials include the homo- or co-polymeric acids or their salts, in which the polycarboxylic acid comprises at least two carboxyl radicals separated from each other by not more than two carbon atoms.

Perfumes

The dispersed phase may comprise a perfume that may include materials selected from the group consisting of perfumes such as 3-(4-t-butylphenyl)-2-methyl propanal, 3-(4-t-butylphenyl)-propanal, 3-(4-isopropylphenyl)-2-methylpropanal, 3-(3,4-methylenedioxyphenyl)-2-methylpropanal, and 2,6-dimethyl-5-heptenal, alpha-damascone, beta-damascone, gamma-damascone, beta-damascenone, 6,7-dihydro-1,1,2,3,3-pentamethyl-4(5H)-indanone, methyl-7,3-dihydro-2H-1,5-benzodioxepine-3-one, 2-[2-(4-methyl-3-cyclohexenyl-1-yl)propyl]cyclopentan-2-one, 2-sec-butylcyclohexanone, and beta-dihydro ionone, linalool, ethyllinalool, tetrahydrolinalool, and dihydromyrcenol.

Perfume Delivery Technologies

The fluid fabric enhancer compositions may comprise one or more perfume delivery technologies that stabilize and enhance the deposition and release of perfume ingredients from treated substrate. Such perfume delivery technologies can also be used to increase the longevity of perfume release from the treated substrate. Perfume delivery technologies, methods of making certain perfume delivery technologies and the uses of such perfume delivery technologies are disclosed in US 2007/0275866 A1.

In one aspect, the fluid fabric enhancer composition may comprise from about 0.001% to about 20%, or from about 0.01% to about 10%, or from about 0.05% to about 5%, or even from about 0.1% to about 0.5% by weight of the perfume delivery technology. In one aspect, said perfume delivery technologies may be selected from the group consisting of: perfume microcapsules, pro-perfumes, polymer particles, functionalized silicones, polymer assisted delivery, molecule assisted delivery, fiber assisted delivery, amine assisted delivery, cyclodextrins, starch encapsulated accord, zeolite and inorganic carrier, and mixtures thereof:

In one aspect, said perfume delivery technology may comprise microcapsules formed by at least partially surrounding a benefit agent with a wall material. Said benefit agent may include materials selected from the group consisting of perfumes such as 3-(4-t-butylphenyl)-2-methyl-propanal, 3-(4-t-butylphenyl)-propanal, 3-(4-isopropylphenyl)-2-methylpropanal, 3-(3,4-methylenedioxyphenyl)-2-methylpropanal, and 2,6-dimethyl-5-heptenal, α-damascone, β-damascone, δ-damascone, β-damascenone, 6,7-dihydro-1,1,2,3,3-pentamethyl-4(5H)-indanone, methyl-7,3-dihydro-2H-1,5-benzodioxepine-3-one, 2-[2-(4-methyl-3-cyclohexenyl-1-yl)propyl]cyclopentan-2-one, 2-sec-butylcyclohexanone, and β-dihydro ionone, linalool, ethyllinalool, tetrahydrolinalool, and dihydromyrcenol; silicone oils, waxes such as polyethylene waxes; essential oils such as fish oils, jasmine, camphor, lavender; skin coolants such as menthol, methyl lactate; vitamins such as Vitamin A and E; sunscreens; glycerine; catalysts such as manganese catalysts or bleach catalysts; bleach particles such as perborates; silicon dioxide particles; antiperspirant actives; cationic polymers and mixtures thereof. Suitable benefit agents can be obtained from Givaudan Corp. of Mount Olive, N.J., USA, International Flavors & Fragrances Corp. of South Brunswick, N.J., USA, or Firmenich Company of Geneva, Switzerland. In one aspect, the microcapsule wall material may comprise: melamine, polyacrylamide, silicones, silica, polystyrene, polyurea, polyurethanes, polyacrylate based materials, gelatin, styrene malic anhydride, polyamides, and mixtures thereof. In one aspect, said melamine wall material may comprise melamine cross-linked with formaldehyde, melamine-dimethoxyethanol crosslinked with formaldehyde, and mixtures thereof. In one aspect, said polystyrene wall material may comprise polyestyrene cross-linked with divinylbenzene. In one aspect, said polyurea wall material may comprise urea crosslinked with formaldehyde, urea crosslinked with gluteraldehyde, polyisocyanate reacted with a polyamine, a polyamine reacted with an aldehyde, and mixtures thereof. In one aspect, said polyacrylate based materials may comprise polyacrylate formed from methylmethacrylate/dimethylaminomethyl methacrylate, polyacrylate formed from amine acrylate and/or methacrylate and strong acid, polyacrylate formed from carboxylic acid acrylate and/or methacrylate monomer and strong base, polyacrylate formed from an amine acrylate and/or methacrylate monomer and a carboxylic acid acrylate and/or carboxylic acid methacrylate monomer, and mixtures thereof. In one aspect, the perfume microcapsule may be coated with a deposition aid, a cationic polymer, a non-ionic polymer, an anionic polymer, or mixtures thereof. Suitable polymers may be selected from the group consisting of: polyvinylformaldehyde, partially hydroxylated polyvinylformaldehyde, polyvinylamine, polyethyleneimine, ethoxylated polyethyleneimine, polyvinylalcohol, polyacrylates, and combinations thereof. In one aspect, one or more types of microcapsules, for example two microcapsules types having different perfume benefit agents may be used.

In one aspect, said perfume delivery technology may comprise an amine reaction product (ARP) or a thiol reaction product. One may also use "reactive" polymeric amines and or polymeric thiols in which the amine and/or thiol functionality is pre-reacted with one or more PRMs to form a reaction product. Typically the reactive amines are primary and/or secondary amines, and may be part of a polymer or a monomer (non-polymer). Such ARPs may also be mixed with additional PRMs to provide benefits of polymer-assisted delivery and/or amine-assisted delivery. Nonlimiting examples of polymeric amines include polymers based on polyalkylimines, such as polyethyleneimine (PEI), or polyvinylamine (PVAm). Nonlimiting examples of monomeric (non-polymeric) amines include hydroxyl amines, such as 2-aminoethanol and its alkyl substituted derivatives, and aromatic amines such as anthranilates. The ARPs may be premixed with perfume or added separately in leave-on or rinse-off applications. In another aspect, a material that contains a heteroatom other than nitrogen and/or sulfur, for example oxygen, phosphorus or selenium, may be used as an alternative to amine compounds. In yet another aspect, the aforementioned alternative compounds can be used in combination with amine compounds. In yet another aspect, a single molecule may comprise an amine moiety and one or more of the alternative heteroatom moieties, for example, thiols, phosphines and selenols. The benefit may include improved delivery of perfume as well as controlled perfume release. Suitable ARPs as well as methods of making same can be found in USPA 2005/0003980 A1 and U.S. Pat. No. 6,413,920 B1.

Processes of Making Products

The compositions of the present invention can be formulated into any suitable form and prepared by any process chosen by the formulator, non-limiting examples of which are described in Applicants examples and in US 2013/0109612 A1 which is incorporated herein by reference.

In one aspect, the compositions disclosed herein may be prepared by combining the components thereof in any convenient order and by mixing, e.g., agitating, the resulting component combination to form a phase stable fabric and/or home care composition. In one aspect, a fluid matrix may be formed containing at least a major proportion, or even substantially all, of the fluid components with the fluid components being thoroughly admixed by imparting shear agitation to this liquid combination. For example, rapid stirring with a mechanical stirrer may be employed.

Method of Use

The compositions of the present invention may be used in any conventional manner. In short, they may be used in the same manner as products that are designed and produced by conventional methods and processes. For example, compositions of the present invention can be used to treat a situs inter alia a surface or fabric. Typically at least a portion of the situs is contacted with an aspect of Applicants' composition, in neat form or diluted in a wash liquor, and then the situs is optionally washed and/or rinsed. For purposes of the present invention, washing includes but is not limited to, scrubbing, and mechanical agitation. The fabric may comprise any fabric capable of being laundered in normal consumer use conditions. When the wash solvent is water, the water temperature typically ranges from about 5° C. to about 90° C. and, when the situs comprises a fabric, the water to fabric mass ratio is typically from about 1:1 to about 100:1.

The consumer products of the present invention may be used as liquid fabric enhancers wherein they are applied to a fabric and the fabric is then dried via line drying and/or drying the an automatic dryer.

In one aspect a liquor that comprises a sufficient amount of a composition that comprises a fabric softener active, a silicone polymer and a cationic polymer, to satisfy the following equation:

$$[(a)+x(b)+y(c)]w=z$$

wherein, a is a weight percent of fabric softener active other than silicone polymer in said composition, preferably a is from about 0 to about 20 weight percent, more preferably a is from about 1 to about 15 weight percent, more preferably a is from about 3 to about 10 weight percent, more preferably a is from about 5 to about 10 weight percent, most preferably a is from about 7 to about 10 weight percent; b is the weight percent silicone polymer in said composition, preferably b is from about 0 to about 10 weight percent, more preferably b is from about 0.5 to about 5 weight percent, most preferably b is from about 1 to about 3 weight percent; c is the weight percent of cationic polymer in said composition, preferably c is from about 0.01 to about 5 weight percent, more preferably c is from about 0.01 to about 1 weight percent, most preferably c is from about 0.03 to about 0.5 weight percent; wherein said weight percentages are, for purposes of said equation, converted to decimal values; w is the dose in grams divided by 1 gram, preferably w is a number from about 10 to about 45, more preferably w is a number from about 15 to about 40; x is a number from about 1 to about 5, preferably x is a number about 2; y is a number from about 1 to about 10, preferably y is a number from about 1 to about 5, more preferably y is a number about 2; z is a number from about 1 to about 10, preferably z is a number from about 1 to about 7, more preferably, z is a number from about 2 to about 4, is disclosed. Preferably, said composition that comprises a fabric softener active, a silicone polymer and a cationic polymer is a composition that is disclosed and/or claimed herein. In one aspect, said liquor may comprise an anionic surfactant, preferably 1 ppm to 1000 ppm, more preferably 1 ppm to 100 ppm of an anionic surfactant. In one aspect of said liquor a divided by b is a number from about 0.5 to about 10, preferably a divided by b is a number from about 1 to about 10, more preferably a divided by b is a number from about 1 to about 4, most preferably a divided by b is a number from about 2 to about 3.

In one aspect a method of treating a fabric comprising optionally washing, rinsing and/or drying a fabric then contacting said fabric with a liquor that comprises a sufficient amount of a composition that comprises a fabric softener active, a silicone polymer and a cationic polymer, to satisfy the following equation:

$$[(a)+x(b)+y(c)]w=z$$

wherein, a is a weight percent of fabric softener active other than silicone polymer in said composition, preferably a is from about 0 to about 20 weight percent, more preferably a is from about 1 to about 15 weight percent, more preferably a is from about 3 to about 10 weight percent, more preferably a is from about 5 to about 10 weight percent, most preferably a is from about 7 to about 10 weight percent; b is the weight percent silicone polymer in said composition, preferably b is from about 0 to about 10 weight percent, more preferably b is from about 0.5 to about 5 weight percent, most preferably b is from about 1 to about 3 weight percent; c is the weight percent of cationic polymer in said composition, preferably c is from about 0.01 to about 5 weight percent, more preferably c is from about 0.01 to about 1 weight percent, most preferably c is from about 0.03 to about 0.5 weight percent; wherein said weight percentages are, for purposes of said equation, converted to decimal values; w is the dose in grams divided by 1 gram, preferably w is a number from about 10 to about 45, more preferably w is a number from about 15 to about 40; x is a number from about 1 to about 5, preferably x is a number about 2; y is a number from about 1 to about 10, preferably y is a number from about 1 to about 5, more preferably y is a number about 2; z is a number from about 1 to about 10, preferably z is a number from about 1 to about 7, more preferably, z is a number from about 2 to about 4. Preferably, said composition that comprises a fabric softener active, a silicone polymer and a cationic polymer is a composition that is disclosed and/or claimed herein. In one aspect, said liquor may comprise an anionic surfactant, preferably 1 ppm to 1000 ppm, more preferably 1 ppm to 100 ppm of an anionic surfactant. In one aspect of said method a divided by b is a number from about 0.5 to about 10, preferably a divided by b is a number from about 1 to about 10, more preferably a divided by b is a number from about 1 to about 4, most preferably a divided by b is a number from about 2 to about 3.

In one aspect a method of treating a fabric comprising optionally washing, rinsing and/or drying a fabric then contacting said fabric with a liquor that comprises a sufficient amount of a composition that comprises a fabric softener active and a cationic polymer, to satisfy the following equation:

$$[(a)+y(c)]w=z$$

wherein, a is a weight percent fabric softener active in said composition, preferably a is from about 0 to about 20 weight percent, more preferably a is from about 1 to about 15 weight percent, more preferably a is from about 3 to about 10 weight percent, more preferably a is from about 5 to about 10 weight percent, most preferably a is from about 7 to about 10 weight percent; c is the weight percent of cationic polymer in said composition, preferably c is from about 0.01 to about 5 weight percent, more preferably c is from about 0.01 to about 1 weight percent, most preferably c is from about 0.03 to about 0.5 weight percent; wherein said weight percentages are, for purposes of said equation, converted to decimal values; w is the dose in grams divided by 1 gram, preferably w is a number from about 10 to about 45, more preferably w is a number from about 15 to about 40; y is a number from about 1 to about 10, preferably y is a number from about 1 to about 5, more preferably y is a number about 2; z is a number from about 1 to about 10, preferably z is a number from about 1 to about 7, more preferably, z is a number from about 2 to about 4, is disclosed. Preferably, said composition that comprises a fabric softener active and a cationic polymer is a composition disclosed and/or claimed herein. In one aspect, said liquor may comprise an anionic surfactant, preferably 1 ppm to 1000 ppm, more preferably 1 ppm to 100 ppm of an anionic surfactant.

In one aspect a liquor that comprises a sufficient amount of a composition that comprises a fabric softener active and a cationic polymer, to satisfy the following equation:

$$[(a)+y(c)]w=z$$

wherein, a is a weight percent fabric softener active in said composition, preferably a is from about 0 to about 20 weight percent, more preferably a is from about 1 to about 15 weight percent, more preferably a is from about 3 to about 10 weight percent, more preferably a is from about 5 to about 10 weight percent, most preferably a is from about 7 to about 10 weight percent; c is the weight percent of cationic polymer in said composition, preferably c is from about 0.01 to about 5 weight percent, more preferably c is from about 0.01 to about 1 weight percent, most preferably c is from about 0.03 to about 0.5 weight percent; wherein said weight percentages are, for purposes of said equation, converted to decimal values; w is the dose in grams divided by 1 gram, preferably w is a number from about 10 to about 45, more preferably w is a number from about 15 to about 40; y is a number from about 1 to about 10, preferably y is a number from about 1 to about 5, more preferably y is a number about 2; z is a number from about 1 to about 10, preferably z is a number from about 1 to about 7, more preferably, z is a number from about 2 to about 4. Preferably, said composition that comprises a fabric softener active and a cationic polymer is a composition that is disclosed and/or claimed herein. In one aspect, said liquor may comprise an anionic surfactant, preferably 1 ppm to 1000 ppm, more preferably 1 ppm to 100 ppm of an anionic surfactant.

A liquor that comprises a sufficient amount of a composition that comprises a fabric softener active, a silicone polymer and a cationic polymer, to satisfy the following equation:

$$[(a)+x(b)+y(c)]w=z$$

wherein, a is a weight percent of fabric softener active other than silicone polymer in said composition is disclosed. Preferably a is from about 0 to about 20 weight percent, more preferably a is from about 1 to about 15 weight percent, more preferably a is from about 3 to about 10 weight percent, more preferably a is from about 5 to about 10 weight percent, most preferably a is from about 7 to about 10 weight percent; b is the weight percent silicone polymer in said composition, preferably b is from about 0 to about 10 weight percent, more preferably b is from about 0.5 to about 5 weight percent, most preferably b is from about 1 to about 3 weight percent; c is the weight percent of cationic polymer in said composition, preferably c is from about 0.01 to about 5 weight percent, more preferably c is from about 0.01 to about 1 weight percent, most preferably c is from about 0.03 to about 0.5 weight percent; wherein said weight percentages are, for purposes of said equation, converted to decimal values; w is the dose in grams divided by 1 gram, preferably w is a number from about 10 to about 45, more preferably w is a number from about 15 to about 40; x is a number from about 1 to about 5, preferably x is a number about 2; y is a number from about 1 to about 10, preferably y is a number from about 1 to about 5, more preferably y is a number about 2; z is a number from about 1 to about 10, preferably z is a number from about 1 to about 7, more preferably, z is a number from about 2 to about 4. Preferably, said composition that comprises a fabric softener active, a silicone polymer and a cationic polymer is a composition according to any preceding claim. Preferably, said liquor comprises an anionic surfactant, preferably 1 ppm to 1000 ppm, more preferably 1 ppm to 100 ppm of an anionic surfactant.

A liquor that comprises a sufficient amount of a composition that comprises a fabric softener active and a cationic polymer, to satisfy the following equation:

$$[(a)+y(c)]w=z$$

wherein, a is a weight percent fabric softener active in said composition is disclosed. Preferably a is from about 0 to about 20 weight percent, more preferably a is from about 1 to about 15 weight percent, more preferably a is from about 3 to about 10 weight percent, more preferably a is from about 5 to about 10 weight percent, most preferably a is from about 7 to about 10 weight percent; c is the weight percent of cationic polymer in said composition, preferably c is from about 0.01 to about 5 weight percent, more preferably c is from about 0.01 to about 1 weight percent, most preferably c is from about 0.03 to about 0.5 weight percent; wherein said weight percentages are, for purposes of said equation, converted to decimal values; w is the dose in grams divided by 1 gram, preferably w is a number from about 10 to about 45, more preferably w is a number from about 15 to about 40; y is a number from about 1 to about 10, preferably y is a number from about 1 to about 5, more preferably y is a number about 2; z is a number from about 1 to about 10, preferably z is a number from about 1 to about 7, more preferably, z is a number from about 2 to about 4. Preferably, said composition that comprises a fabric softener active and a cationic polymer is a composition according the composition's disclosed by Applicants in this specification.

Preferably, said liquor comprises an anionic surfactant, preferably 1 ppm to 1000 ppm, more preferably 1 ppm to 100 ppm of an anionic surfactant.

Test Methods

Viscosity Slope Method 1

The viscosity slope value quantifies the rate at which the viscosity increases as a function of increasing polymer concentration. The viscosity slope of a single polymer or of a dual polymer system is determined from viscosity measurements conducted on a series of aqueous solutions which span a range of polymer concentrations. The viscosity slope of a polymer is determined from a series of aqueous polymer solutions and which are termed polymer solvent solutions. The aqueous phase is prepared gravimetrically by adding hydrochloric acid to deionized water to reach a pH of about 3.0. A series of polymer solvent solutions are prepared to logarithmically span between 0.01 and 1 weight percent of the polymer in the aqueous phase. Each polymer solvent solutions is prepared gravimetrically by mixing the polymer and solvent with a SpeedMixer DAC 150 FVZ-K (made by FlackTek Inc. of Landrum, S.C.) for 1 minute at 2,500 RPM in a Max 60 cup or Max 100 cup to the target polymer weight percent of the polymer solvent solution. Polymer solvent solutions are allowed to come to equilibrium by resting for at least 24 hours. Viscosity as a function of shear rate of each polymer solvent solutions is measured at 40 different shear rates using an Anton Paar Rheometer with a DSR 301 measuring head and concentric cylinder geometry. The time differential for each measurement is logarithmic over the range of 180 and 10 seconds and the shear rate range for the measurements is 0.001 to 500 l/seconds (measurements taken from the low shear rate to the high shear rate).

Viscosity at a shear rate of 0.01 l/seconds as a function of polymer weight percent of the polymer solvent solution is fit using the equation $Y=bX^a$ wherein X is the polymer concentration in the solvent polymer solution, Y is the polymer solvent solution viscosity, b is the extrapolated solvent polymer solution viscosity when X is extrapolated to unity and the exponent a is polymer concentration viscosity scaling power over the polymer concentration range where the exponent a is the highest value.

Viscosity Slope Method 2

The viscosity slope value quantifies the rate at which the viscosity increases as a function of increasing polymer concentration. The viscosity slope of a single polymer or of a dual polymer system is determined from viscosity measurements conducted on a series of aqueous solutions which span a range of polymer concentrations and which are termed polymer solvent solutions. Viscosity analyses are conducted using an Anton Paar Dynamic Shear Rheometer model DSR 301 Measuring Head, equipped with a 32-place Automatic Sample Changer (ASC) with reusable metal concentric cylinder geometry sample holders, and Rheoplus software version 3.62 (all from Anton Paar GmbH., Graz, Austria). All polymer solutions are mixed using a high-speed motorized mixer, such as a Dual Asymmetric Centrifuge SpeedMixer model DAC 150 FVZ-K (FlackTek Inc., Landrum, S.C., USA) or equivalent.

The aqueous phase diluent for all of the aqueous polymer solutions is prepared by adding sufficient concentrated hydrochloric acid (e.g. 16 Baume, or 23% HCl) to deionized water until a pH of about 3.0 is achieved. The polymer(s) are combined with the aqueous phase diluent in a mixer cup (such as the Flacktek Speedmixer Max 100 or Max 60) that is compatible with the mixer to be used and is of a suitable size to hold a sample volume of 35 mL to 100 mL. Sufficient polymer is added to the aqueous phase diluent to achieve a concentration of between 8000-10000 ppm of the single polymer, or of the polymer 2 in the case of a dual polymer system, and to yield a volume of between 35 mL to 100 mL. The mixture of the polymer(s) and the aqueous phase is mixed for 4 minutes at a speed of 3500 RPM. After mixing, this initial polymer solvent solution is put aside to rest in a sealed container for at least 24 hours.

A single viscosity measurement is obtained from each of 32 polymer solvent solutions wherein each solution has a different concentration of polymer. These 32 polymer solvent solutions comprise a series of solutions that span the concentration range of 1000 ppm to 4000 ppm, with the solutions spaced at concentration intervals of approximately every 100 ppm. Each of the 32 polymer solvent solution concentrations is prepared gravimetrically by mixing the initial 8000-10000 ppm polymer solvent solution with sufficient additional aqueous phase diluent to result in a solution having the required target concentration and a volume of 35 mL to 100 mL, which is then mixed for 2 minutes at a speed of 3500 RPM. All of the resultant polymer solvent solutions are put aside to rest in a sealed cup for at least 24 hours. Polymer solutions are loaded into the concentric cylinder sample holders of the rheometer's ASC, using a pipette to fill each cylinder up to the line indicating a volume of 23 mL. The samples are stored in the ASC of the rheometer at a temperature of approximately 21° C. for up to 36 hours until measured. The viscosity of each of the 32 polymer solvent solutions is measured at the shear rate of 0.0105 l/s, and the viscosity value in units of Pa·s is recorded as soon as the value being measured is stable and consistent.

The recorded viscosity values measured at a shear rate of 0.0105 l/s are paired with the value of the respective concentration of the polymer solvent solution measured. The resultant paired data values are plotted as 32 data points on a graph with viscosity in units of Pa·s on the x-axis, and polymer concentration in units of ppm on the y-axis. This data set is subsampled repeatedly to yield 30 subsets, wherein each subset comprises three consecutive data points. The subset creation process begins with the data point at the lowest polymer concentration and advances in sequence increasing toward the highest polymer concentration, until 30 unique subsets have been created. The subset creation process advances up to higher concentrations in steps of 1 data point at a time.

The three data points in each subset are fit with the following linear equation, using linear least squares regression, to determine the value of the exponent "a" for each of the 30 subsets:

$$Y=bX^a$$

wherein;
X is the polymer concentration in the solvent polymer solution (in ppm),
Y is the polymer solvent solution viscosity (in Pa·s)
b is the extrapolated solvent polymer solution viscosity (in Pa·s) when X is extrapolated to the value of 1 ppm,
and the exponent a is a unitless parameter.

The Viscosity Slope value reported for the material being tested is the highest value calculated for the exponent "a", of all of the 30 values calculated for the exponent "a" from the 30 subsets.

Brookfield Viscosity

Brookfield viscosity is measured using a Brookfield DV-E viscometer. The liquid is contained in a glass jar, where the width of the glass jar is from about 5.5 to 6.5 cm and the height of the glass jar is from about 9 to about 11 cm. For viscosities below 500 cPs, use spindle LV2 at 60 RPM, and to measure viscosities from 500 to 2,000 cPs, use spindle LV3 at 60 RPM. The test is conducted in accordance with the instrument's instructions. Initial Brookfield viscosity is defined as the Brookfield viscosity measured within 24 hours of making the subject composition.

Physical Stability

Physical stability is assessed by visual observation of the product in an undisturbed glass jar, where the width of the glass jar is from about 5.5 to 6.5 cm and the height of the glass jar is from about 9 to about 11 cm, after 4 weeks at 25° C. Using a ruler with millimeter graduation, the height of the liquid in the jar and the height of any visually observed phase separation are measured. The Stability Index is defined as the height of the phase split divided by the height of the liquid in the glass jar. A product with no visually observable phase split is given a stability index of zero.

K Value for Polymer 2

The sample consists of a solution of 1% on polymer and 3% on NaCl. With this purpose the calculated amount of sample is weighted in a 50 mL volumetric flask, dissolved initially with a small amount of the 3%-NaCl solution and then the flask is filled until the calibration mark (under the meniscus). A magnetic bar is introduced in the flask and stirred for 30 min (There should be no visible supernatant, otherwise, the sample should be filtered). Finally, the solution is transferred to the Ubeholde Viscometer and attached to the machine. The sample is tempered for 10 min in the machine at 25° C. and four measurements are carried out. The machine pumps the sample solution through the capillary and waits 10 min before the measurement starts. Subsequently the fourfold measurement takes place (if an outlier occurs, a new measurement takes place automatically).

Method for Determining Weight Percent Water Soluble Fraction for Polymer 1

For the determination of soluble and insoluble parts of the polymer, fractionation experiments using Analytical ultracentrifugation were performed. Sedimentation velocity runs using a Beckman Optima XL-I (Beckman Instruments, Palo Alto, USA) with interference optical detection system (wavelength 675 nm) was used. The samples have been measured at polymer concentrations below critical polymer overlap concentration using salt solution to insure polyelectrolyte screening effect. The centrifugation speed was varied between 1000 rpm and 45,000 rpm.

The sedimentation coefficient, defined as a median value for each fraction, and the concentration of one sedimenting fraction were determined using a standard analysis Software (SEDFIT) using the density and viscosity of the solvent, and a specific refractive index increment of the polymer. The sedimentation coefficient is in units of Sved (1 Sved=$10^{-13}$ seconds). The standard deviation for the determination of weight fraction and sedimentation coefficients of water soluble and crosslinked water-swellable polymers is 3%, 10% and up to 30% respectively. The weight percent of soluble polymer is the AUC value.

Measurement of Weight Average Molecular Weight (Mw) for Polymer 2

The weight average molecular weights of the cationic polymers of the present invention are determined by the technique of Size Exclusion Chromatography (SEC). SEC separation is carried out under conditions including three hydrophilic vinyl polymer network Novema gel columns, in distilled water ion the presence of 0.1% (w/w) trifluoroacetate and 0.1 M NaCl at 35° C. Calibration is conducted with narrowly distributed poly(2-vinylpyridine)-standard of company PSS, Deutschland with molecular weights Mw=839 to M=2.070.000.

EXAMPLES

Example 1: Synthesis of Polymer 1 (P1.1)

An aqueous phase of water soluble components is prepared by admixing together the following components:
  2.26 g (0.5 pphm) of citric acid-1-hydrate,
  2.25 g (0.2 pphm) of an aqueous solution (40%) of pentasodium diethylenetriaminepentaacetate,
  179.91 g (39.98 pphm) of water,
  0.90 g (0.2 pphm) of formic acid (Chain transfer agent)
  337.5 g (60.0 pphm) of methyl chloride quaternised dimethylaminoethylacrylate (DMA3*MeCl, 80% aqueous solution), and
  360.00 g (40.0 pphm) of acrylamide (50% aqueous solution).

An oil phase is prepared by admixing together the following components:
  73.47 g (2.45 pphm) of stabilizing agent B (15% in solvent) as stabilizing surfactant,
  124.58 g (5.22 pphm) of a polymeric stabiliser stearyl methacrylate-methacrylic acid copolymer (18.87% in solvent),
  354.15 g (78.7 pphm) of 2-ethylhexyl stearate, and
  105.93 g (23.54 pphm) of dearomatised hydrocarbon solvent with a boiling point between 160° C. till 190° C.
  4.50 g (0.01 pphm) Pentaerythrityl tri/tetraacrylate (PETIA) (1% i-Propanol solution).

The two phases are mixed together in a ratio of 43 parts oil phase to 57 parts aqueous phase under high shear to form a water-in-oil emulsion. The resulting water-in-oil emulsion is transferred to a reactor equipped with nitrogen sparge tube, stirrer and thermometer. 0.11 g (0.025 pphm) 2,2-Azobis(2-methylbutyronitril) is added and the emulsion is purged with nitrogen to remove oxygen.

Polymerisation is effected by addition of a redox couple of sodium metabisulphite and tertiary butyl hydroperoxide (one shot: 2.25 g (1% in solvent/0.005 pphm) stepwise such that is a temperature increase of 1.5° C./min. After the isotherm is completed the emulsion held at 85° C. for 60 minutes. Then residual monomer reduction with 18.25 g (0.25 pphm) tertiary butyl hydroperoxide (6.16% in solvent) and 21.56 g (0.25 pphm) sodium metabisulphite (5.22% in emulsion) is started (1.5 hours feeding time).

Vacuum distillation is carried out to remove water and volatile solvent to give a final product, i.e. a dispersion containing 50% polymer solids.

To this product addition is made of 63.0 g (14.0 pphm) of a fatty alcohol alkoxylate [alcohol $C_6$-$C_{17}$(secondary) poly (3-6)ethoxylate: 97% secondary alcohol ethoxylate+3% poly(ethylene oxide)], (CAS No. 84133-50-6).

Examples P1.1.1 to P1.1.14 in Table 1 are prepared according to the same process as the one described above for Example 1.

Example 2: Synthesis of Polymer 2 (P1.2)

An aqueous phase of water soluble components is prepared by admixing together the following components:
- 2.26 g (0.5 pphm) of citric acid-1-hydrate,
- 2.25 g (0.2 pphm) of an aqueous solution (40%) of pentasodium diethylenetriaminepentaacetate,
- 170.55 g (37.90 pphm) of water,
- 9.00 g (0.10 pphm) of tetraallylammonium chloride (TAAC) (5% aqueous solution)
- 0.90 g (0.2 pphm) of formic acid
- 337.5 g (60.0 pphm) of methyl chloride quaternised dimethylaminoethylacrylate (DMA3*MeCl 80% aqueous solution), and
- 360.00 g (40.0 pphm) of acrylamide (50% aqueous solution).

An oil phase is prepared by admixing together the following components:
- 73.47 g (2.45 pphm) of stabilizing agent B (15% in solvent) as stabilizing surfactant,
- 124.58 g (5.22 pphm) of a polymeric stabiliser stearyl methacrylate-methacrylic acid copolymer (18.87% in solvent),
- 354.15 g (78.7 pphm) of 2-ethylhexyl stearate, and
- 111.65 g (24.81 pphm) of dearomatised hydrocarbon solvent with a boiling point between 160° C. till 190° C.

The two phases are mixed together in a ratio of 43 parts oil phase to 57 parts aqueous phase under high shear to form a water-in-oil emulsion. The resulting water-in-oil emulsion is transferred to a reactor equipped with nitrogen sparge tube, stirrer and thermometer. 0.11 g (0.025 pphm) 2,2-Azobis(2-methylbutyronitril) is added and the emulsion is purged with nitrogen to remove oxygen.

Polymerisation is effected by addition of a redox couple of sodium metabisulphite and tertiary butyl hydroperoxide (one shot: 2.25 g (1% in solvent/0.005 pphm)) stepwise such that is a temperature increase of 1.5° C./min. After the isotherm is completed the emulsion held at 85° C. for 60 minutes. Then residual monomer reduction with 18.25 g (0.25 pphm) tertiary butyl hydroperoxide (6.16% in solvent) and 21.56 g (0.25 pphm) sodium metabisulphite (5.22% in emulsion) is started (1.5 hours feeding time).

Vacuum distillation is carried out to remove water and volatile solvent to give a final product, i.e. a dispersion containing 50% polymer solids.

To this product addition is made of 63.0 g (14.0 pphm) of a fatty alcohol alkoxylate [alcohol $C_6$-$C_{17}$(secondary) poly (3-6)ethoxylate: 97% secondary alcohol ethoxylate+3% poly(ethylene oxide)], (CAS No. 84133-50-6).

Examples P1.2.1 to P1.2.28 in Table 1 are prepared according to the same process as the one described above for Example 2.

Example 3: Synthesis of Polymer 1 (P1.3)

An aqueous phase of water soluble components is prepared by admixing together the following components:
- 2.26 g (0.5 pphm) of citric acid-1-hydrate,
- 2.25 g (0.2 pphm) of a aqueous solution (40%) of pentasodium diethylenetriaminepentaacetate,
- 170.55 g (37.90 pphm) of water,
- 9.00 g (0.10 pphm) of Trimethylolpropane tris(polyethylene glycol ether) triacrylate (TMPTA EOx) (5% aqueous solution)
- 0.90 g (0.2 pphm) of formic acid
- 337.50 g (60.0 pphm) of methyl chloride quaternised dimethylaminoethylacrylate (DMA3*MeCl 80% aqueous solution), and
- 360.00 g (40.0 pphm) of acrylamide (50% aqueous solution).

An oil phase is prepared by admixing together the following components:
- 73.47 g (2.45 pphm) of stabilizing agent B (15% in solvent) as stabilizing surfactant,
- 124.58 g (5.22 pphm) of a polymeric stabiliser stearyl methacrylate-methacrylic acid copolymer (18.87% in solvent),
- 354.15 g (78.7 pphm) of 2-ethylhexyl stearate, and
- 111.65 g (24.81 pphm) of dearomatised hydrocarbon solvent with a boiling point between 160° C. till 190° C.

The two phases are mixed together in a ratio of 43 parts oil phase to 57 parts aqueous phase under high shear to form a water-in-oil emulsion. The resulting water-in-oil emulsion is transferred to a reactor equipped with nitrogen sparge tube, stirrer and thermometer. 0.11 g (0.025 pphm) 2,2-Azobis(2-methylbutyronitril) is added and the emulsion is purged with nitrogen to remove oxygen.

Polymerisation is effected by addition of a redox couple of sodium metabisulphite and tertiary butyl hydroperoxide (one shot: 2.25 g (1% in solvent/0.005 pphm) stepwise such that is a temperature increase of 1.5° C./min. After the isotherm is completed the emulsion held at 85° C. for 60 minutes. Then residual monomer reduction with 18.25 g (0.25 pphm) tertiary butyl hydroperoxide (6.16% in solvent) and 21.56 g (0.25 pphm) sodium metabisulphite (5.22% in emulsion) is started (1.5 hours feeding time).

Vacuum distillation is carried out to remove water and volatile solvent to give a final product, i.e. a dispersion containing 50% polymer solids.

To this product addition is made of 63.0 g (14.0 pphm) of a fatty alcohol alkoxylate [alcohol C6-C17(secondary) poly (3-6)ethoxylate: 97% secondary alcohol ethoxylate+3% poly(ethylene oxide)], (CAS No. 84133-50-6).

Examples P1.3.1 to P1.3.2 in Table 1 is prepared according to the same process as the one described above for Example 3.

TABLE 1

Examples of Polymer 1

| Example | Stabilizing agent B (pphm) | DMA3* MeCl (pphm) | Acrylamide (pphm) | Methylen bisacrylamide (pphm) | PETIA (pphm) | TAAC (pphm) | TMPTA-EOx (pphm) | Chain transfer agent (pphm) | Reaction-speed ° C./min. |
|---|---|---|---|---|---|---|---|---|---|
| P1.1 | 2.45 | 60 | 40 | | 0.01 | | | 0.2 | +1.5 |
| P1.1.1 | 2.45 | 60 | 40 | | 0.05 | | | 0.2 | +1.5 |
| P1.1.2 | 2.45 | 60 | 40 | | 0.035 | | | 0.2 | +1.5 |
| P1.1.3 | 2.45 | 60 | 40 | | 0.035 | | | 0.2 | +1.5 |
| P1.1.4 | 2.45 | 60 | 40 | | 0.035 | | | 0.2 | +1.5 |
| P1.1.5 | 2.45 | 60 | 40 | | 0.035 | | | 0.2 | +1.5 |
| P1.1.6 | 2.45 | 60 | 40 | | 0.035 | | | 0.1 | +1.5 |
| P1.1.7 | 2.45 | 60 | 40 | | 0.035 | | | 0.05 | +1.5 |
| P1.1.8 | 2.45 | 60 | 40 | | 0.04 | | | 0.1 | +1.5 |
| P1.1.9 | 2.45 | 60 | 40 | | 0.035 | | | 0.085 | +1.5 |
| P1.1.10 | 2.45 | 60 | 40 | | 0.025 | | | | +1.5 |
| P1.1.11 | 2.45 | 60 | 40 | | 0.035 | | | 0.07 | +1.5 |
| P1.1.12 | 2.45 | 40 | 60 | | | 0.02 | | 0.05 | +1.5 |
| P1.1.13 | 2.45 | DADMAC 40 | HEA 60 | | | 0.03 | | 0.1 | +1.5 |
| P1.1.14 | 2.45 | DMAEMA *MeCl 60 | 40 | | 0.035 | | | 0.2 | +1.5 |
| P1.2 | 2.45 | 60 | 40 | | | 0.1 | | 0.2 | +1.5 |
| P1.2.1 | 2.45 | 60 | 40 | | | 0.075 | | 0.2 | +1.5 |
| P1.2.2 | 2.45 | 60 | 40 | | | 0.075 | | 0.2 | +1.5 |
| P1.2.3 | 2.45 | 60 | 40 | | | 0.04 | | 0.1 | +1.5 |
| P1.2.4 | 2.45 | 60 | 40 | | | 0.049 | | 0 | +1 |
| P1.2.5 | 2.45 | 60 | 40 | | | 0.045 | | 0.05 | +1.5 |
| P1.2.6 | 2.45 | 60 | 40 | | | 0.04 | | 0.025 | +1.5 |
| P1.2.7 | 2.45 | 60 | 40 | | | 0.045 | | 0.0375 | +1.5 |
| P1.2.8 | 2.45 | 60 | 40 | | | 0.04 | | 0.025 | +1.5 |
| P1.2.9 | 2.45 | 60 | 40 | | | 0.045 | | 0.0375 | +1.5 |
| P1.2.10 | 2.45 | 60 | 40 | | | 0.04 | | 0.025 | +1.5 |
| P1.2.11 | 2.45 | 60 | 40 | | | 0.04 | | 0.025 | +1.5 |
| P1.2.12 | 2.45 | 60 | 40 | | | 0.04 | | 0.025 | +1.5 |
| P1.2.13 | 2.45 | 60 | 40 | | | 0.04 | | 0.025 | +1.5 |
| P1.2.14 | 2.45 | 60 | 40 | | | 0.04 | | 0.0125 | +1.5 |
| P1.2.15 | 2.45 | 60 | 40 | | | 0.04 | | 0.0125 | +1.5 |
| P1.2.16 | 2.45 | 60 | 40 | | | 0.04 | | 0.0125 | +1.5 |
| P1.2.17 | 2.45 | 60 | 40 | | | 0.04 | | 0.0125 | +1.5 |
| P1.2.18 | 2.45 | 60 | 40 | | | 0.04 | | 0.0188 | +1.5 |
| P1.2.19 | 2.45 | 60 | 40 | | | 0.04 | | 0.0125 | +1.5 |
| P1.2.20 | 2.45 | 60 | 40 | | | 0.04 | | 0.0125 | +1.5 |
| P1.2.21 | 2.45 | 60 | 40 | | | 0.04 | | 0.0125 | +1.5 |
| P1.2.22 | | | | | | 0.04 | | 0.0125 | +1.5 |
| P1.2.23 | 2.45 | MAPTAC 70 | AM 30 | | | 0.03 | | 0.02 | +1.5 |
| P1.2.24 | 2.45 | 70 | 30 | | | 0.01 | | 0.02 | +1.5 |
| P1.2.25 | 2.45 | 60 | 40 | 0.07 | | | | 0.02 | +1.5 |
| P1.2.26 | 2.45 | 60 | 40 | | | 0.049 | | | +1.5 |
| P1.2.27 | 2.45 | 60 | 40 | | | 0.04 | | 0.125 | +1.5 |
| P1.2.28 | 2.45 | 60 | 40 | | | 0.04 | | 0.125 | +1.0 |
| P1.3.1 | 2.45 | 60 | 40 | | | | 0.1 | 0.2 | +1.5 |
| P1.3.2 | 2.45 | 60 | 40 | | | | 0.04 | 0.05 | +1.5 |

DMA3*MeCl = Dimethylamino Ethyl Acrylate methochloride
DMAEMA*MeCl = DimethylAmino Ethyl MethAcrylate methochloride
AM = Acrylamide
HEA = Hydroxyethyl acrylate
MAPTAC = Trimethylaminopropyl ammonium acrylamide chloride
PETIA = pentaerythrityl triacrylate/pentaerythrityl tetraacrylate
TAAC = tetraallylammonium chloride
TMPTA = trimethylolpropane tris(polyethylene glycol ether) triacrylate

Example 4: Synthesis for Polymer 2 that are Made by Solution Polymerization

Into a 2 L glass reactor equipped with a thermometer, an anchor stirrer, a nitrogen feed and a reflux condenser, 0.57 g of a 40% aqueous solution of Trilon C, 10.96 g (0.057 mole) of citric acid and 747 g of ion exchanged water were charged. Thereafter, the solution was purged by a flow of nitrogen gas and the inner temperature was elevated to 70° C. Afterwards 0.57 g of Wako V50 in 36.09 g of ion exchanged water were added thereto, 90.06 g (0.634 mole) of 50% aqueous acrylamide solution and 230.05 g (1.188 mole) of a 84% solution of dimethylaminoethylacrylate-methochloride in 25.56 g of ion exchanged water were added continuously to the reaction system over 2 hours 45 min while keeping the inner temperature at 70° C. Thereafter, the inner temperature was kept at 70° C. for 1 hour to complete the reaction. Afterwards 1.15 g of Wako V50 in 7.16 g of ion exchanged water were added at once and the reaction stirred for 2 h, before cooling down. The obtained product is a 21.9% aqueous polymer solution having a pH of 2.8 and a K-value of 55.5.

Example 5: Synthesis For Polymer 2 That Are Made By Solution Polymerization

Into a 2 L glass reactor equipped with a thermometer, an anchor stirrer, a nitrogen feed and a reflux condenser, 0.58 g of a 40% aqueous solution of Trilon C, 4.16 g (0.09 mole) of formic acid and 300 g of ion exchanged water were charged. Thereafter, the solution was purged by a flow of nitrogen gas and the inner temperature was elevated to 65° C. Afterwards 0.35 g of Wako V50 in 22.37 g of ion exchanged water were added thereto, 90.43 g (0.636 mole) of 50% aqueous acrylamide solution and 230.98 g (0.954 mole) of a 8% solution of dimethylaminoethylacrylate-methochloride in 25.66 g of ion exchanged water were added continuously to the reaction system over 3 hours 45 min while keeping the inner temperature at 65° C. Thereafter, the inner temperature was kept at 65° C. for 1 hour to complete the reaction. Afterwards 1.15 g of Wako V50 in 7.16 g of ion exchanged water were added at once and the reaction stirred for 2 h, before cooling down. The obtained product is a 35.5% aqueous polymer solution having a pH of 2.68 and a K-value of 52.9.

TABLE 2

Examples of Polymer Two

| Polymer | Polymerization Method | Mono 1 Type | Mono 2 Type | Mono 1 (wt. %) | Mono 2 (wt. %) | Cross-linker Type | Cross-linker Level [ppm] | K Value |
|---|---|---|---|---|---|---|---|---|
| P2.1 | Emulsion | DMA3MeCl | AM | 70 | 30 | TAAC | 100 | |
| P2.2 | Emulsion | DMA3MeCl | AM | 60 | 40 | MBA | 700 | |
| P2.3 | Solution | DMA3MeCl | AM | 60 | 40 | N/A | 0 | 55 |
| P2.4 | Solution | DMA3MeCl | AM | 60 | 40 | N/A | 0 | 40 |
| P2.5 | Emulsion | DMA3MeCl | AM | 60 | 40 | N/A | 0 | 50 |
| P2.6 | Solution | DMA3MeCl | AM | 40 | 60 | N/A | 0 | 60 |
| P2.7 | Solution | DMA3MeCl | AM | 50 | 50 | N/A | 0 | 30 |
| P2.8 | Solution | DMAEMA | AM | 60 | 40 | N/A | 0 | 50 |
| P2.9 | Solution | DADMAC | AA | 80 | 20 | N/A | 0 | |
| P2.10 | Solution | DADMAC | AA | 97.7 | 2.3 | N/A | 0 | |
| P2.11 | Solution | DMA3MeCl | AM | 70 | 30 | MBA | 5 | |
| P2.12 | Solution | DMA3MeCl | AM | 60 | 60 | N/A | 0 | 30 |
| P2.13 | Solution | DMA3MeCl | AM | 40 | 60 | N/A | 0 | 25 |
| P2.14 | Solution | DMA3MeCl | AM | 60 | 40 | N/A | 0 | 20 |

Dimethylamino Ethyl Acrylate methochloride (DMA3MeCl)
DimethylAmino Ethyl MethAcrylate methochloride (DMAEMA)
Acrylamide (AM)
Hydroxyethyl acrylate (HEA)
Dialkyldimethyl ammonium chloride (DADMAC)
Trimethylaminopropyl ammonium acrylamide chloride (MAPTAC)
Tetra allyl ammonium chloride (TAAC)
Methylene bisacrylamide (MBA)
Acrylic Acid (AA)

Example 6

Compositions having the listed amounts of materials are made by combining the ammonium quat active with water using shear then the other materials are combined with the ammonium quat/water and mixed to form a fabric softener composition. Adjunct ingredients such as perfume, dye and stabilizer may be added as desired.

| Silicone Active | Ammonium Quat Active | Polymer 1 From Table 1 | Polymer 2 From Table 2 |
|---|---|---|---|
| 0-0.5%; | 1-18%; | 0.01-0.50%; | 0.01-0.35%; |
| 0-5.0%; | 2-14%; | 0.02-0.20%; | 0.02-0.15%; |
| 1.0-3.0%; or | 7-10%; or | 0.03-0.15%; or | or |
| 1.5-2.5% | 4-8% | 0.04-0.12% | 0.03-0.12% |

Example 7. Fabric Softener Products

| (% wt) | F1 | F2 | F3 | F4 | F5 | F6 |
|---|---|---|---|---|---|---|
| FSA [a] | 11.2 | 7 | 9 | — | — | — |
| FSA [b] | — | — | — | — | — | 6 |
| FSA [c] | — | — | — | 14.5 | 13 | — |
| Coco oil | 0.6 | 0.5 | 0.45 | — | — | — |
| Low MW Alcohol [d] | 1.11 | 0.7 | 0.9 | 1.5 | 1.3 | 0.5 |
| Perfume | 1.75 | 0.6 | 2.1 | 1.5 | 2 | 1.2 |
| Perfume encapsulate [e] | 0.19 | 0.6 | 0.5 | 0.25 | 0.6 | 0.4 |
| Calcium Chloride(ppm) | 0.06 | 0.03 | 0.025 | 0.12 | 0.06 | — |
| Chelant [f] | 0.005 | 0.005 | 0.005 | 0.005 | 0.005 | 0.006 |
| Preservative [g] | 0.04 | 0.04 | 0.02 | 0.04 | 0.03 | 0.05 |
| Acidulent (Formic Acid) | 0.051 | 0.03 | 0.04 | 0.02 | 0.03 | — |
| Antifoam [h] | — | — | — | — | — | 0.05 |
| Polymer 1 [i] | 0.17 | 0.15 | 0.2 | 0.12 | 0.16 | 0.35 |
| Polymer 2 [i] | — | — | — | — | — | — |
| Water soluble dialkyl quat [j] | 0.25 | 0.2 | 0.1 | 0.5 | — | 0.25 |
| Dispersant [k] | — | — | — | — | — | — |
| Stabilizing Surfactant [l] | — | — | — | — | — | 0.1 |
| PDMS emulsion [m] | — | — | 0.5 | — | 2 | — |
| Amino-functional Organosiloxane Polymer | 3 | 2 | — | 1 | — | — |
| Dye (ppm) | 0.03 | 0.03 | 0.02 | 0.04 | 0.04 | 0.02 |
| Hydrochloric Acid | 0.0075 | 0.0075 | 0.008 | 0.01 | 0.01 | 0.01 |
| Deionized Water | Balance | Balance | Balance | Balance | Balance | Balance |

| (% wt) | F7 | F8 | F9 | F10 | F11 | F12 |
|---|---|---|---|---|---|---|
| FSA [a] | 12 | 9.5 | 8 | 6.5 | 5.3 | 2.5 |
| FSA [b] | — | — | — | — | — | — |
| FSA [c] | — | — | — | — | — | — |
| Coco oil | 0.6 | 0.475 | 0.4 | 0.325 | 0.265 | 0.125 |
| Low MW Alcohol [d] | 0.9 | 1.11 | 0.95 | 1.05 | 0.78 | 0.35 |
| Perfume | 3 | 1.41 | 1.00 | 0.55 | 1.55 | 1 |
| Perfume encapsulate [e] | 0.6 | 0.15 | 0.25 | 0.62 | 0.98 | 0.25 |
| Calcium Chloride(ppm) | 0.07 | 0.23 | 0.16 | — | — | — |
| Chelant [f] | 0.005 | 0.01 | 0.01 | 0.01 | 0.01 | 0.01 |
| Preservative [g] | 0.04 | — | — | — | — | — |
| Acidulent (Formic Acid) | 0.05 | 0.06 | 0.06 | 0.06 | 0.06 | — |
| Antifoam [h] | — | — | — | — | — | — |
| Polymer 1 [i] | 0.14 | 0.08 | 0.12 | 0.06 | 0.04 | 0.08 |
| Polymer 2 [i] | — | 0.12 | 0.12 | 0.08 | 0.04 | — |
| Water soluble dialkyl quat [j] | 0.35 | 0.11 | 0.11 | — | 0.52 | 0.1 |
| Dispersant [k] | — | — | — | — | — | — |
| Stabilizing Surfactant [l] | — | — | — | — | — | — |
| PDMS emulsion [m] | 2 | — | — | — | — | 3 |
| Amino-functional Organosiloxane Polymer | — | — | — | — | — | — |
| Dye (ppm) | 0.02 | 0.03 | 0.03 | 0.03 | 0.03 | 0.02 |
| Hydrochloric Acid | 0.005 | 0.03 | 0.03 | 0.03 | 0.03 | 0.02 |
| Deionized Water | Balance | Balance | Balance | Balance | Balance | Balance |

| (% wt) | F13 | F14 | F15 | F16 | F17 | F18 |
|---|---|---|---|---|---|---|
| FSA [a] | 14.7 | 14.7 | 11.1 | 9.5 | 6.25 | 5.1 |
| FSA [b] | — | — | — | — | — | — |
| FSA [c] | — | — | — | — | — | — |
| Coco oil | 0.735 | 0.735 | 0.555 | 0.475 | 0.3125 | 0.255 |
| Low MW Alcohol [d] | 0.88 | 0.58 | 0.45 | 0.52 | 0.33 | 0.22 |
| Perfume | 1.65 | 1.65 | 1.65 | 1.4 | 3.12 | 0.65 |
| Perfume encapsulate [e] | 0.26 | 0.26 | 0.26 | 0.43 | 0.26 | 0.75 |
| Calcium Chloride(ppm) | 0.23 | 0.23 | — | 0.23 | 0.23 | 0.23 |
| Chelant [f] | 0.01 | 0.01 | 0.01 | 0.01 | 0.01 | 0.01 |
| Preservative [g] | — | 0.001 | — | 0.001 | 0.001 | 0.001 |
| Acidulent (Formic Acid) | 0.06 | — | — | — | — | — |
| Antifoam [h] | — | — | — | — | — | — |
| Polymer 1 [i] | 0.07 | 0.07 | 0.05 | 0.06 | 0.06 | 0.06 |
| Polymer 2 [i] | 0.09 | 0.09 | 0.05 | 0.09 | 0.09 | 0.09 |
| Water soluble dialkyl quat [j] | — | 0.29 | 0.29 | 0.29 | 0.29 | 0.09 |
| Dispersant [k] | — | — | — | — | — | — |
| Stabilizing Surfactant [l] | — | — | — | — | — | — |
| PDMS emulsion [m] | — | 1.12 | — | — | — | — |
| Amino-functional Organosiloxane Polymer | — | — | 1.8 | 2.2 | 3.1 | 1.8 |
| Dye (ppm) | 0.03 | 0.03 | 0.03 | 0.03 | 0.03 | 0.03 |
| Hydrochloric Acid | 0.03 | 0.03 | 0.03 | 0.03 | 0.03 | 0.03 |
| Deionized Water | Balance | Balance | Balance | Balance | Balance | Balance |

-continued

| (% wt) | F19 | F20 | F21 | F22 | F23 | F24 |
|---|---|---|---|---|---|---|
| FSA $^a$ | 14.7 | 6.25 | 10.2 | 5 | 11 | 15 |
| FSA $^b$ | — | — | — | — | — | — |
| FSA $^c$ | — | — | — | — | — | — |
| Coco oil | 0.735 | 0.3125 | 0.51 | 0.3 | 0.6 | 0.8 |
| Low MW Alcohol $^d$ | 0.58 | 0.11 | 0.58 | 0.95 | 0.95 | 0.95 |
| Perfume | 1.65 | 0.35 | 1.65 | 1.00 | 1.00 | 1.00 |
| Perfume encapsulate $^e$ | 0.26 | 1.33 | 0.26 | 0.25 | 0.25 | 0.25 |
| Calcium Chloride(ppm) | 0.23 | 0.42 | 0.23 | 0.16 | 0.16 | 0.16 |
| Chelant $^f$ | 0.01 | 0.01 | 0.01 | 0.01 | 0.01 | 0.01 |
| Preservative $^g$ | 0.001 | — | 0.001 | — | — | — |
| Acidulent (Formic Acid) | — | 0.06 | — | 0.06 | 0.06 | 0.06 |
| Antifoam $^h$ | — | 0.02 | — | — | — | — |
| Polymer 1 $^i$ | 0.03 | 0.25 | 0.01 | 0.12 | 0.12 | 0.12 |
| Polymer 2 $^i$ | 0.04 | 0.18 | 0.02 | 0.12 | 0.12 | 0.12 |
| Water soluble dialkyl quat $^j$ | 0.29 | 0.29 | 0.29 | 0.11 | 0.11 | 0.11 |
| Dispersant $^k$ | — | — | 0.15 | — | — | — |
| Stabilizing Surfactant $^l$ | — | — | 0.45 | — | — | — |
| PDMS emulsion $^m$ | 1.12 | — | 0.85 | — | — | — |
| Amino-functional Organosiloxane Polymer | — | 3.1 | 0.95 | — | — | — |
| Dye (ppm) | 0.03 | 0.03 | — | 0.03 | 0.03 | 0.03 |
| Hydrochloric Acid | 0.03 | 0.03 | 0.03 | 0.03 | 0.03 | 0.03 |
| Deionized Water | Balance | Balance | Balance | Balance | Balance | Balance |

| (% wt) | F25 | F26 | F27 | F28 |
|---|---|---|---|---|
| FSA $^a$ | 15 | 11 | 8 | 5 |
| FSA $^b$ | — | — | — | — |
| FSA $^c$ | — | — | — | — |
| Coco oil | 0.8 | 0.6 | 0.4 | 0.3 |
| Low MW Alcohol $^d$ | 0.95 | 0.95 | 0.95 | 0.95 |
| Perfume | 1.00 | 1.00 | 1.00 | 1.00 |
| Perfume encapsulate $^e$ | 0.25 | 0.25 | 0.25 | 0.25 |
| Calcium Chloride(ppm) | 0.12 | 0.12 | 0.12 | 0.12 |
| Chelant $^f$ | 0.005 | 0.005 | 0.005 | 0.005 |
| Preservative $^g$ | 0.04 | 0.04 | 0.04 | 0.04 |
| Acidulent (Formic Acid) | 0.02 | 0.02 | 0.02 | 0.02 |
| Antifoam $^h$ | — | — | — | — |
| Polymer 1 $^n$ | 0.08 | 0.08 | 0.08 | 0.08 |
| Polymer 2 $^i$ | — | — | — | — |
| Water soluble dialkyl quat $^j$ | — | — | — | — |
| Dispersant $^k$ | — | — | — | — |
| Stabilizing Surfactant $^l$ | — | — | — | — |
| PDMS emulsion $^m$ | — | — | — | — |
| Amino-functional Organosiloxane Polymer | 1 | 1 | 1 | 1 |
| Dye (ppm) | 0.04 | 0.04 | 0.04 | 0.04 |
| Hydrochloric Acid | 0.01 | 0.01 | 0.01 | 0.01 |
| Deionized Water | Balance | Balance | Balance | Balance |

| (% wt) | F29 | F30 | F31 | F32 | F33 | F34 |
|---|---|---|---|---|---|---|
| FSA $^a$ | 3.5 | — | 9.5 | 8.0 | 5.5 | — |
| FSA $^b$ | — | 7.5 | — | — | — | 7.5 |
| Coco oil | — | — | — | — | 0.4 | — |
| Low MW Alcohol $^d$ | — | — | — | — | 1.3 | 0.5 |
| Perfume | 1.75 | 0.6 | 1.0 | 0.65 | 2.5 | 1.2 |
| Perfume encapsulate $^e$ | 0.19 | 0.65 | 0.35 | 0.25 | 0.11 | 0.4 |
| Calcium Chloride (ppm) | 0.06 | 0.03 | 0.025 | 0.12 | 0.06 | — |
| Magnesium Chloride | — | — | — | 0.3 | 0.08 | 0.5 |
| Chelant $^f$ | 0.005 | 0.005 | 0.005 | 0.005 | 0.005 | 0.006 |
| Preservative $^g$ | 0.04 | 0.04 | 0.02 | 0.04 | 0.03 | 0.05 |
| Acidulent (Formic Acid) | 0.051 | 0.03 | 0.04 | 0.02 | 0.03 | — |
| Antifoam $^h$ | — | — | — | — | — | 0.05 |
| Polymer 1 $^i$ | 0.07 | 0.14 | 0.10 | 0.16 | 0.18 | 0.30 |
| Polymer 2 $^i$ | 0.03 | 0.06 | 0.05 | 0.04 | 0.02 | 0.15 |
| Water soluble dialkyl quat $^j$ | 0.2 | — | — | — | — | 0.3 |

| | | | | | | |
|---|---|---|---|---|---|---|
| PDMS emulsion [m] | — | — | — | — | 2 | — |
| Amino-functional Organosiloxane Polymer | — | — | — | — | — | 1.5 |
| Dye (ppm) | 0.03 | 0.03 | 0.02 | 0.04 | 0.04 | 0.02 |
| Hydrochloric Acid | 0.0075 | 0.0075 | 0.008 | 0.01 | 0.01 | 0.01 |
| Deionized Water | Balance | Balance | Balance | Balance | Balance | Balance |

| (% wt) | F35 | F36 | F37 | F38 | F39 |
|---|---|---|---|---|---|
| FSA [a] | 8.0 | 8.0 | 8.0 | 8.0 | 9.5 |
| Perfume | 1.0 | 1.0 | 1.0 | 1.0 | 1.0 |
| Perfume encapsulate [e] | 0.35 | 0.35 | 0.35 | 0.35 | 0.35 |
| Calcium Chloride (ppm) | — | — | — | — | 0.075 |
| Magnesium Chloride | 0.7 | 0.7 | 0.7 | 0.7 | 0.7 |
| Chelant [f] | 0.01 | 0.01 | 0.01 | 0.01 | 0.01 |
| Preservative [g] | 0.001 | 0.001 | 0.001 | 0.001 | 0.001 |
| Formic Acid | 0.05 | 0.05 | 0.05 | 0.05 | 0.05 |
| Polymer 1 [i] | 0.10 | 0.12 | 0.09 | 0.075 | — |
| Polymer 1 [n] | — | — | — | — | 0.15 |
| Polymer 2 [i] | — | 0.03 | 0.06 | 0.075 | — |
| Dye (ppm) | 0.03 | 0.03 | 0.02 | 0.04 | 0.04 |
| Hydrochloric Acid | 0.006 | 0.006 | 0.006 | 0.006 | 0.006 |
| Deionized Water | Balance | Balance | Balance | Balance | Balance |

[a] N,N-di(alkanoyloxyethyl)-N,N-dimethylammonium chloride where alkyl consists predominatly of C16-C18 alkyl chains with an IV value of about 20 available from Evonik
[b] Methyl bis[ethyl (tallowate)]-2-hydroxyethyl ammonium methyl sulfate available from Stepan
[c] N,N-di(alkanoyloxyethyl)-N,N-dimethylammonium chloride where alkyl consists predominatly of C16-C18 alkyl chains with an IV value of about 52 available from Evonik
[d] Low molecular weight alcohol such as ethanol or isopropanol
[e] Perfume microcapsules available ex Appleton Papers, Inc.
[f] Diethylenetriaminepentaacetic acid or hydroxyl ethylidene-1,1-diphosphonic acid
[g] 1,2-Benzisothiazolin-3-ONE (BIT) under the trade name Proxel available from Lonza
[h] Silicone antifoam agent available from Dow Corning ® under the trade name DC2310
[i] Polymer 1 are chosen from Table 1 and Polymer 2 are chosen from Table 2
[j] Didecyl dimethyl ammonium chloride under the trade name Bardac ® 2280 or Hydrogenated tallowalkyl(2-ethylhexyl) dimethyl ammonium methylsulfate from AkzoNobel under the trade name Arquad ® HTL8-MS
[k] Non-ionic surfactant from BASF under the trade name Lutensol ®XL-70
[l] Non-ionic surfactant, such as TWEEN 20 ™ or TAE80 (tallow ethoxylated alcohol, with average degree of ethoxylation of 80)
[m] Polydimethylsiloxane emulsion from Dow Corning under the trade name DC346 ®.
[n] Rheovis CDE ® commercially available from BASF

Example 8. Fabric Preparation Example

Fabrics are assessed using Kenmore FS 600 and/or 80 series washer machines. Wash Machines are set at: 32° C./15° C. wash/rinse temperature, 6 gpg hardness, normal cycle, and medium load (64 liters). Fabric bundles consist of 2.5 kilograms of clean fabric consisting of 100% cotton. Test swatches are included with this bundle and comprise of 100% cotton Euro Touch terrycloth towels (purchased from Standard Textile, Inc. Cincinnati, Ohio). Prior to treatment with any test products, the fabric bundles are stripped according to the Fabric Preparation-Stripping and Desizing procedure before running the test. Tide Free liquid detergent (1× recommended dose) is added under the surface of the water after the machine is at least half full. Once the water stops flowing and the washer begins to agitate, the clean fabric bundle is added. When the machine is almost full with rinse water, and before agitation has begun, the fabric care testing composition is slowly added (1× dose), ensuring that none of the fabric care testing composition comes in direct contact with the test swatches or fabric bundle. When the wash/rinse cycle is complete, each wet fabric bundle is transferred to a corresponding dryer. The dryer used is a Maytag commercial series (or equivalent) electric dryer, with the timer set for 55 minutes on the cotton/high heat/timed dry setting. This process is repeated for a total of three (3) complete wash-dry cycles. After the third drying cycle and once the dryer stops, 12 Terry towels from each fabric bundle are removed for actives deposition analysis. The fabrics are then placed in a constant Temperature/Relative Humidity (21° C., 50% relative humidity) controlled grading room for 12-24 hours and then graded for softness and/or actives deposition.

The Fabric Preparation-Stripping and Desizing procedure includes washing the clean fabric bundle (2.5 Kg of fabric comprising 100% cotton) including the test swatches of 100% cotton EuroTouch terrycloth towels for 5 consecutive wash cycles followed by a drying cycle. AATCC (American Association of Textile Chemists and Colorists) High Efficiency (HE) liquid detergent is used to strip/de-size the test swatch fabrics and clean fabric bundle (1× recommended dose per wash cycle). The wash conditions are as follows: Kenmore FS 600 and/or 80 series wash machines (or equivalent), set at: 48° C./48° C. wash/rinse temperature, water hardness equal to 0 gpg, normal wash cycle, and medium sized load (64 liters). The dryer timer is set for 55 minutes on the cotton/high/timed dry setting.

Example 9. Silicone on Fabric Measurement Method

Silicone is extracted from approximately 0.5 grams of fabric (previously treated according to the test swatch treatment procedure) with 12 mL of either 50:50 toluene:methylisobutyl ketone or 15:85 ethanol:methylisobutyl ketone in 20 mL scintillation vials. The vials are agitated on a pulsed vortexer for 30 minutes. The silicone in the extract is quantified using inductively coupled plasma optical emission spectrometry (ICP-OES). ICP calibration standards of known silicone concentration are made using the same or a structurally comparable type of silicone raw material as the products being tested. The working range of the method is 8-2300 μg silicone per gram of fabric. Concentrations greater than 2300 μg silicone per gram of fabric can be assessed by subsequent dilution. Deposition efficiency index of silicone is determined by calculating as a percentage, how much silicone is recovered, via the aforementioned extraction and measurement technique, versus how much is delivered via the formulation examples. The analysis is performed on terrycloth towels (EuroSoft towel, sourced from Standard Textile, Inc, Cincinnati, Ohio) that are treated according to the wash procedure outlined herein.

Example 10. Example for Determining the Recovery Index for Organo Siloxane Polymer The Recovery Index is measured using a Tensile and Compression Tester Instrument, such as the Instron Model 5565 (Instron Corp., Norwood, Mass., U.S.A.). The instrument is configured by selecting the following settings: the mode is Tensile Extension; the Waveform Shape is Triangle; the Maximum Strain is 10%, the Rate is 0.83 mm/sec, the number of Cycles is 4; and the Hold time is 15 seconds between cycles.
1) Determine the weight of one approximately 25.4 cm square swatch of 100% cotton woven fabric, (a suitable fabric is the Mercerized Combed Cotton Warp Sateen, Product Code 479, available from Testfabrics Inc., West Pittston, Pa., USA).
2) Determine the amount of organo siloxane polymer required to deposit 5 mg of the polymer per gram of fabric swatch and weigh that amount into a 50 ml plastic centrifuge tube with a lid.
3) Dilute the organo siloxane polymer to 1.3 times the weight of the swatch with a solvent that completely dissolves or disperses the organo siloxane polymer (examples: isopropyl alcohol, THF, N,N-dimethylacetamide, water).
4) Thoroughly disperse or dissolve organo siloxane with shaking or vortex stirring as needed.
5) Place fabric swatch lying flat into a stainless steel tray that is larger than the swatch.
6) Pour the organo siloxane polymer solution over the entire swatch as evenly as possible.
7) Fold the swatch twice to quarter, then roll it up while gently squeezing to disperse solution to the entire swatch.
8) Unfold and repeat Step 7, folding in the opposite direction
9) To make a control swatch, repeat the procedure described above using 1.3× weight of solvent only (nil active).
10) Lay each swatch on a separate piece of aluminum foil and place in a fume hood to dry overnight.
11) Cure each swatch in an oven with appropriate ventilation at 90° C. for 5 minutes, (a suitable oven is the Mathis Labdryer, with 1500 rpm fan rotation) (Werner Mathis AG, Oberhasli, Switzerland).
12) Condition fabrics in a constant temperature (21° C.+/−2° C.) and humidity (50% RH+/−5% RH) room for at least 6 hours.
13) With scissors, cut the edge of one entire side of each swatch in the warp direction and carefully remove fabric threads one at a time without stressing the fabric until an even edge is achieved.
14) Cut 4 strips of fabric from each swatch (die or rotary cut), parallel to the even edge, that are 2.54 cm wide and at least 10 cm long
15) Evenly clamp the top and bottom (narrower edges) of the fabric strip into the 2.54 cm grips on the tensile tester instrument with a 2.54 cm gap setting, loading a small amount of force (0.1N-0.2N) on the sample.
16) Strain to 10% at 0.83 mm/s and return to 2.54 cm gap at the same rate.
17) Release bottom clamp and re-clamp sample during the hold cycle, loading 0.1N-0.2N of force on the sample.
18) Repeat Steps 15-16 until 4 hysteresis cycles have been completed for the sample.
19) Analyze 4 fabric samples per treatment swatch by the above method and average the tensile strain values recorded at 0.1N unload for Cycle 4. Recovery is calculated as follows:

$$\% \text{ Recovery} = \frac{(10 - \text{Tensile Strain at } 0.1N)}{10} \times 100$$

20) Recovery Index = $\frac{\% \text{ Recovery of Treatment}}{\% \text{ Recovery of Control}}$ Example 11. Fabric Friction Measures Example For the examples cited a Thwing-Albert FP2250 Friction/Peel Tester with a 2 kilogram force load cell is used to measure fabric to fabric friction. (Thwing Albert Instrument Company, West Berlin, N.J.). The sled is a clamping style sled with a 6.4 by 6.4 cm footprint and weighs 200 g (Thwing Albert Model Number 00225-218). A comparable instrument to measure fabric to fabric friction would be an instrument capable of measuring frictional properties of a horizontal surface. A 200 gram sled that has footprint of 6.4 cm by 6.4 cm and has a way to securely clamp the fabric without stretching it would be comparable. It is important, though, that the sled remains parallel to and in contact with the fabric during the measurement. The distance between the load cell to the sled is set at 10.2 cm. The crosshead arm height to the sample stage is adjusted to 25 mm (measured from the bottom of the cross arm to the top of the stage) to ensure that the sled remains parallel to and in contact with the fabric during the measurement. The following settings are used to make the measure:

| | |
|---|---|
| T2 (Kinetic Measure): | 10.0 sec |
| Total Time: | 20.0 sec |
| Test Rate: | 20.0 cm/min |

The 11.4 cm×6.4 cm cut fabric piece is attached, per FIG. 2, to the clamping sled (10) with the face down (11) (so that the face of the fabric on the sled is pulled across the face of the fabric on the sample plate) which corresponds to friction sled cut (7) of FIG. 1. Referring to FIG. 2, the loops of the fabric on the sled (12) are oriented such that when the sled (10) is pulled, the fabric (11) is pulled against the nap of the loops (12) of the test fabric cloth (see FIG. 2). The fabric from which the sled sample is cut is attached to the sample table such that the sled drags over the area labeled "Friction Drag Area" (8) as seen in FIG. 1. The loop orientation (13) is such that when the sled is pulled over the fabric it is pulled against the loops (13) (see FIG. 2). Direction arrow (14) indicates direction of sled (10) movement.

The sled is placed on the fabric and attached to the load cell. The crosshead is moved until the load cell registers between ~1.0-2.0 gf, and is then moved back until the load reads 0.0 gf. At this point the sled drag is commenced and the Kinetic Coefficient of Friction (kCOF) recorded at least every second during the sled drag. The kinetic coefficient of friction is averaged over the time frame starting at 10 seconds and ending at 20 seconds for the sled speed set at 20.0 cm/min For each treatment, at least ten replicate fabrics are measured.

Example 12. Perfume Release Headspace Over Fabric Measurement Method

Fabrics were treated with compositions of the current invention using the Fabric Preparation method described within. The perfume release over fabric data was generated using standard dynamic purge and trap analysis of fabric headspace with gas chromatography (GC) and detector to measure perfume headspace levels. The headspace analysis was performed on wet and dry fabric and total perfume counts were normalized to one of the test legs to show the relative benefit of compositions of the present invention. For example, a wet fabric perfume headspace (normalized to 1.0) shows that Leg C has 50% more perfume headspace above the wet fabric than Leg A.

GC

Detector Analysis of Fabric Samples for Perfume Release

A total of 3 pieces of treated fabric 1"×2" in size are placed into 3 clean 40 ml bottles (for a total of 9 fabrics) and allowed to equilibrate for about 1 hour. The fabric pieces are cut from different fabrics within each load to account for fabric-to-fabric variability. Instrument conditions should be modified to achieve adequate PRM signal detection while avoiding peak saturation. A DB 5 column was used with 20 sec sample collection with a ramp of 40-180° C. at 5-10 deg/sec and a detector temperature of 35° C.

Olfactive Panel

The Olfactive Panel is run with about 20 qualified panelists. Each panelist is given fabrics treated with compositions of the current invention to grade. A Panel typically consists of 4 to 6 treatments, which are randomized Each panelist grades the fabric treatments for intensity (scale 0-100) based on the anchors that are prepared to provide intensities representing 20, 50, and 80 on a scale of 0-100). On the scale, 0 refers to a fabric with no scent intensity and 100 to a fabric with extremely strong/over-powering scent intensity. Panelists sniff fabrics and record an intensity grade for the Dry Fabric Odor (DFO). Optionally, panelists can sniff and grade fabrics after rubbing the dry fabric to give grades for Rubbed Fabric Odor (RFO). Optionally, panelists can evaluate other touch points such as wet fabric odor (WFO).

Example 13

Fabrics were treated with compositions of the current invention using the Fabric Preparation method described within. The softness of the fabrics on a 1-10 scale were then evaluated by at least 20 panelists. The results are show below in Tables 3, 4 and 5.

TABLE 3

| Softener Active Level (%) | Softener Active Dose (g) | Polymer 1 | Polymer 2 | Softness (1-10) | Wet Fabric Perfume Headspace (Normalized to 1.0) | Dry Fabric Perfume Headspace (Normalized to 1.0) |
|---|---|---|---|---|---|---|
| 14.7 | 45 | 0.08% Rheovis CDE ® | — | 6.0 | 1.0x | 1.0x |
| 9.5 | 45 | 0.12% Polymer 1 selected from Table 1 | 0.12% Polymer 2 selected from Table 2 | 7.2 | 1.5x | 1.4x |
| 13.3 | 45 | — | — | 6.1 | | |
| 9.5 | 45 | 0.08% Rheovis CDE ® | — | 3.9 | 1.2x | 0.9x |

Rheovis CDE ® commercially available from BASF

TABLE 4

| Formula from Example 7 | Dose (g) | Polymer 1 | Polymer 2 | Dry Fabric Perfume Headspace (Normalized to 1) |
|---|---|---|---|---|
| F25 | 45 | Rheovis CDE ® | — | 1.0 |
| F26 | 45 | Rheovis CDE ® | — | 1.1 |
| F27 | 45 | Rheovis CDE ® | — | 0.6 |
| F28 | 45 | Rheovis CDE ® | — | 0.5 |
| F24 | 45 | Polymer 1 selected from Table 1 | Polymer 2 selected from Table 2 | 0.8 |
| F23 | 45 | Polymer 1 selected from Table 1 | Polymer 2 selected from Table 2 | 1.6 |
| F9 | 45 | Polymer 1 selected from Table 1 | Polymer 2 selected from Table 2 | 1.5 |
| F22 | 45 | Polymer 1 selected from Table 1 | Polymer 2 selected from Table 2 | 1.2 |

Rheovis CDE ® commercially available from BASF

TABLE 5

| Softener Active Level (%) | Dose (g) | Polymer 1 (%) | Polymer 2 (%) | Perfume Headspace (Normalized to 1) | Softness (coefficient of friction) | Viscosity (2 months) | Stability Index |
|---|---|---|---|---|---|---|---|
| 14.7 | 25 | 0.15% Rheovis CDE ® | — | 1.0 | 1.12 | | 0 |
| 8 | 25 | 0.15% Rheovis CDE ® | — | 0.9 | 1.38 | 144 | 0 |
| 8 | 25 | 0.25% Polymer 1 selected from Table 1 | — | 1.1 | 1.03 | 4600 | 0 |
| 8 | 25 | 0.25% Zetag ® | — | 1.7 | 1.03 | 990 | 0 |
| 8 | 25 | — | 0.25% Polymer 2 selected from Table 2 | 1.0 | 1.11 | 96 | 0.3 |
| 8 | 25 | 0.12% Zetag ® | 0.12% Polymer 2 selected from Table 2 | 1.9 | 1.14 | 234 | 0 |
| 8 | 25 | 0.06% Zetag ® | 0.12% Polymer 2 selected from Table 2 | 1.4 | 1.14 | 107 | 0 |

Rheovis CDE ® commercially available from BASF
Zetag 9066FS ® commercially available from BASF Example 14

Fabrics were treated with compositions of the current invention. The polymers in the fabric softener compositions were characterized using the methods described within. After treatment and drying for three consecutive times, the amount of silicone deposited on the fabrics was measured using the silicone extraction example described within. The results are shown below in Table 6 and Table 7.

TABLE 6

Fabric softener composition examples for 30 g of product dosed/2700 g fabric treated

| Example | Formula from Example 7 | Polymer 1 Type from Table 1 | Polymer 2 Type from Table 2 | Viscosity Slope of Polymer 1 | Polymer 1 AUC value | Silicone Deposition [ug silicone/g fabric] |
|---|---|---|---|---|---|---|
| 1 | F1 | P.1.2.4 | None | 2.7 | 28% | 344 |
| 2 | F1 | P.1.2.6 | None | 3.3 | 30% | 319 |
| CE1 | F1 | Rheovis CDE ® | None | | | 268 |

Rheovis CDE ® commercially available from BASF

TABLE 7

Fabric softener composition examples for 24 g of product dosed/2700 g fabric treated

| Example | Formula from Example 7 | Polymer 1 Type from Table 1 | Polymer 2 Type from Table 2 | Viscosity Slope of Polymer 1 | Polymer 1 AUC value | Silicone Deposition [ug silicone/g fabric] |
|---|---|---|---|---|---|---|
| 1 | F1 | P1.1.5 | None | 5.0 | 34% | 230 |
| 2 | F1 | P1.1.10 | None | 4.4 | 25% | 148 |
| 3 | F1 | P1.2.26 | None | 3.6 | 22% | 152 |
| 4 | F1 | P1.2.27 | None | | 31% | 142 |
| 5 | F1 | P1.2.28 | None | 4.1 | 18% | 115 |
| 6 | F1 | P1.3.1 | None | 3.6 | 27% | 242 |
| CE1 | F1 | Rheovis CDE ® | None | | | 77 |

Rheovis CDE ® commercially available from BASF

Example 15

Fabrics were treated with compositions of the current invention using the Fabric Preparation method described within. The results are show below in Tables 8.

TABLE 8

Fabric softener composition examples for 49 g of product dosed/2700 g fabric treated.

| Formula from Example 7 | Dose (g) | Polymer 1 | Polymer 2 | Dry Fabric Odor (DFO)/ Rubbed DFO |
|---|---|---|---|---|
| F35 | 49 | selected from Table 1 | | 21.5/56.0 |
| F36 | 49 | selected from Table 1 | selected from Table 2 | 26.0/60.0 |
| F37 | 49 | selected from Table 1 | selected from Table 2 | 29.5/62.5 |

TABLE 8-continued

Fabric softener composition examples for 49 g of product dosed/2700 g fabric treated.

| Formula from Example 7 | Dose (g) | Polymer 1 | Polymer 2 | Dry Fabric Odor (DFO)/ Rubbed DFO |
|---|---|---|---|---|
| F38 | 49 | selected from Table 1 | selected from Table 2 | 24.5/59.0 |
| F39 | 49 | Rheovis CDE ® | | 22.5/57.0 |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to the term in this written document shall govern.

While particular aspects of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A composition comprising, based upon total composition weight:
   a.) from about 0.1% to about 0.2% of a polymeric material comprising a first polymer and a second polymer, said first polymer being derived from the polymerization of from about 40 to 70 mole percent of a cationic vinyl addition monomer, from about 30 to 60 mole percent of a non-ionic vinyl addition monomer, from about 50 ppm to 1,950 ppm of a cross-linking agent comprising two or more ethylenic functions, 0 ppm to about 10,000 ppm chain transfer agent; said second polymer being derived from the polymerization of from about 40 to 70 mole percent of a cationic vinyl addition monomer, from about 30 to 60 mole percent of a non-ionic vinyl addition monomer, from about 1 ppm to 45 ppm of a cross-linking agent comprising two or more ethylenic functions, 0 ppm to about 10,000 ppm chain transfer agent,
   wherein the cationic vinyl addition monomer for the first and second polymers is methyl chloride quaternized dimethyl aminoethylammonium acrylate, and wherein the non-ionic vinyl addition monomer for the first and second polymers is acrylamide; and
   b.) from about 8% to about 12%, of a fabric softener active, the fabric softener active comprising a quaternary ammonium compound;
   said composition comprising perfume and/or a perfume delivery system,
   said composition having a pH from about 2 to about 4, and said composition being a fabric and home care product.

2. The composition of claim 1, said first polymer being derived from about 55 ppm to 1,900 ppm of a cross-linking agent comprising two or more ethylenic functions; and 0 ppm to about 10,000 ppm chain transfer agent;
   said second polymer being derived from about 1 ppm to 40 ppm of a cross-linking agent comprising two or more ethylenic functions; and 0 ppm to about 10,000 ppm of a chain transfer agent.

3. A composition according to claim 1, said fabric softener active further comprising a member selected from the group consisting of a silicone polymer, a polysaccharide, a clay, an amine, a fatty ester, a dispersible polyolefin, a polymer latex and mixtures thereof.

4. A composition according to claim 3, wherein;
   a.) said quaternary ammonium compound comprises an alkyl quaternary ammonium compound;
   b.) said silicone polymer is selected from the group consisting of cyclic silicones, polydimethylsiloxanes, aminosilicones, cationic silicones, silicone polyethers, silicone resins, silicone urethanes, and mixtures thereof;
   c.) said polysaccharide comprises a cationic starch;
   d.) said clay comprises a smectite clay;
   e.) said dispersible polyolefin is selected from the group consisting of polyethylene, polypropylene and mixtures thereof; and
   f.) said fatty ester is selected from the group consisting of a polyglycerol ester, a sucrose ester, a glycerol ester and mixtures thereof.

5. A composition according to claim 4, wherein said fabric softener active comprises a material selected from the group consisting of monoesterquats, diesterquats, triesterquats, and mixtures thereof.

6. A composition according to claim 3 wherein the fabric softening active has an Iodine Value of between 0-140, or when said fabric softening active comprises a partially hydrogenated fatty acid quaternary ammonium compound said fabric softening active has a Iodine Value of 25-60.

7. A composition according to claim 3, said composition comprising a quaternary ammonium compound and a silicone polymer.

8. A composition according to claim 3, said composition comprising, in addition to said fabric softener active, from about 0.001% to about 5% of a stabilizer that comprises a alkyl quaternary ammonium compound.

9. A composition according to claim 1 wherein said cross-linking agent selected from the group consisting of methylene bisacrylamide, ethylene glycol diacrylate, polyethylene glycol dimethacrylate, diacryamide, triallylamine, cyanomethylacrylate, vinyl oxyethylacrylate or methacrylate and formaldehyde, glyoxal, divinylbenzene, tetraallylammonium chloride, allyl acrylates, allyl methacrylates, diacrylates and dimethacrylates of glycols or polyglycols, butadiene, 1,7-octadiene, allylacrylamides or allylmethacrylamides, bisacrylamidoacetic acid, N,N'-methylenebisacrylamide or polyol polyallyl ethers, pentaerythrityl triacrylate, pentaerythrityl tetraacrylate, tetrallylammonium chloride, 1,1,1-trimethylolpropane tri(meth)acrylate; and tri- and tetramethacrylates of polyglycols; or polyol polyallyl ethers, ditrimethylolpropane tetraacrylate, pentaerythrityl tetraacrylate ethoxylate, pentaerythrityl tetramethacrylate, pentaerythrityl triacrylate ethoxylate, triethanolamine trimethacrylate, 1, 1,1-trimethylolpropane triacrylate, 1, 1,1-trimethylolpropane triacrylate ethoxylate, trimethylolpropane tris(polyethylene glycol ether) triacrylate, 1,1,1-trimethylolpropane trimethacrylate, tris-(2-hydroxyethyl)-1,3,5-triazine-2,4,6-trione triacrylate, tris-(2- hydroxyethyl)-1,3,5-triazine-2,4,6-trione trimethacrylate, dipentaerythrityl pentaacrylate, 3-(3-{[dimethyl-(vinyl)-silyl]-oxy}-1,1,5,5-tetramethyl-1,5-divinyl-3-trisiloxanyl)-propyl methacrylate, dipentaerythritol hexaacrylate, 1-(2-propenyloxy)-2,2-bis[(2-propenyloxy)-methyl]-butane, trimethacrylic acid-1,3,5-triazin-2,4,6-triyltri-2,1-ethandiyl ester, glycerine triacrylate, propoxylated, 1,3,5-triacryloylhexahydro-1,3,5-triazine, 1,3-dimethyl-1,1,3,3-tetravinyldisiloxane, pentaerythrityl tetravinyl ether, 1,3-dimethyl-1,1,3,3-tetravinyldisiloxane, (Ethoxy)-trivinylsilane, (Methyl)-trivinylsilane, 1,1,3,5,5-pentamethyl-1,3,5-trivinyltrisiloxane, 1,3,5-trimethyl-1,3,5-trivinylcyclotrisilazane, 2,4,6-trimethyl-2,4,6-trivinylcyclotrisiloxane, 1,3,5-trimethyl-1,3,5-trivinyltrisilazane, tris-(2-butanone oxime)-vinylsilane, 1,2,4-trivinylcyclohexane, trivinylphosphine, trivinylsilane, methyltriallylsilane, phenyltriallylsilane, triallylamine, triallyl citrate, triallyl phosphate, triallylphosphine, triallyl phosphite, triallylsilane, 1,3,5-triallyl-1,3,5-triazine-2,4,6(1H,3H,5H)-trione, trimellitic acid triallyl ester, trimethallyl isocyanurate, 2,4,6-tris-(allyloxy)-1,3,5-triazine, 1,2-Bis-(diallylamino)-ethane, pentaerythrityl tetratallate, 1,3,5,7-tetravinyl-1,3,5,7-tetramethylcyclotetrasiloxane, 1,3,5,7-tetravinyl-1,3,5,7-tetramethylcyclotetrasiloxane, tris-[(2-acryloyloxy)-ethyl]-phosphate, vinylboronic anhydride pyridine, 2,4,6-trivinylcyclotriboroxanepyridine, tetraallylsilane, tetraallyloxysilane, 1,3,5,7-tetramethyl-1,3,5,7-tetravinylcyclotetrasilazane, and mixtures thereof; and wherein said chain transfer agent is selected from the group consisting of mercaptanes, malic acid, lactic acid, formic acid, isopropanol and hypophosphites, and mixtures thereof.

10. A composition according to claim 1, said composition having a Brookfield viscosity of from about 20 cps to about 1000 cps.

11. A composition according to claim 1, said composition comprising an adjunct material selected from the group consisting of surfactants, builders, chelating agents, dye transfer inhibiting agents, dispersants, enzymes, and enzyme stabilizers, catalytic materials, bleach activators, hydrogen peroxide, sources of hydrogen peroxide, preformed peracids, polymeric dispersing agents, clay soil removal/anti-redeposition agents, brighteners, suds suppressors, dyes, hueing dyes, perfumes, perfume delivery systems, structure elasticizing agents, carriers, structurants, hydrotropes, processing aids, solvents and/or pigments and mixtures thereof.

12. A composition according to claim 1, said composition comprising one or more types of perfume microcapsules.

13. The composition according to claim 1, wherein the amount of cationic vinyl addition monomer is from about 60 to 70 mole percent for both the first and second polymers, and wherein the amount of non-ionic vinyl addition monomer for both the first and second polymers is from about 30 to 40 mole percent.

14. The composition according to claim 1, wherein the amount of cationic vinyl addition monomer is about 60 mole percent for both the first and second polymers, and wherein the amount of non-ionic vinyl addition monomer for both the first and second polymers is about 40 mole percent.

\* \* \* \* \*